United States Patent [19]
Wada et al.

[11] Patent Number: 5,506,481
[45] Date of Patent: Apr. 9, 1996

[54] REGISTRATION ERROR CORRECTION DEVICE

[75] Inventors: Akira Wada; Kouji Minami; Hitoshi Nakahara; Yoshiki Ono, all of Nagaokakyo, Japan

[73] Assignee: Mitsubishi Denki Kabushiki Kaisha, Tokyo, Japan

[21] Appl. No.: 238,066

[22] Filed: May 4, 1994

[30] Foreign Application Priority Data

| May 7, 1993 | [JP] | Japan | 5-106761 |
| Jun. 3, 1993 | [JP] | Japan | 5-133389 |
| Jul. 13, 1993 | [JP] | Japan | 5-172975 |
| Nov. 9, 1993 | [JP] | Japan | 5-304665 |

[51] Int. Cl.[6] .............. G09G 1/28; H04N 3/22; H04N 9/28
[52] U.S. Cl. ............... 315/368.12; 315/368.13; 348/806; 348/807
[58] Field of Search ............... 315/368.13, 368.12; 348/806, 807

[56] References Cited

U.S. PATENT DOCUMENTS

| 4,422,019 | 12/1983 | Meyer | 315/368.13 |
| 5,194,783 | 3/1993 | Ogino et al. | 315/368.13 |
| 5,274,307 | 12/1993 | Christensen | 315/368.13 |
| 5,382,984 | 1/1995 | Tsujihara et al. | 315/368.13 |

FOREIGN PATENT DOCUMENTS

| 60-33791 | 2/1985 | Japan |
| 63-59191 | 3/1988 | Japan |
| 131358 | 6/1989 | Japan |

*Primary Examiner*—Gregory C. Issing

[57] ABSTRACT

A device for digital convergence correction of raster distortion correction of a picture displayed on a screen of a display device using a cathode-ray tube, in which scanning lines include a first class of scanning lines, called correction scanning lines, on which correction points are positioned, and a second class of scanning lines, called interpolated scanning lines between the correction scanning lines. The correction points are positioned at intersections of the correction scanning lines and vertical lines. The correction data for the interpolated scanning lines are produced by vertical interpolation from the correction data of a certain number of vertically aligned correction points. Convergence adjustment, however, may be conducted for only part of the correction points, and the correction data of the remaining correction points may be obtained by interpolation.

41 Claims, 41 Drawing Sheets

OUTPUT SA6 OF
CORRECTION
DATA
MEMORY 7

FIG. 33

| x | $K_0$ | $K_1$ | $K_2$ | $K_3$ | $K_4$ |
|---|---|---|---|---|---|
| 0 | 77D6 | 882A | 66B7 | D011 | 0938 |
| 1 | 58F1 | CD2D | 290D | ED47 | 038F |
| 2 | 4000 | 0000 | 0000 | 0000 | 0000 |
| 3 | 2C40 | 2366 | E7DD | 0A69 | FE13 |
| 4 | 1CF9 | 39F1 | DD3C | 0E7C | FD5E |
| 5 | 1180 | 4600 | DD00 | 0E00 | FD80 |
| 6 | 0938 | 49BF | E458 | 0A89 | FE28 |
| 7 | 038F | 4727 | F0C1 | 0579 | FF10 |
| 8 | 0000 | 4000 | 0000 | 0000 | 0000 |
| 9 | FE13 | 35DE | 1029 | FB1A | 00CB |
| 10 | FD5E | 2A24 | 1F9B | F792 | 0151 |
| 11 | FD80 | 1E00 | 2D00 | F600 | 0180 |
| 12 | FE28 | 1270 | 374F | F6C8 | 0151 |
| 13 | FF10 | 083D | 3DCA | FA1D | 00CB |
| 14 | 0000 | 0000 | 4000 | 0000 | 0000 |
| 15 | 00CB | FA1D | 3DCA | 083D | FF10 |
| 16 | 0151 | F6C8 | 374F | 1270 | FE28 |
| 17 | 0180 | F600 | 2D00 | 1E00 | FD80 |
| 18 | 0151 | F792 | 1F9B | 2A24 | FD5E |
| 19 | 00CB | FB1A | 1029 | 35DE | FE13 |
| 20 | 0000 | 0000 | 0000 | 4000 | 0000 |
| 21 | FF10 | 0579 | F0C1 | 4727 | 038F |
| 22 | FE28 | 0A89 | E458 | 49BF | 0938 |
| 23 | FD80 | 0E00 | DD00 | 4600 | 1180 |
| 24 | FD5E | 0E7C | DD3C | 39F1 | 1CF9 |
| 25 | FE13 | 0A69 | E7DD | 2366 | 2C40 |
| 26 | 0000 | 0000 | 0000 | 0000 | 4000 |
| 27 | 038F | ED47 | 290D | CD2D | 58F1 |
| 28 | 0938 | D011 | 66B7 | 882A | 77D6 |

:::PAGE 1:::

REGISTRATION ERROR CORRECTION DEVICE

BACKGROUND OF THE INVENTION

The present invention relates to a digital device for correcting registration error, such as misconvergence and raster distortion, in an image display device in which a CRT (cathode-ray tube) is used. Image display devices mentioned here include color television sets and display terminals used in information processing systems.

The invention also relates to a digital registration error correction device for a multi-scan display device which is used for various applications with different scanning line numbers, different deflection frequencies, and different aspect ratios.

Color display devices employing a CRT include display devices of a directly-viewed type and three-tube video projectors. In the former, the three primary colors of light are generated to compose a color image on a fluorescent screen of a CRT. In the latter, lights from three CRTs are passed through color filters and make up an image on a screen. In any case, the three primary colors must be precisely registered with each in order to avoid color fringing. This may be accomplished by the use of a convergence device for correcting misconvergence (color misregistration) by causing correcting waveform currents synchronous with the deflection to flow through auxiliary deflection coils provided at the rear of the deflection coils, called main deflection coils for distinction, of the CRT for making fine adjustment of deflection of each of the electron beams for red, blue and green, independently of each other. The above correcting waveform currents may be generated using analog signals. However, digitally generated ones are used more recently in order to achieve more precise correction.

In a display device using a CRT, electron beams are deflected in vertical and horizontal directions by deflection coils to form a raster consisting of horizontal scanning lines vertically separated from each other.

In a digital convergence device for performing convergence correction of a picture displayed on a screen of a display device using a CRT, correction points are specified in rows and in columns. That, is, the correction points are specified at intersections of selected scanning lines, called correction scanning lines, and imaginary vertical lines horizontally separated from each other. The raster is divided into a plurality of segments by the correction scanning lines, and the scanning lines between the adjacent correction scanning lines are called interpolated scanning lines. The convergence correction for the respective points in the raster is performed using the correction data for the correction points which are stored in a correction data memory, and the interpolated correction data for the interpolated scanning lines. The interpolated correction data is obtained by interpolation on a real-time basis from the correction data of the correction points.

Taking an example of three-tube video projectors, further explanations will be given below. FIG. 43 is a block diagram of a conventional digital convergence device. In order to achieve convergence by shifting the electron beams for the three colors R, G, and B in the horizontal and vertical directions, a total of six channels of correction signals (RH, RV, GH, BH, BV) are needed. FIG. 43 however shows only such a part relating to one channel of them. It should be noted that when this invention is applied to display devices of directly-viewed type, four channels of correction outputs are necessary.

Shown in FIG. 43 are an input terminal 1 to which the horizontal and vertical synchronous signals SA1 synchronized to the deflection, an address generator 212 receiving the synchronous signal SA1 and data on the bus lines 62 of a microprocessor 6 and generating address signals SA2 and interpolated scanning line number signal SCA in synchronism with the deflection, a crosshatch signal generator 3 for generating a crosshatch signal SA4 on the basis of the address signal SA2, a video circuit 4 supplying a video signal for displaying a picture including a crosshatch pattern responsive to the crosshatch signal SA4, and a control key pad 5 for inputting correction positions on the raster and correction values.

The microprocessor 6 mentioned above is for inputting an output signal from the control key pad 5 and writing the correction data indicative of the correction value in the address of a correction data memory 7 corresponding to the position on the raster. The correction data memory will be described later.

The microprocessor 6 is provided with a built-in ROM 61 (non-volatile memory). The correction data memory 7 is in the form of a frame memory and receives, as one input, the address signal SA2 generated by the address generator 202, and data on the bus lines 62 as another input, and outputs the correction data SA6. A vertical interpolator 208 receives correction data SA6 from the correction data memory 7, the address signal SA2 and the interpolated scanning line number data SCA from the address generator 2 and finds correction data of interpolated scanning lines by vertical interpolation.

A D/A (digital-to-analog) converter 9 converts the output of the vertical interpolator 208 into an analog signal. A lowpass filter (LPF) 10 receives the output of the D/A converter 9. An output circuit 11 receives the output of the LPF 10. An auxiliary deflection coil 12 receives the output of the output circuit 11 as an input.

A channel memory 13 is formed of non-volatile memories such as an EEPROM or flash memory and stores the correction data for each of a plurality of display modes. When the display device is used for display of a picture in a selected one of a display mode, the correction data of the particular display mode is transferred to the correction data memory 7, and the vertical interpolation for obtaining the correction data for the interpolated scanning line is conducted repeatedly reading the correction data from the correction data memory 7, as will be later described in further detail.

The crosshatch signal generator 3, the address generator 202, the correction data memory 7 and the channel memory 13 are connected via the bus lines 62 to the microprocessor 6.

Next, we will discuss the procedure of adjustment and the operation of the device during the adjustment. The adjustment is made for each of the display modes in which a display device is used. The display device may be connected to variety of signal sources that may vary in the scanning line number, the deflection frequency, and the specific aspect ratio. The term "display mode" as used herein means a specific combination of a specific scanning line number, a specific deflection frequency and a specific aspect ratio.

First, the display device is set to a specific display mode and is made to display images indicating correction points, which may a crosshatch pattern CH as shown in FIG. 44. The crosshatch pattern CH consists of a plurality of parallel vertical lines and a plurality of parallel horizontal lines. The intersection of the vertical and horizontal lines are the correction points for digital convergence.

The adjustment is accomplished by the use of the control key pad 5 which may be configured as shown in FIG. 45. The control key pad 5 includes keys for effecting various controls. FIGS. 45 shows only such keys as are necessary for the explanation of the convergence adjustment. Specifically, there are shown a groups of positioning keys 5a, including keys 5au, 5ad, 5ar and 5al for moving the cursor (or the crosshatch intersection, as will later be made apparent) up, down, rightward and leftward. The cursor may be moved for specifying intersections of a crosshatch pattern on the raster, and for inputting correction values.

The control key pad 5 also includes a mode selection key 5b for selection among various modes of key input. The mode selection key enables use of the positioning keys 5a for multiple purposes. The control key pad 5 further includes an adjustment color selection key 5a for selecting the displayed color of the crosshatch patterns CH during convergence adjustment.

During the convergence adjustment, color green of the three primary colors red, green and blue is normally taken as a reference, and colors red and blue are adjusted to register with green.

When the adjustment for color red is selected by means of the adjustment color selection key 5c, the instruction is issued from the microprocessor 6 to control the crosshatch signal generator 3 to send red and green crosshatch signals SA4 to the video circuit 4 for display on the screen.

The cursor is moved by the use of the positioning keys 5a to the correction point, i.e., the intersection of the green crosshatch pattern, correction of which is desired. Then the mode is switched from the correction point selection mode to the adjustment data entry mode by pressing the mode selection key 5b. Then, the intersection of the red crosshatch pattern is moved by the use of the positioning keys 5a so as to register the red crosshatch pattern intersection with the green crosshatch pattern intersection, and the correction value is input as correction data by pressing an entry key, not shown.

The correction data is written in the correction data memory 7. Then, the mode selection key 5b is pressed for switching to the correction point selection mode, and the cursor is moved by the use of the positioning keys 5a to the crosshatch pattern intersection for which the correction is to be effected next. The mode selection key 5b is pressed for switching to the crosshatch intersection movement mode, and the positioning keys 5a are again used to move the red crosshatch pattern intersection for registration with the corresponding green crosshatch pattern intersection.

Similar operations are repeated for each of the crosshatch pattern intersections, and the correction data written in the correction data memory 7 are used later for the color misregistration correction for the color red during use of the color display device.

Next, the adjustment color selection key 5c is pressed to select the color blue, and similar operations are repeated. The correction data written in the correction data memory 7 by the correction of the blue crosshatch pattern intersections are used later for the color misregistration correction for the color blue during use of the color display device. This completes entry of correction data for one specific display mode. The same procedure is repeated for each of other display modes.

The correction data written in the correction data memory 7 are transferred to a designated storage area in the channel memory 13.

Where the display device is used in a plurality of display modes, it is necessary to store different correction data individually for each mode. A set of correction data corresponding to each display mode is therefore stored in respective storage areas of the channel memory 13. Because each display mode is called a "channel", the memory 13 is referred to as a "channel memory". The correction data for all the display modes are stored in the channel memory 13. When the display device is used, the correction data for the display mode being selected are transferred from the channel memory 13 to the correction data memory 7, from which the correction data are read on a real-time basis for interpolating the correction data for the interpolated scanning lines and controlling the currents supplied to the auxiliary deflection coils 12.

When the adjustment is complete with respect to all the display modes, the correction data for all the display modes are stored in the respective storage areas in the channel memory 13.

The misconvergence correction during use of the display device is now described. When power to the display device is turned on, or a display mode is altered from one mode to another, one of the sets of the correction data that corresponds to the selected display mode is copied from the channel memory 13 to the correction data memory 7.

The correction data is read from the correction data memory 7 in the following manner. The address generator 2 generates an address signal SA2 (an address corresponding to the position on the raster) on the basis of the synchronous signal SA1, and also generates the interpolated scanning line number SCA signal indicative of the number of the interpolated scanning line number as counted from the top of each segment defined by adjacent horizontal lines of the crosshatch pattern. FIG. 46 shows an example of the interpolated scanning line numbers for the case where the number of the scanning lines in each segment is N−1. That is, every N-th scanning line coincides with the horizontal line of the crosshatch pattern. When the address generator 2 is addressing a scanning line which is coincident with the horizontal line of the crosshatch pattern and on which correction points lie (hereinafter, referred to as "correction scanning line"), data at the correction points are sequentially read out. When the address generator 202 is addressing an interpolated scanning line on which no correction point lies, the data of the immediately preceding correction scanning line are repeatedly read out, and the correction data for these interpolated scanning lines are obtained by means of vertical interpolation using the data of the immediately preceding correction line.

The interpolation is performed by the vertical interpolator 208. If the correction values of the correction points A0 and B0 in FIG. 44 are respectively denoted by a and b, then the correction value on the interpolated scanning lines between the points A0 and B0 is given by:

$$(b-a)\times n/N + a$$

where N is the number of the interpolated scanning line (n−1) between the points A0 and B0, plus 1; and n is the interpolated scanning line number as counted from the top of the segment.

The value of n is given by the scanning line number signal SCA.

The vertical interpolator 208 may be configured as shown in FIG. 47. As illustrated, it includes an input terminal 21 for receiving the output signal SA6 of the correction data memory, an input terminal 22 for receiving the address signal SA2 which is output from the address generator 202, an input terminal 23 for receiving the interpolated scanning line number SCA from the address generator 202, a timing signal generator 24 receiving the address signal SA2 (via the input terminal 22) as one input, and receiving the interpolated scanning line number SCA (via the input terminal 23) as another input, and generating various timing signals, a coefficient generator 25 receiving the interpolated scanning line number SCA via the input terminal 23, a shift register 27 receiving the signal SA6 via the input terminal 21 and controlled by the timing signal generator 24, a subtractor 28 for subtracting the signal SA6 input via the input terminal 21 from the output signal of the shift register 27, a multiplier 29 for multiplying the output signal of the subtractor 28 by the output signal of the coefficient generator 25, an adder 30 for adding the output signals of the shift register 27 and the multiplier circuit 29, and an output terminal 31 for outputting the output signal of the adder 30 to the D/A converter 9.

In operation, the correction data SA6 from the correction data memory 7 is delayed by the shift register 27 by a time period corresponding to the vertically-separated correction point interval in the vertical direction. That is, at the time when correction data "b" of the correction point B0 is read from the correction data memory 7, correction data "a" of the correction point A0 is output from the shift register 27. The correction point A0 is one correction point interval before B0 in the vertical direction. Then, the subtraction (b–a) is performed by the subtractor 28. At the same time, the coefficient generator 25 outputs coefficient n/N corresponding to the interpolated scanning line number n, responsive to the scanning line number data SCA. The multiplier 29 multiplies (b–a) by n/N to output (b–a)×n/N, which is, then, added with "a" by the adder 30 providing (b–a)×n/N+a to the output terminal 31.

The correction value of the interpolated scanning lines are calculated in the manner described above.

The output signal from the vertical interpolator 208 is input to the D/A converter 9 (FIG. 43), where it is converted into an analog signal.

The sequence of digital values respectively representing the correction values along an interpolated scanning line which are output from the vertical interpolator 208, or the sequence of the digital signals respectively representing the correction values along a scanning line which are output from the correction data memory 7 are sequentially supplied to the D/A converter 9. The analog signal output from the D/A converter 9 is smoothed (and hence is effectively horizontally interpolated) by means of the LPF 10, and is supplied to the output circuit 11, which supplies a corresponding correction current to the auxiliary deflection coil 12. In this way, the convergence adjustment for each scanning line is achieved.

FIG. 48 shows another example of conventional digital convergence device. As illustrated, it comprises an input terminal 101 for horizontal blanking pulses (hereinafter referred to as "H-BLK pulses") which are horizontal reference signals for the input signal, an input terminal 102 for vertical blanking pulses (hereinafter referred to as "V-BLK pulses") which are vertical reference signals for the input signal, a vertical interpolation address generator 27, a vertical address generator 28, a input terminal 109 for horizontal addresses, a correction data memory 7 for storing data for convergence correction, a vertical interpolation filter 31 for calculating correction data between correction points in the vertical direction, a D/A converter 10 for converting digital data into an analog correction signal, and an output terminal 117 for the correction signal.

FIG. 49 shows an example of a set of convergence correction points arranged on the raster in the prior art example. In the illustrated example, 20 correction points are arranged in the horizontal direction, and 15 correction points are arranged in the vertical direction. For misconvergence correction between correction points in the horizontal direction, an analog smoothing filter (LPF) is used, and for misconvergence correction between correction points in the vertical direction, a digital interpolation filter which conducts real-time interpolation is used.

FIG. 50 shows convergence correction points on the raster in a case when the number of scanning lines of an input signal is 141. As shown in FIG. 50, where are 9 scanning lines between correction points. Thus, misconvergence correction can be made for scanning lines of (9+1)×(15–1)+1= 141.

The number of scanning lines for which the misconvergence correction can be made with a high reliability in a digital convergence system is called a correctable scanning line number. To generalize, this correctable scanning line number DN is given by:

$$DN = (IV+1) \times (NV-1) + 1 \qquad (1)$$

where IV is the number of the interpolated scanning lines, and
NV is the number of the vertical arranged correction points.

Now the operation of the device shown in FIG. 48 is described. FIG. 48 also shows a part of the device relating to one channel only.

The H-BLK pulses, which are the reference signal for the horizontal deflection, and the V-BLK pulses, which are the reference signal for the vertical deflection, are input via the input terminals 101 and 102 and supplied to the vertical interpolation address generator 27. The address generator 27 comprises a counter whose content (count value) is incremented by clocks whose period is equal to one horizontal scanning period. For example, where the number of interpolated scanning lines is nine, the counter will be a decimal counter, which counts from 0 to 9 to generate interpolated scanning line addresses 0 through 9.

Each time the count value of the decimal counter forming the vertical interpolation address generator 27 reaches its maximum, a ripple carry is produced, and is supplied to the vertical address generator 28. The vertical address generator 28 comprises a counter which is reset by the V-BLK signal and whose content (count value) is incremented each time a ripple carry signal is produced from the vertical interpolation address generator, and successively generates address signals having address values 0 through 14. The vertical address signals are supplied to the correction data memory 30.

A horizontal address generated at a circuit, not shown, is input via the input terminal 109 to the correction data memory 30.

The correction data memory 30 stores the misconvergence correction data for predetermined correction points on the raster. The misconvergence correction data are read from the correction data memory according to the above-mentioned horizontal and vertical address signals, and are input to the vertical interpolation filter 31.

The vertical interpolation filter 31 conducts real-time interpolation of the correction data between the correction points in the vertical direction. This interpolation is conducted for each correction point.

The vertically-interpolated convergence correction data are converted by the D/A converter 10 into an analog signal and smoothed by the analog LPF 11 to become a convergence correction output, which is supplied to a current amplifying means (not shown).

Now let us assume that the above-described convergence correcting device is used for a multi-scan video projector, and the number of the scanning lines of the input signal is altered due for example to switching of the input signal.

As shown in expression (1), the number of correctable scanning lines depends on the number of correction points in a vertical direction and the number of interpolated scanning lines between correction points in the vertical direction. Since the number of interpolated scanning lines is fixed in the conventional system, to cope with the increase in the number of the scanning lines of the input signal, the number of correction points in the vertical direction is increased.

FIG. 51 shows convergence correction points on the raster for a case when the number of scanning lines of the input signal has changed to 201 in the conventional digital convergence device. For example, if the number of the effective scanning lines of the input signal is 200, then the number of correction points in the vertical direction is increased from 15 to 21. As a result, according to expression (1) the number of the correctable scanning lines becomes $(9+1) \times (21-1)+1 = 201$. In this way, misconvergence correction an be accomplished with a high reliability for the period corresponding to the effective scanning lines.

In the digital convergence devices which have been described referring to FIG. 43 or FIG. 47, linear (straight-line) interpolation is made in order to correct the convergence on the interpolated scanning lines. As a result, the error from the true correction data may not be negligible, as shown in FIG. 52. This may result in uneven distribution of the scanning lines, i.e., varying density of the scanning lines.

Another problem is that the number of the correction points in the vertical direction must be altered when the number of the scanning lines of the input signal is altered. If the number of the scanning lines of the input signals to the display device vary over the range of from 200 to 2000, the number of the correction points in the vertical direction must be altered over the range of from 21 to 201. The capacity of the correction data memory 7 must be sufficient to store the correction data for the maximum number of the correction points. The capacity of the channel memory 13 must be sufficient to store the correction data for the entire range of the variation of the total number of the scanning lines. Moreover, it takes a longer time to make adjustment and obtain the correction data. Furthermore, the correction data for one input signal may not be used by simple copying to produce correction data for another input signal because of the difference in the number of the correction points, and some sort of data conversion is required.

Devices similar to the convergence device can be used for correction of raster distortion, and similar problems are encountered in the raster distortion correction. In the present specification, the expression "registration error" is used to cover body misconvergence (convergence error) and raster distortion.

SUMMARY OF THE INVENTION

An object of the invention is to provide a device for correcting registration error which can curvilinearly interpolate correction data of the interpolated scanning lines between correction points by means of simple hardware.

Another object of the invention is to provide a device for correcting registration error in which the number of registration error correction points on the raster is unchanged even where the number of the scanning lines of the input signal is varied, adjustment is easy, and common correction data can be used for various types of input signals. This feature is important where the registration error correction device is applied to a multi-scan display device.

A further object of the invention is to reduce the capacity of memory, e.g. ROM, storing the coefficient data used in the interpolation between correction points, even where the registration error correction device is used with different number of the horizontal scanning lines (different horizontal scanning frequencies).

A further object of the invention is to provide a registration error correction device with which time required for adjustment can be reduced, the accuracy obtained by adjustment is improved, the number of adjustment points is reduced, and the accuracy of registration error correction is improved.

According to a first aspect of the invention, there is provided a registration error correction device for correcting registration error a picture displayed on a screen of a display device using a cathode-ray tube. In which electron beams are deflected in vertical and horizontal directions by deflection means to form a raster consisting of horizontal scanning lines vertically separated from each other, said scanning lines including a first class of scanning lines, called correction scanning lines, on which correction points are positioned, and a second class of scanning lines, called interpolated scanning lines between said correction scanning lines, said correction points being positioned at intersections of said correction scanning lines and one or more vertical lines horizontally separated from each other, and correction data for said interpolated scanning lines being produced by vertical interpolation on a real-time basis from the correction data of a certain number K of said correction points vertically aligned and vertically consecutive to each other:

said device comprising:

a correction data memory for storing the correction data for said correction points;

an address generator for sequentially addressing respective points along said scanning lines in the order of scanning, for the purpose of producing correction data for said respective points. In synchronism with said deflection by said deflection means, and also addressing said correction data memory for the purpose of reading the correction data from said correction data memory;

the addressing for the purpose of reading being such that when one of the correction scanning lines (n-th correction scanning line) is addressed, the correction data for the correction points on the correction scanning line ((n−1)-th correction scanning line) immediately preceding the first mentioned correction scanning line are read in turn;

said correction data being read from said correction data at a rate 1/K times the frequency of a clock, while said address generator is addressing said correction scanning lines;

a coefficient generator for producing coefficients used for the vertical interpolation;

a vertical interpolator for determining the correction data for the interpolated scanning lines on the basis of said correction data from said correction data memory and said coefficients from said coefficient generator;

wherein said vertical interpolator comprises:

a switching circuit receiving the correction data from said correction data memory;

a delay circuit for producing first delayed data identical to an output of said switching circuit but delayed by a delay period (K×H–1) times said clock period, with H being the number of the reading periods per horizontal scanning period, and second delayed data identical to the output of said switching circuit but delayed by a delay period (K×H) times said clock period;

said switching circuit also receiving said first delayed data and said second delayed data, repeatedly selecting, when the address generator is addressing the correction scanning lines, said correction data for one clock period every K clock periods and the first delayed data for the remaining (K–1) clock periods every K clock periods, and selecting said second delayed data when the address generator is addressing the interpolated scanning lines;

a multiplier for multiplying one of the first delayed data and the second delayed data, and data derived therefrom by the coefficient generated by said coefficient generator; and an accumulator for accumulating the output of said multiplier for an accumulation period K times said clock period;

whereby the correction data of the K correction points which are vertically consecutive and vertically aligned with each other are rearranged so as to be successive along a time axis;

the K successively rearranged correction data are multiplied at said multiplier by the respective coefficients from said coefficient generator; and the products of said K successively rearranged correction data and the respective coefficients are cumulatively added to produce a correction data of an interpolated scanning line.

With the above arrangement, the correction data of the interpolated scanning lines can be determined by curvilinear interpolation by the use of a simple circuitry, and registration error can be corrected with a high accuracy, and free from density modulation.

Said coefficient generator may comprise a first coefficient generating circuit for generating first generating coefficients, a second coefficient generating circuit for generating second coefficients, and a selector for selecting the first coefficients when the scanning lines in a central part of the raster are addressed, and selecting the second second coefficients when the scanning lines near upper or lower edges of the raster are addressed.

Said certain number K may be smaller when interpolation with said second coefficients is performed than when interpolation with said first coefficients is performed.

With the above arrangement, the coefficients for the interpolation of the scanning lines near the upper and/or lower edges of the raster can be determined independently of the coefficients for the central part of the raster. The second coefficients can be so set as to interpolate the scanning lines near the upper and/or lower edges of the raster from the correction data of the correction points within the same field. The interpolation can therefore be achieved accurately even near the upper and/or lower edges of the raster.

The registration error correction device may further comprise:

a scanning line number detector for detecting the total number of scanning lines of a signal input to said display device. In such a case, it may be so arranged that the correction data memory is adapted to store said correction data for a predetermined total number of scanning lines, predetermined correction points, and predetermined numbers of interpolated scanning lines in each of segments formed between respective pairs of adjacent correction scanning lines; said address generator is responsive to the detected total number of scanning lines for determining, if the detected total number differs from said predetermined total number, the number of interpolated scanning lines in each segment in such a manner that the correction points on the raster for the detected total number of scanning lines are at about the same positions as the correction points for said predetermined total number of scanning lines for which said correction data memory stores said correction data memory; and said coefficient generator produces coefficients suitable for the number of the interpolated scanning lines determined by said address generator.

Said coefficient generator may be provided to store a plurality of sets of coefficients for respective numbers of the interpolated scanning lines, and produces the coefficients from one of said sets selected depending on the number of the interpolated scanning lines determined by said address generator.

With the above arrangement, the correction data for the predetermined total number of scanning lines, predetermined correction points and predetermined numbers of the interpolated scanning lines between respective pair of correction scanning lines can be used even when an input signal having a different total number of the scanning lines is applied.

According to a second aspect of the invention, that is provided a registration error correction device for correcting registration error of a picture displayed on a screen of a display device using a cathode-ray tube, in which electron beams are deflected in vertical and horizontal directions by deflection means to form a raster consisting of horizontal scanning lines vertically separated from each other, said scanning lines including a first class of scanning lines, called correction scanning lines, on which correction points are positioned, and a second class of scanning lines, called interpolated scanning lines between said correction scanning lines, said correction points being positioned at intersections of said correction scanning lines and one or more vertical lines separated from each other, segments being formed between respective pairs of adjacent correction scanning lines, and correction data for said interpolated scanning lines being produced by vertical interpolation on a real-time basis from the correction data of a certain number K of said correction points vertically aligned and vertically consecutive to each other;

said registration error correction device comprising:

a correction data memory for storing correction data for said correction points;

an address generator for sequentially addressing respective points along said scanning lines in the order of scanning, for the purpose of producing correction data for said respective points, in synchronism with said deflection by said deflection means, and also addressing said correction data memory for the purpose of reading data from said correction data memory;

the addressing for the purpose of reading the correction data being such that when the address generator is addressing one of the scanning lines in one of segments;

the correction data are read column by column, each column consisting of K correction points vertically consecutive and vertically aligned with each other, and including correction points above and below said segment;

the correction data of correction points in each column being read from top to bottom in each column;

said correction data being read from said correction data at a rate of a clock, while said address generator is addressing said correction scanning lines;

a coefficient generator for producing coefficients used for the vertical interpolation;

a vertical interpolator for determined the correction data for the interpolated scanning lines on the basis of said correction data from said correction data memory and said coefficient generator, said vertical interpolator including:

a multiplier for multiplying the correction data output from said correction data memory by the coefficient generated by said coefficient generator; and an accumulator for accumulating the output of said multiplier for an accumulation period K times said clock period;

whereby the correction data of the K correction points which are vertically consecutive and vertically aligned with each other are successively produced from the correction data;

the K successively produced correction data are multiplied at said multiplier by the respective coefficients from said coefficient generator;

the products of said K successively produced correction data and the respective coefficients are cumulatively added to produce a correction data of an interpolated scanning line.

With the above arrangement, the sequence of the correction data ready for multiplication by coefficient for the purpose of interpolation are produced from the correction data memory, so that without the additional circuit for rearranging the data, the interpolation can be achieved.

The addressing for the purpose of reading may be such that, when the address generator addresses one of the interpolated scanning lines in one of the segments, the succession of the correction data which were produced when the address generator addressed the correction scanning line at the upper edge of said one of the segments are repeatedly produced.

Said certain number K may be smaller when interpolation with said second coefficients is performed than when interpolation with said first coefficients is performed.

With the above arrangement, the coefficients for the interpolation of the scanning lines near the upper and/or lower edges of the raster can be determined independently of the coefficients for the central part of the raster. The second coefficients can be so set as to interpolate the scanning lines near the upper and/or lower edges of the raster from the correction data of the correction points within the same field. The interpolation can therefore be achieved accurately even near the upper and/or lower edges of the raster.

The registration error correction device may further comprise a scanning line number detector for detecting the total number of scanning lines of a signal input to said display device. In such a case, it may be so arranged that said correction data memory is adapted to store said correction data for a predetermined total number of scanning lines, predetermined correction points, and predetermined numbers of interpolated scanning lines in each of segments formed between respective pairs of adjacent correction scanning lines; said address generator is responsive to the detected total number of scanning lines for determining, if the detected total number differs from said predetermined total number, the number of interpolated scanning lines in each segment in such a manner that the correction points on the raster for the detected total number of scanning lines are at about the same positions as the correction points for said predetermined total number of scanning lines for which said correction data memory stores said correction data memory; and said coefficient generator produces coefficients suitable for the number of the interpolated scanning lines determined by said address generator.

According to a third aspect of the invention, there is provided a registration error correction device for correcting registration error device of a picture displayed on a screen of a display device using a cathode-ray tube, in which electron beams are deflected in vertical and horizontal directions by deflection means to form a raster consisting of horizontal scanning liens vertically separated form each other, said scanning lines including a first class of scanning lines, called correction scanning lines, on which correction points are positioned, and a second class of scanning lines, called interpolated scanning lines between said correction scanning lines, said correction points being positioned at intersections of said correction scanning lines and one or more vertical lines separated from each other, and correction data for said interpolated scanning lines being produced by vertical interpolation on a real-time basis from the correction data of a certain number K of said correction points vertically aligned and vertically consecutive to each other;

wherein there are further provided imaginary correction scanning lines disposed above the upper edge of the raster and below the lower edge of the raster, and imaginary correction points at intersections of said imaginary correction scanning lines and said vertical lines;

said registration error correction device comprising:

a correction data memory for storing the correction data for said correction points and said imaginary correction points;

an address generator for addressing said correction data memory for the purpose of reading correction data from said correction data memory;

a coefficient generator for producing coefficients used for a vertical interpolation;

said address generator also addressing said coefficient generator to cause said coefficient generator to output coefficients according to the interpolated scanning line for which the interpolation is being conducted; and a vertical interpolator for determining the correction data for the interpolated scanning lines on the basis of said correction data from said correction data memory and said coefficient generator;

wherein the correction data for the interpolated scanning lines near the upper edge of the raster are determined by interpolation using the correction data of said correction points and of said imaginary correction points above the upper edge of the raster; and the correction data for the interpolated scanning lines near the lower edge of the raster are determined by interpolation using the correction data of said correction points and of said imaginary correction points below the upper edge of the raster.

The registration error correction device may further comprise means responsive to the correction data of the correction points for determining the correction data of the imaginary correction points by extrapolation.

With the above arrangement, the correction data for the interpolated scanning lines near the upper and lower edges are obtained by interpolation using the correction data of the correction scanning lines as well as the correction data of the imaginary correction scanning lines. Such interpolation can be effected in the same way and using the same function as the interpolation used for the determination for the correction data for the interpolated scanning lines in the central part of the raster. Accordingly, the same coefficients can be used for the central part and the parts near the upper and lower edges. The capacity of the memory storing the coefficients can therefore be reduced.

Said coefficient generator may be provided to store the coefficients for horizontal slice lines imaginarily provided between adjacent correction scanning lines. In such a case, it may be so arranged that said address generator causes, for interpolation of the correction data of each of the interpolated scanning lines, the coefficient generator to output the coefficients of the slice line closest to said each of the interpolated scanning lines; and said vertical interpolator uses the coefficients output from the coefficient generator for the interpolation.

With the above arrangement, the same set of coefficients can be used for different numbers of the interpolated scanning lines. Accordingly, the capacity of the memory storing the coefficients can be reduced.

The registration error correction device may further comprise:

- a scanning line number detector for detecting the total number of scanning lines of the input signal to said display unit. In such a case, it may be so arranged that said coefficient generator further comprises an interpolated scanning line number generator for allocating interpolated scanning lines to respective segments formed between respective pairs of adjacent correction scanning lines, on the basis of the detected total number of scanning lines; a coefficient address generator for generating an address signal for the coefficient data on the basis of the number of the interpolated scanning lines allocated to each of said segments; and a coefficient data generator for supplying coefficient data responsive to said address signal; and the interpolated scanning lines are allocated to the respective segments so as to minimize the shift of the correction scanning lines due to the change in the total number of the scanning lines.

With the above arrangement, it is possible to minimize the shift of the correction points even when the total number of the scanning lines does not have a specific relation with the number of the correction scanning lines.

According to a fourth aspect of the invention, there is provided a method of providing correction data in a registration error correction device for correcting registration error of a picture displayed on a screen of a display device using a cathode-ray tube, in which electron beams are deflected in vertical and horizontal directions by deflection means to form a raster consisting of horizontal scanning lines vertically separated from each other, said scanning lines including a first class of scanning lines, called correction scanning lines, on which correction points are positioned, and a second class of scanning lines, called interpolated scanning lines between said correction scanning lines, said correction points being positioned at intersections of said correction scanning lines and one or more vertical lines separated from each other, and correction data for said interpolated scanning lines being produced by vertical interpolation on a real-time basis from the correction data of a certain number K of said correction points vertically aligned and vertically consecutive to each other;

said correction points including a first class of correction points, called adjustment points, and a second class of correction points, called non-adjustment correction points;

said method comprising the steps of:

performing adjustment to correct registration error with respect to said adjustment points to obtain correction data for said adjustment points;

determining, by interpolation, correction data for said non-adjustment correction points;

storing the correction data for said adjustment points and said non-adjustment correction points in a correction data memory; and using the correction data for said adjustment points and said non-adjustment correction points for the interpolation of the interpolated scanning lines.

According to a fifth aspect of the invention, there is provided a registration error correction device for correcting registration error of a picture displayed on a screen of a display device using a cathode-ray tube, in which electron beams are deflected in vertical and horizontal directions by deflection means to form a raster consisting of horizontal scanning lines vertically separated from each other, said scanning lines including a first class of scanning lines, called correction scanning lines, on which correction points are positioned, and a second class of scanning lines, called interpolated scanning lines between said correction scanning lines, said correction points being positioned at intersections of said correction scanning lines and one or more vertical lines separated from each other, and correction data for said interpolated scanning lines being produced by vertical interpolation on a real-time basis from the correction data of a certain number K of said correction points vertically aligned and vertically consecutive to each other;

said correction points including a first class of correction points, called adjustment points, and a second class of correction points, called non-adjustment correction points;

said registration error correction device comprising:

means for inputting the correction data for said adjustment points;

means for determining, by interpolation, the correction data for the non-adjustment correction points on the basis of the correction data for the adjustment points;

a correction data memory for storing the correction data for said correction points;

an address generator for addressing said correction data memory for the purpose of reading correction data from said correction data memory;

a coefficient generator for producing coefficients used for the vertical interpolation;

said address generator also addressing said coefficient generator to cause said coefficient generator to output coefficients according to the interpolated scanning line for which the interpolation is being conducted; and a vertical interpolator for determining the correction data for the interpolated scanning lines on the basis of said correction data from said correction data memory and said coefficient generator.

With the above arrangement, the adjustment need to be done for part only of the correction points, so that the time required for adjustment can be reduced. This is a great advantage particularly when the adjustment is done manually, since the manual adjustment takes considerable time and skill.

The number of the correction scanning line may be n and the number of said division lines may m, and said adjustment points may be at intersections of a number i of the correction scanning lines and on a number j of the division lines, with i<m and j<n;

said registration error correction device may further comprise means for determining the $\{(i-1)\times(j-1)\}$-th-order correction function; and said means may be adapted to determine the correction data by interpolation using the said correction function.

The registration error correction device may further comprise an interpolation coefficient memory for storing the interpolation coefficients for the respective non-adjustment correction points. In such a case, it may be so arranged that said means is adapted to use said interpolation coefficients for the interpolation of the correction data of the non-adjustment correction points.

With above arrangement, the interpolation coefficients can be stored in the coefficient memory, which may comprises a ROM, so that the interpolation of the correction data of the non-adjustment correction points can be made easily.

It may be so arranged that said adjustment can be made for a selected one of a plurality of sets of adjustment points, and said device further comprises means for causing the display device to display a selected one of picture patterns each indicating one of said sets of adjustment points.

Said coefficient memory may be provided to store a plurality of sets of coefficients, each used for interpolation of the correction data of the non-adjustment correction points from the correction data of a corresponding one of the plurality of sets of adjustment points.

With the above arrangement, one of a plurality of sets of adjustment points can be selected according to the nature of the input signal, and an optimum set of the adjustment data can be provided for the particular application of the adjustment data.

The registration error correction device may further comprise:

an image pickup device for picking up at least part of the image displayed on said screen including one of said adjustment points;

an actuator for moving said image pickup device means so that the image pickup device picks up a different part of the image displayed on the screen as it is moved;

an error detector for detecting the registration error at each adjustment point on the basis of the image signal from said pickup device; and control means for adjusting correction data responsive to the output of said error detector.

With the above arrangement, the adjustment for correction of the registration error can be achieved automatically. The time and skill required for manual adjustment can therefore be eliminated.

The registration error correction device may further comprise a non-volatile memory for storing the correction data for a plurality of display modes, said non-volatile memory storing, with respect to at least some of the display mode, correction data of only the adjustment points.

With the above arrangement, the adjustment for any of a plurality of display modes can be achieved, and yet the capacity of the non-volatile memory can be reduced.

Said non-volatile memory may be adapted to store the correction data of all the correction points with respect to the remainder of the display modes.

With the above arrangement, the time for response to the power-on of the display device or the switching of the display mode with respect to the display modes for which the correction data of all the correction points are stored can be shorted. By having the non-volatile memory store the correction data for all the correction points with respect to the display modes which are frequently used, the convenience in the use of the display device is improved, without unduly increasing the capacity of the non-volatile memory.

Said non-volatile memory may have one or more first areas and one or more second areas, display modes for which the correction data of all the correction points are stored are assigned to respective ones of said first areas, display modes for which the correction data of only adjustment points are stored are assigned to respective ones of said second areas, and the correction data for each of the display modes is stored in the assigned area. In such a case it may be so arranged that when it is found that the display mode to which one of the second area is assigned is found to be used comparatively frequently, the correction data of all the correction points for said display mode are calculated by interpolation from the data of the adjustment points and stored in one of said first areas.

With the above arrangement, the convenience in the use of the display device is further improved because, with the display mode which has come to be used comparatively frequently, the correction data of all the correction points are calculated and stored in one of the first areas, so that the time for response to the power-on or switching of the display mode is reduced.

It may be so configured that the adjustment can be conducted for all the colors, to enable correction of raster distortion.

With the above arrangement, the correction of the raster distortion is possible.

The device may further comprise a grating with horizontal and vertical threads removably mounted to the screen of the display unit, with the horizontal and vertical threads so positioned that the images of the adjustment points coincide with the intersections of the horizontal and vertical threads when there is no raster distortion.

With the above arrangement, the raster distortion can be corrected accurately.

According to a sixth aspect of the invention, there is provided a registration error correction device for correcting registration error of a picture displayed on a screen of a display device using a cathode-ray tube, in which electron beams are deflected in vertical and horizontal directions by deflection means to form a raster consisting of horizontal scanning lines vertically separated from each other, said scanning lines including a first class of scanning lines, called correction scanning lines, on which correction points are positioned, and a second class of scanning lines, called interpolated scanning lines between said correction scanning lines, said correction points being positioned at intersections of said correction scanning lines and one or more vertical lines separated from each other, segments being formed between respective pairs of adjacent correction scanning lines, and correction data for said interpolated scanning lines being produced by vertical interpolation on a real-time basis from the correction data of a certain number K of said correction points vertically aligned and vertically consecutive to each other;

wherein the correction is conducted with a selected one of a plurality of correction patterns each defined by the number of the correction points in the vertical direction, and the number of the interpolated scanning lines in each segment;

said registration error correction device comprising:

means for detecting the number of the scanning lines of the signal input to the display device;

means for controlling the number of the correction points in the vertical direction;

means for controlling the number of the interpolated scanning lines between adjacent correction points;

vertical interpolation filters for calculating the correction data on the interpolated scanning lines, each of the vertical interpolation filters designed to interpolate a specific number of the interpolated scanning lines; and means for selecting one of the outputs of said digital filters according to the number of the scanning lines;

the selection of the output of the vertical interpolation filters being made such that the shifts of the positions of the correction points on the raster due to the change in the number of the scanning lines are minimized.

With the above arrangement, optimum correction against registration error can be achieved regardless of the number of the scanning lines of the input signal.

The number of the correction points in a given correction pattern may set at $$(N_{Vmin}-1) \times 2^n + 1$$

where Nvmin is a predetermined number, and n is an integer equal to or greater than "1".

With the above arrangement, the correction data for a given correction pattern can also be used as the correction data of another correction pattern having a greater number of correction points.

According to a seventh aspect of the invention, there is provided a registration error correction device for correcting registration error of a picture displayed on a screen of a display device using a cathode-ray tube, in which electron beams are deflected in vertical and horizontal directions by deflection means to form a raster consisting of horizontal scanning lines vertically separated from each other, said scanning lines including a first class of scanning lines, called correction scanning lines, on which correction points are positioned, and a second class of scanning lines, called interpolated scanning lines between said correction scanning lines, said correction points being positioned at intersections of said correction scanning lines and one or more vertical lines separated from each other, segments being formed between respective pairs of adjacent correction scanning lines, and correction data for said interpolated scanning lines being produced by vertical interpolation on a real-time basis from the correction data of a certain number K of said correction points vertically aligned and vertically consecutive to each other:

said registration error correction device comprising:

means for setting the number of the interpolated scanning lines for each of the segments, in accordance with the total number of the scanning lines; and means for interpolating the correction data of the interpolated scanning lines in each of the segments, according to the number of the interpolated scanning lines in said each of the segments.

With the above arrangement, the correction data can be determined for all the scanning lines irrespective of the total number of the scanning lines.

These and other objects of the present invention will become more readily apparent from the detailed description given hereinafter. However, it should be understood that the detailed description and specific examples, while indicating preferred embodiments of the present invention, are given by way of illustration only, since various changes and modifications with the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and there are not limitive of the present invention and wherein:

FIG. 33 is table showing an example of set of a correction coefficients used in the interpolation according to Embodiment 11;

DETAILED DESCRIPTION OF THE PREFERRED EMBODIMENTS

Various embodiments will next be described in turn. Although they are described as being adapted for convergence correction, the concepts disclosed in connection with the embodiments can also be applied for correcting raster distortion.

EMBODIMENT 1

Embodiment 1 will now be described with reference to FIG. 1 through FIG. 6.

Figure 1:
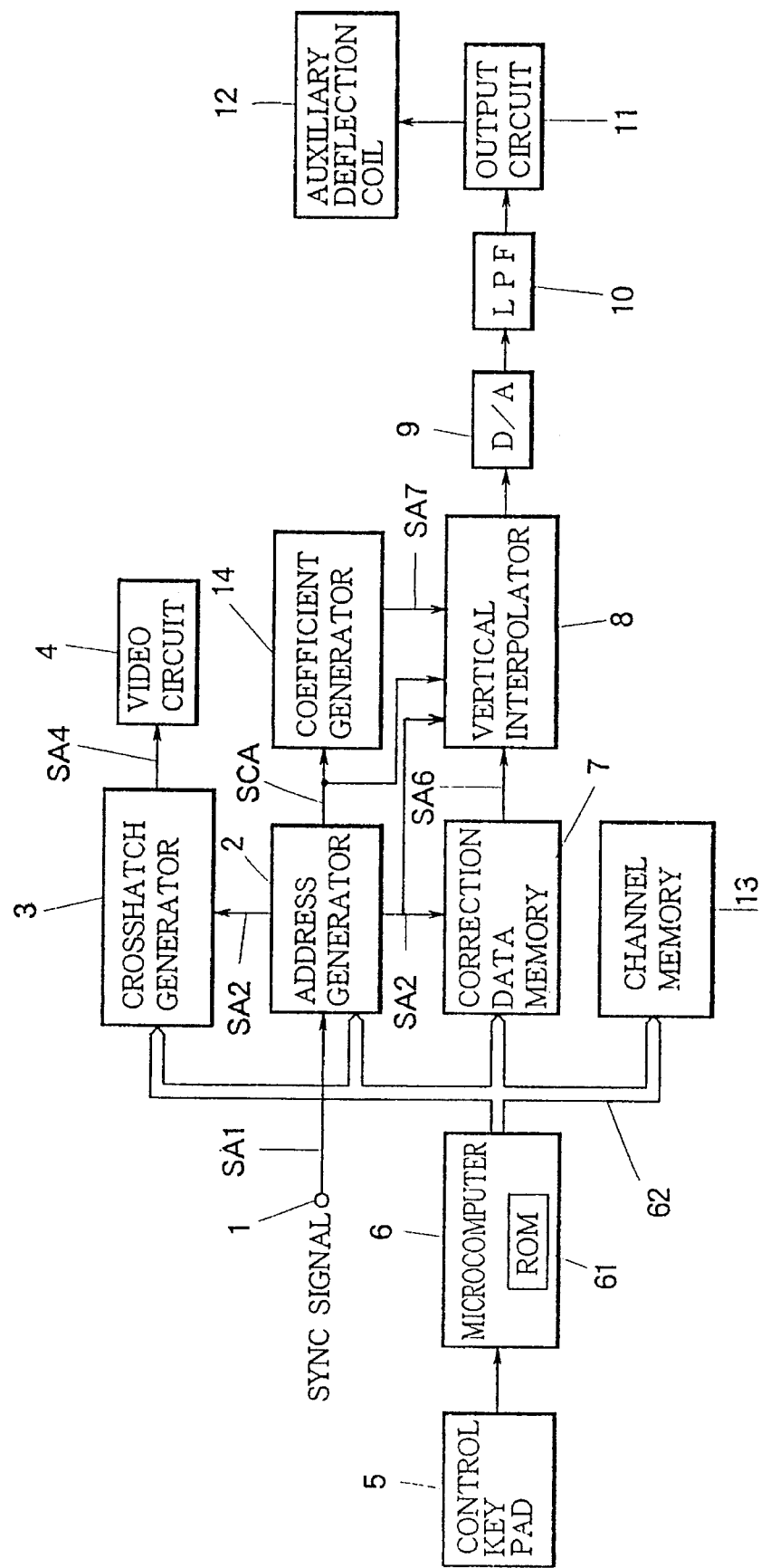
FIG. 1 is a block diagram showing a digital convergence device of Embodiment 1 of the present invention.
Figure 43:
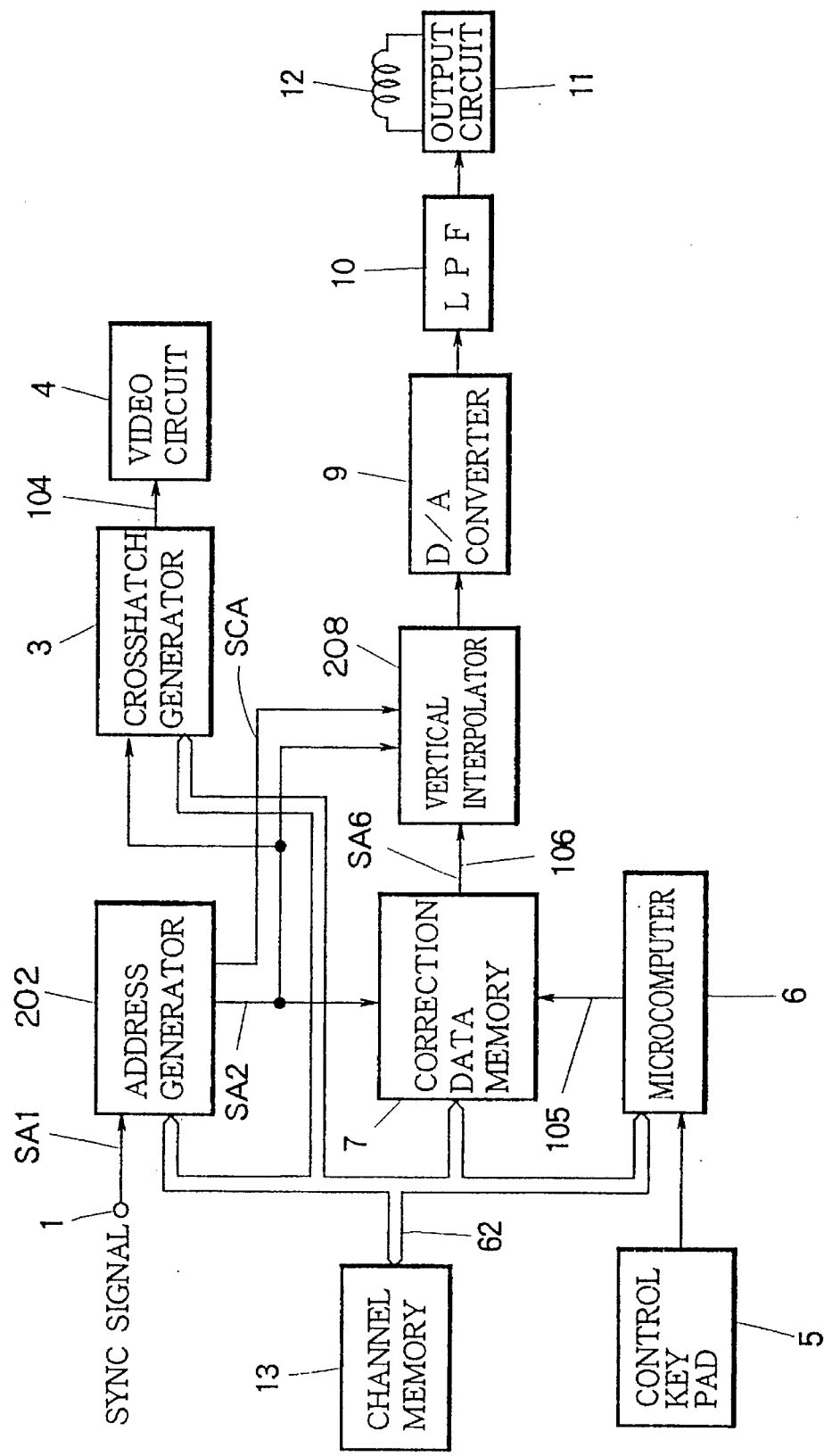
FIG. 43 is a block diagram showing a conventional digital convergence device.
Figure 44:
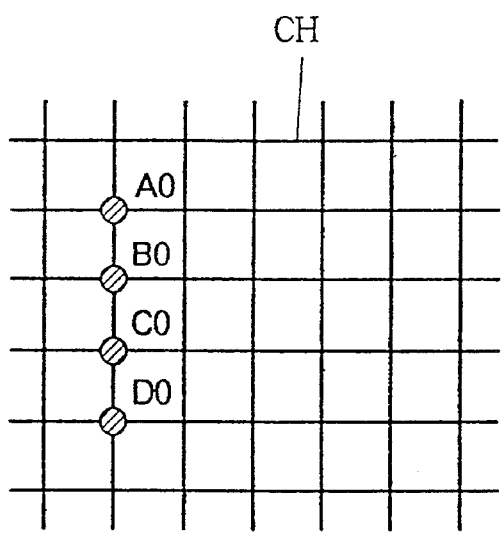
FIG. 44 is a diagram showing a crosshatch pattern and correction points for explaining the prior art example.

FIG. 1 shows an overall arrangement of a digital convergence device. The configuration shown in FIG. 1 is similar to that of the conventional device shown in FIG. 43, but a coefficient generator 14 is added and the address generator 2 supplies, in synchronism with the main deflection, a coefficient address signal SCA to the coefficient generator 14. The address generator 2 also sequentially addresses respective points along the scanning lines in the order of scanning, and addresses the correction data memory 7 for the purpose of reading the correction data from the correction data memory 7. The coefficient generator 14 receives the coefficient address signal SCA and outputs coefficient data SA7, as will be later described in further detail. The vertical interpolator 8 receives correction data SA6 from the correction data memory 2 and the coefficient data SA7 from the coefficient generator 14, and determines the correction data of interpolated scanning lines by means of vertical interpolation on the basis of the correction data SA6 and the coefficient data SA7.

Figure 2:
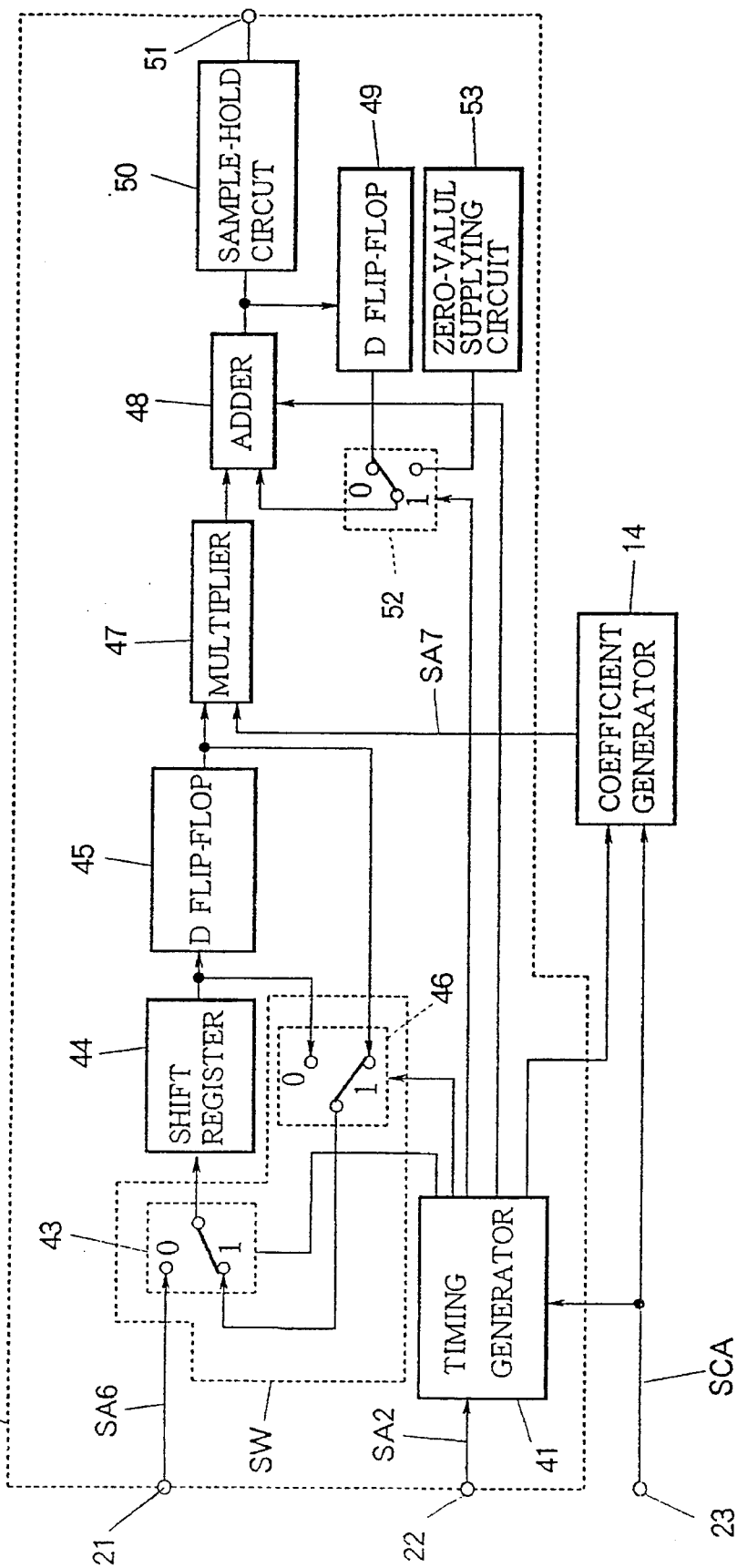
FIG. 2 is a block diagram showing a vertical interpolator of the digital convergence device of Embodiment 1.

FIG. 2 shows the configuration of the vertical interpolator 8 used in this embodiment, together with the coefficient generator 14.

The vertical interpolator 8 shown in FIG. 2 is provided with input terminals 21 and 22, a timing signal generator 41, selectors 43 and 46, and 52, a shift register 44, D flip-flops 45 and 49, a multiplier 47, an adder 48, a sample-hold circuit 50, an output terminal 51 and a zero-value supplying circuit 53. The selectors 43 and 46 in combination serve as a switching circuit SW. The shift register 44 and D flip-flops 45 and 49 each serve as a delay circuit.

Applied to the input terminal 21 is the output signal SA6 from the correction data memory 7. Applied to the input terminal 22 is the address signal SA2 from the address generator 2. The timing signal generator 41 receives the address signal SA2 form the input terminal 22 as one input thereof, and the coefficient address signal SCA (corresponding to the interpolated scanning line numbers) from the input terminal 23 as the other input thereof, and generates various timing signals. The selector 43 receives the signal applied to its input terminal 21 as one input thereof, and the output signal of the selector 46, to be described later, as the other input thereof, and is controlled by the timing signal generator 41. The shift register 44 receives the output signal of the selector 43 and delays it by one scanning period minus one clock period. The clock has a period of one fourth the period of reading from the correction data memory. That is, the correction data for the correction points is read every fourth clock. The D flip-flop 45 receives the output of the shift register 44 and delays it by one clock period.

The selector 46 receives the output signal of the shift register 44 as one input thereof, and the output signal of the D flip-flop 45 as the other input thereof, and is controlled by the timing signal generator 41. The multiplier 47 multiplies the output signal of the D flip-flop 45 by the output signal of the coefficient generator 14. The D flip-flop 49 receives the output signal of the adder 48 and delays it by one clock period. The zero-value supplying circuit 53 keeps outputting the data of the value "0". The selector 52 selects and outputs either the output of the D flip-flop circuit 49 or the output of the zero-value supplying circuit 53. The adder 48 adds the output signal of the multiplier 47 and the output signal of the selector 52. When the selector 52 selects the output of the D flip-flop 49, the adder 48 and the D flip-flop 49 determines the cumulative sum of the data supplied from the multiplier 47 to the adder 48. When the selector 52 selects the output of the zero-value supplying circuit 53, the cumulative sum is effectively reset. The operation for determining the cumulative sum is started when the selector 52 is switched from side "1" to side "0".

The sample-hold circuit 50 receives the output signal of the adder 48 and samples and holds its. The output terminal 51 is for outputting the output signal of the multiplier 48 to the D/A converter 9 (FIG. 1).

The coefficient generator 14 is provided with an input terminal 23 (see FIG. 2) for inputting the coefficient address signal SCA from the address generator 2, and generates the coefficient data SA7 on the basis of the coefficient address signal SCA supplied via the input terminal 23.

Figure 3:
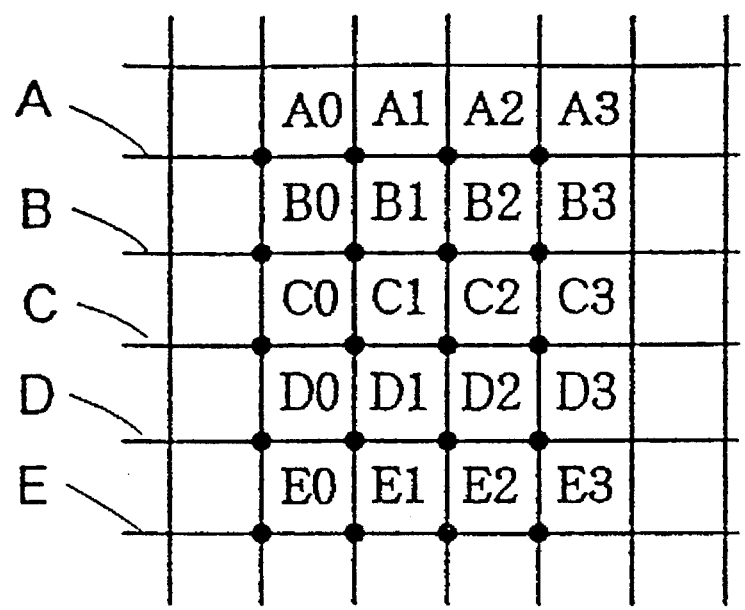
FIG. 3 shows the relationship between a crosshatch pattern and correction points.

The vertical interpolation employed in this embodiment will next be described with reference to FIG. 2 and FIG. 3. FIG. 3 shows the relationship between the crosshatch pattern and the correction points. The correction values of the correction points A0, A1, ... are denoted by a0, a1, ..., the correction values of the correction points B0, B1, ... are denoted by b0, b1, ..., the correction values of the correction points C0, C1, ... are denoted by c0, c1, ..., and the correction values of the correction points D0, D1, ... are denoted by d0, d1, .... Where a third-order curve is employed for the vertical interpolation, the correction values of an interpolated scanning line between the correction points B0 and C0 are given by:

$$M0n \times a0 + M1n \times b0 + M2n \times c0 + M3n \times d0 \qquad (2)$$

where $M0n$, $M2n$ and $M3n$ are tap coefficients of a digital filter used for interpolating n-th interpolated scanning line (n corresponds to the coefficient address) by means of a third-order curve.

The operation of the vertical interpolation will next be described in further detail with reference to FIG. 2 and FIG. 4. The correction value of the n-th interpolated scanning line as counted from the upper edge of the segment between the points B0 and C0 is given by the above expression (2), using the correction data a0, b0, c0, and d0 on the correction scanning line A, B, C and D and the coefficients $M0n$, $M1n$, $M2n$ and $M3n$.

Figure 5:
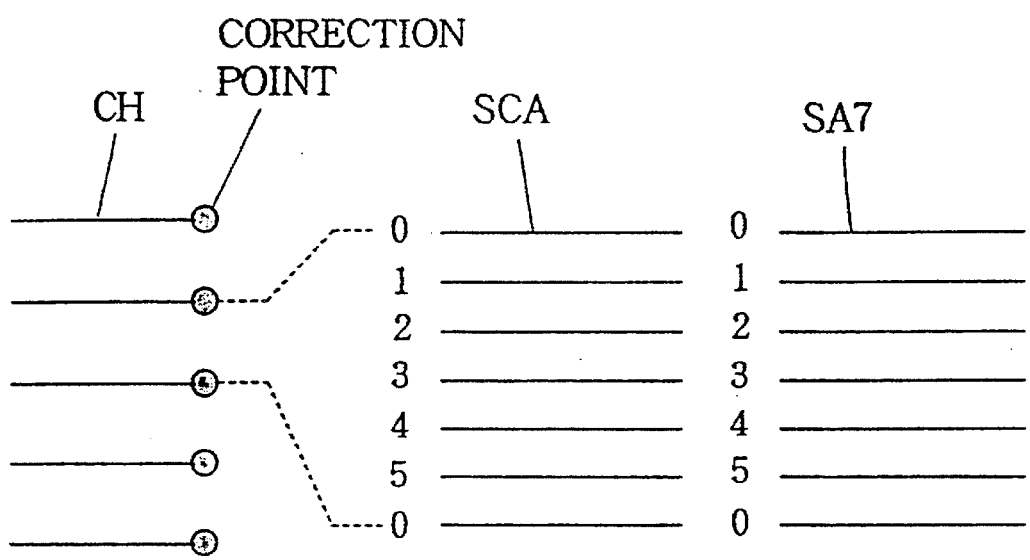
FIG. 5 shows the relationship between interpolated scanning lines and coefficient data.

The tap coefficients $M0n$, $M1n$, $M2n$ and $M3n$ for each of the 0-th to (N–1)-th interpolated scanning lines are stored in the coefficient generator 14 (comprising for example a ROM) as shown in FIG. 5, where N is assumed to be 6. It is noted here that the 0-th interpolated scanning line is in fact not an "interpolated" scanning line, but a scanning line having correction points on it. But it is treated as an interpolated scanning line, and the coefficients used for interpolation are so set that the correction data on the 0-th interpolated scanning line is determined solely on the basis of the correction data of the correction points on the same scanning line.

The vertical interpolator 8 operates by the clock having a period of one fourth the period of reading the correction data memory 7. The selector 43 is switched to the side "0" to select the data SA6 once every forth clock while the address signal SA2 is addressing a correction scanning line, and is kept switched to the side "1" to select the output of the selector 46 at other times. The selector 46 is switched to side "1" to select the output of the D flip-flop 45 when the address signal SA2 is addressing an interpolated scanning line, and is switched to side "0∞ to select the output of the shift register 44 when the address signal SA2 is addressing a correction scanning line.

The function of the switching circuit SW as a whole is therefore to receive the correction data via the input terminal 21, the output of the shift register 44, and the output of the D flip-flop 45. Furthermore, the switching circuit SW functions to repeatedly select, when the address generator is addressing the correction scanning lines, the correction data for one clock period every K switching clock periods; to select and the output of the shift register for the remaining (K–1) clock periods every K clock periods; and to select the output of the D flip-flop 45 when the address generator is addressing the interpolated scanning lines.

The selector 52 is normally switched to side "0" to select the output of the D flip-flop 49, and is switched to side "1" to select the output of the zero-value supplying circuit 53 when it is desired to reset the cumulative sum as was earlier mentioned.

Figure 4:
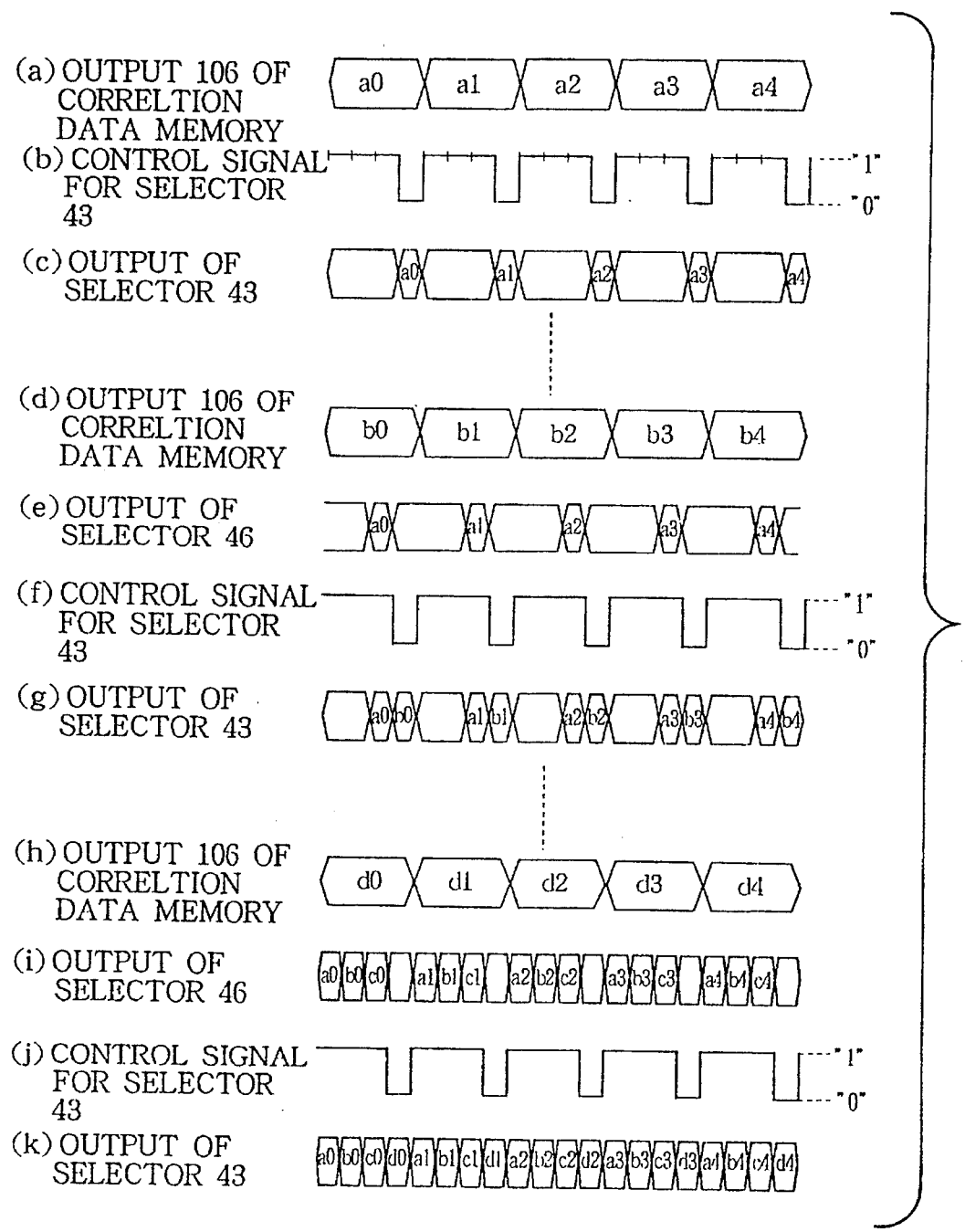
FIG. 4 is a timing chart showing the operation of the convergence device of Embodiment 1.

More specifically, while the data of a correction scanning line on which correction points, e.g., A0, A1, A2, A3, ... lie are being read out, switching is performed as shown in FIG. 4 at (b). The output of the selector 43 is delayed by the shift register 44 by one scanning line period minus one clock period, and is then delayed further by the D flip-flop 45 by one clock period. The output of the shift register 44 is called first delayed data, while the output of the D flip-flop 45 is called second delayed data. Thus, the data selected by the selector 46 is the first delayed data delayed by one scanning line period minus one clock period when it is switched to side "0" and is the second delayed data delayed by one scanning line period when it is switched to side "1".

Referring further to FIG. 4, when the address generator 2 is addressing data a0, a1, a2, a3, ... of a correction scanning line A on which correction points A0, A1, A2, A3, ..., lie, the selector 43 is controlled as in FIG. 4 at (b) yielding an output such as in FIG. 4 at (c). At the moment, the selector 46 is kept switched to side "0".

When the interpolated scanning lines are subsequently being addressed, both the selectors 43 and 46 are switched to side "1". Accordingly, the same data are circulated through the selector 43, the shift register 44, the D flip-flop 45 and the selector 46. The period of this circulation is equal to one scanning period. These circulation continues until the subsequent correction scanning line on which the correction points B0, B1, B2, B3, . . . lie is addressed.

When the data of correction scanning line B on which correction points B0, B1, B2, B3, . . . lie are addressed, the selector 46 is switched to side "0". The output signal of the selector 46 will therefore be as shown in FIG. 4 at (e). At the same time, the selector 43 is switched to side "0" every fourth clock so that its output is as shown in FIG. 4 at (g).

Similar operations are thereafter repeated. When the correction scanning line with the correction points D0, D1, D2, D3, . . . is being addressed, a succession of correction data a0, b0, c0 and d0; a1, b1, c1 and d1; a2, b2, c2 and d2; and so on are obtained and circulated until the data of the correction points are addressed.

Figure 6:
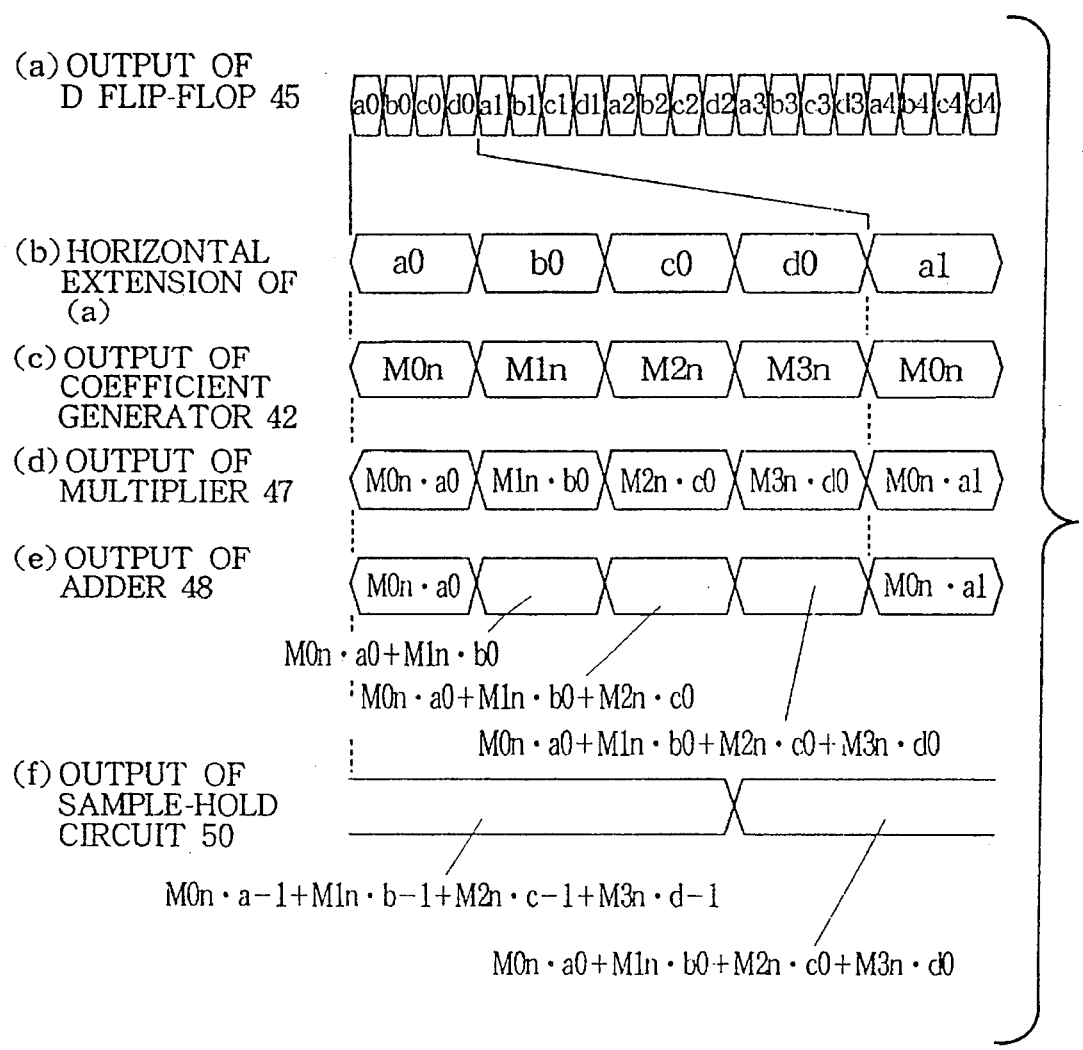
FIG. 6 is a timing chart showing the operation of the device of Embodiment 1.

The above-described succession of correction data are used for the determining the data of the interpolated scanning lines between the correction scanning lines B and C, in the manner described next with reference to FIG. 2 and FIG. 6.

When the output of the D flip-flop 45 is a0, it is multiplied by the coefficient M0n from the coefficient generator 14, that is, M0n×a0 is calculated at the multiplier 47. When the input to the adder 48 is M0n×a0, the output of the adder 48 is also M01×a0. This is because the selector 52 is switched to side "1" to select the output of the zero-value supplying circuit 53. When the output of the D flip-flop 45 is b0, it is multiplied by the coefficient M1n from the coefficient generator 14, that is, M1n×b0 is calculated at the multiplier 47. By then the selector 52 is switched to side "0" to select the output of the D flip-flop 49. The adder 48 therefore adds the output of the D flip-flop 49, that is, M0n×a0 which was obtained in the multiplication a clock before, to the output of the multiplier 47, M1b×b0, to provide M0n×a0+M1n×b0. Similar operations are thereafter repeated. When d0 is output from the D flip-flop 45, the cumulative sum:

M0n×a0+M1n×b0+M2n×c0+M3n×d0 appears at the output of the adder 48. This is identical to expression (2). Before the cumulative sum of the above expression is output, the following sums successively appear at the output of the adder 48.

*M0n* × *a0*
*M0n* × *a0* + *M1n* × *b0*
*M0n* × *a0* + *M1n* × *b0* + *M2n* × *c0*

These are not sampled by the sample-hold circuit 49, but only the sum given by the expression (2) is sampled and output via the output terminal 50. This cumulative sum is the result of the curvilinear interpolation for the n-th interpolated scanning line on the basis of correction data a0, b0, c0 and d0 of the correction points A0, B0, C0 and D0. Once the cumulative sum:

M0n×a0+M1n×b0+M2n×c0+M3n×d0 is obtained, the selector 52 is switched to side "1" to reset its the cumulative sum.

Similar calculation is performed on the basis of the next set of correction data a1, b1, c1 and d1. That is, the correction data a1, b1, c1 and d1 are sequentially output from the D flip-flop 45. The switch is switched to side "1" at the amount when a1 is being supplied to reset the cumulative sum. The moment the supply of correction data b1 begins, the selector 52 is switched back to side "0". In this way, while a1, b1, c1 and d1 are sequentially supplied, the same operation as described above is executed to provide M0n×a1+M1n×b1+M2n×c1+M3n×d1

Similar calculation is performed on the basis of other sets of the correction data: e.g., a2, b2, c2 and d2; a3, b3, c3 and d3; to obtain the succession of the correction data for the n-th interpolated scanning line. That is, the cumulative sum is reset every four clocks to provide M0n×a2+M1n×b2+M2n×c2+M3n×d2, M0n×a3+M1n×b3+M2n×c3+M3n×d3, and so forth.

Similar calculation is performed for all the interpolated scanning lines. Different sets of coefficients M0n, M1n, M2n and M3n are used for different interpolated scanning lines. The number of the interpolated scanning line of which the correction data being determined is known in accordance with the signal from the timing generator 41.

Similar operation is performed for determining the correction values on the interpolated scanning lines in other segments.

For instance to determine the correction values on the interpolated scanning lines in the segment between the correction scanning lines C and D, the correction data scanning line on which the correction points E0, E1, E2 and E3 lie is being addressed, as shown in FIG. 4 at (K) the D flip-flop 45 outputs correction data b0, c0, d0, e0, b1, c1, d1, e1, b2, c2, d2, e2, . . . of the correction points B0, C0, D0, E0, B1, C1, D1, E1, B2, C2, D2, E2, . . . are used, and the operations similar to those described above are performed to obtain the cumulative sums:

$M1n \times b0 + M2n \times c0 + M3n \times d0 + M4n \times e0$
$M1n \times b1 + M2n \times c1 + M3n \times d1 + M4n \times e1$
$M1n \times b2 + M2n \times c2 + M3n \times d2 + M4n \times e2$
$M1n \times b3 + M2n \times c3 + M3n \times d3 + M4n \times e3$ and so forth.

The result of the vertical interpolation is D/A converted by the D/A converter 9, passed through the LPF 10, and applied via the output circuit 11 to the auxiliary deflection coil 12, in the same way as in the prior art example.

If, for example, the number of the correction points in the horizontal direction is 32, the shift register 44 must have 127 stages, which is 32×4−1. This is because a succession of four correction data, e.g., a0, b0, c0 and d0, are passed through the shift register 44 and other related circuits for vertical interpolation for a correction point corresponding to each correction point on the correction scanning line.

The scanning lines are addressed in succession. As the scanning line D is being addressed, the correction values of the interpolated scanning lines between the correction scanning lines B and C are obtained. That is, there is some delay of more than one scanning line period in the production of the correction values. The correction values of each correction scanning line is obtained at the output of the correction data memory 7, and can therefore be output at the same time as the correction scanning line is being addressed. The correction values of the correction scanning lines must however be placed in the appropriate position in the succession of the correction values before they are input to the D/A converter 9. This can be achieved in either of the two ways described next.

In a first method, the calculation similar to the vertical interpolation calculation is performed, but the coefficients used for the calculation are so set that the correction data on the correction scanning line, which is taken as "0-th interpolated scanning line" is determined solely on the basis of the correction data of the correction points on the same scanning line.

That is, the coefficient multiplied by the correction data of the correction scanning line to be output is set at "1", while the other coefficients are set at "0". The correction data on the correction scanning line B are output using the same calculation $$M0n \times a0 + M1n \times b0 + M2n \times c0 + M3n \times d0$$

as the vertical interpolation for determining the correction data on the interpolated scanning lines between the correction scanning lines B and C, and setting the coefficient M1n at "1" and other coefficients M0n, M2n and M3n at "0".

Figure 7:
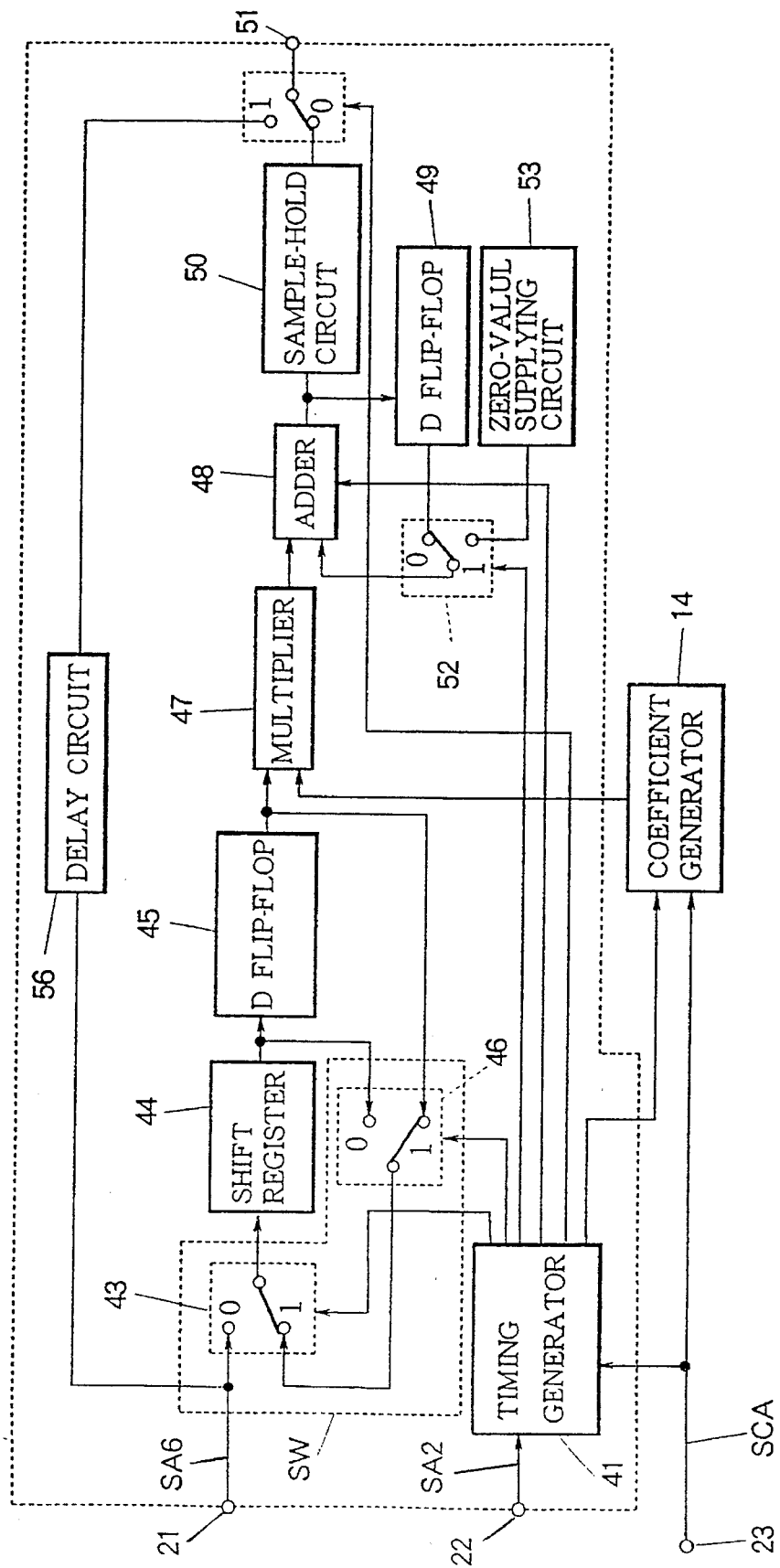
FIG. 7 is a block diagram showing an example of a modification of the vertical interpolator which may be substituted in Embodiment 1.

An alternative way to place the correction data of the correction scanning lines at proper positions in the succession of the interpolated correction data is to use a configuration shown in FIG. 7 in place of the configuration shown in FIG. 2.

The vertical interpolator 8 shown in FIG. 7 is similar to that of FIG. 2, but it is additionally provided with a delay circuit 56 and a selector 55. The delay circuit 56 has a delay time corresponding to the time interval that is elapsed form the time when a correction scanning line, e.g., line B, is scanned to the time when the next but one correction scanning line, D, is scanned. The selector 55 usually is switched to side "0" to select the output of the sample-hold circuit 50, but it is switched to side "1" to select the output of the delay circuit 56 when a correction scanning line is being addressed. With this arrangement, output of the delay circuit 56, e.g., the correction data for the scanning line B, is inserted before the correction data for the interpolated scanning lines between the correction scanning lines B and C.

In the above arrangement, the output signal of the D flip-flop 45 is input to the multiplier 47. But, in place of the output signal of the D flip-flop 45, any of the output signal of the selector 43, the output of the shift register 44 and the output of the selector 46 may be applied to the multiplier 47, and yet a similar result is obtained.

In the above arrangement, interpolation calculation is performed on the basis of four successive correction points aligned in the vertical direction. However, the number of correction points used for the vertical interpolation may be other than four. If K correction points (K being a positive integer not less than four) are used for the vertical interpolation, the vertical interpolator operates with a clock which is K times rate of reading of the correction data from the correction data memory 7.

In the embodiment described, the combination of the shift register 44 and the D flip-flop 45 are used to produce the first and second delayed data. The combination may be replaced by separate delay circuits, both receiving the output of the selector 43, and respectively producing the first and second delayed data.

In the illustrated embodiment, the switching circuit SW comprises the combination of the selectors 43 and 46. But it is configured differently as long as it can perform the desired function. The function of the switching circuit SW as a whole is to receive the correction data from the correction data memory and the first and second delayed data, to repeatedly select, when the address generator addresses the correction scanning lines, the correction data for one clock period every K switching clock periods, and the first delayed data for the remaining (K–1) clock periods every K clock periods, and to select the second delayed data when the address generator addresses the interpolated scanning lines.

EMBODIMENT 2

In the first embodiment, curvilinear interpolation of third order is applied to all over the raster. However, if the circuit shown in Embodiment 1 us used for calculation of correction values of interpolated scanning lines at the upper end part of the raster, e.g. between the first and second correction scanning lines as counted from the upper edge of the raster, part of the correction data used for the vertical interpolation are of the correction points, A0, at the lower end of the preceding field, while the rest of the correction data (B0, C0, D0) used are of the same raster. The correction data at the lower end of the preceding field are not correlated with the correction data on the interpolated scanning lines between the correction scanning lines B and C in FIG. 8. Similarly, the correction data, D0, of the upper end of the succeeding field are used for the determination of the correction data between the first and second correction scanning lines, C and B, from the bottom of the raster, as shown in FIG. 9. As a result, the accuracy of the vertical interpolation is low at the upper and lower end parts of the raster.

Embodiment 2 is addressed to this problem, and enables accurate vertical interpolation even at the top and bottom parts of the raster.

Figure 10:
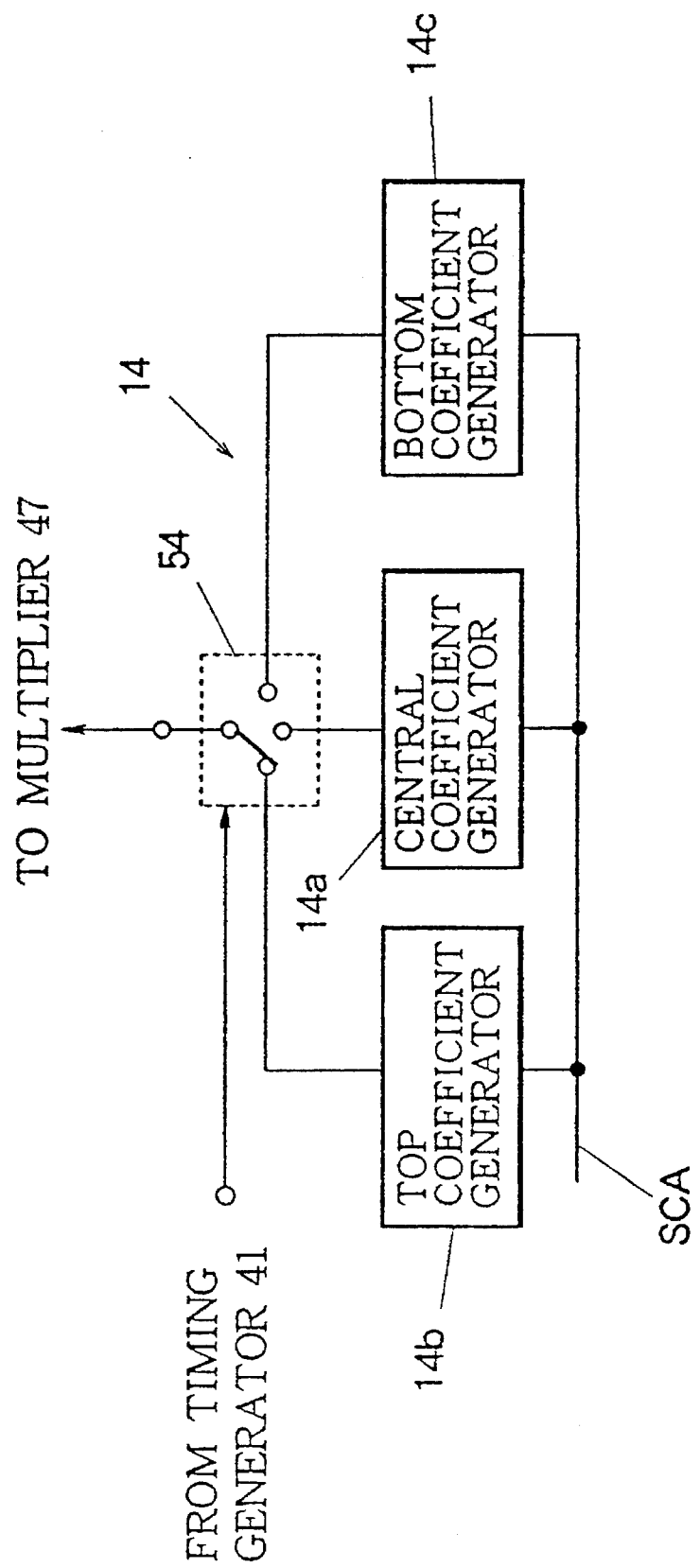
FIG. 10 is a block diagram showing a coefficient generator used in Embodiment 2.

FIG. 10 shows a coefficient generator 14 used in this embodiment. As illustrated, it comprises a central coefficient generator 14a, a top coefficient generator 14b, a bottom coefficient generator 14c and a selector 54. The coefficients generated from the central coefficient generator 14a are identical to those generated from the coefficient generator 14 in FIG. 1, and are used to perform third-order curvilinear interpolation. The coefficients generated from the top and bottom coefficients generators 14b and 14c are ones suitable for second-order curvilinear interpolation. More specifically, the coefficients generated from the top coefficient generator 14b are suitable for interpolation of the interpolated scanning lines between the first and second correction scanning lines as counted from the top of the raster on the basis of the correction data on the first, second and third correction scanning lines as counted from the top of the raster. The coefficients generated from the bottom coefficient generator 14c are suitable for interpolation of the interpolated scanning lines between the first and second correction scanning lines as counted from the bottom of the raster on the basis of the correction data on the first, second and third correction scanning lines as counted from the bottom of the raster. Each of the central, top and bottom coefficient generators 14a, 14b and 14c receives the coefficient address signal SCA via the input terminal 23. The selector 54 receives the output signals of the central, top and bottom coefficient generators 14a, 14b and 14c, and is controlled by the timing signal generator 41. The output signal of the selector 54 is input, as an output of the coefficient generator 14, to the multiplier 47 in the vertical interpolator 8.

The operation of this embodiment will now be described. When the interpolated scanning lines are in the central part of the raster (in the part other than the top and bottom part, i.e., other than the segments between the first and second correction scanning lines from the top of the raster or the segment between the first and second correction scanning lines from the bottom of the raster) as shown in FIG. 3, then the selector 54 selects the output of the central coefficient generator 14a. The coefficients generated from the central coefficient generator 14a are identical to those generated from the coefficient generator 14 in FIG. 1, so that the result of the vertical interpolation performed using the coefficients from the central coefficient generator 14a is identical to that described in connection with Embodiment 1. That is, the vertical interpolation is a third-order curvilinear interpolation in accordance with:

$$M0n \times a0 + M1n \times b0 + M2n \times c0 + M3n \times d0 \quad (2)$$

Figure 8:
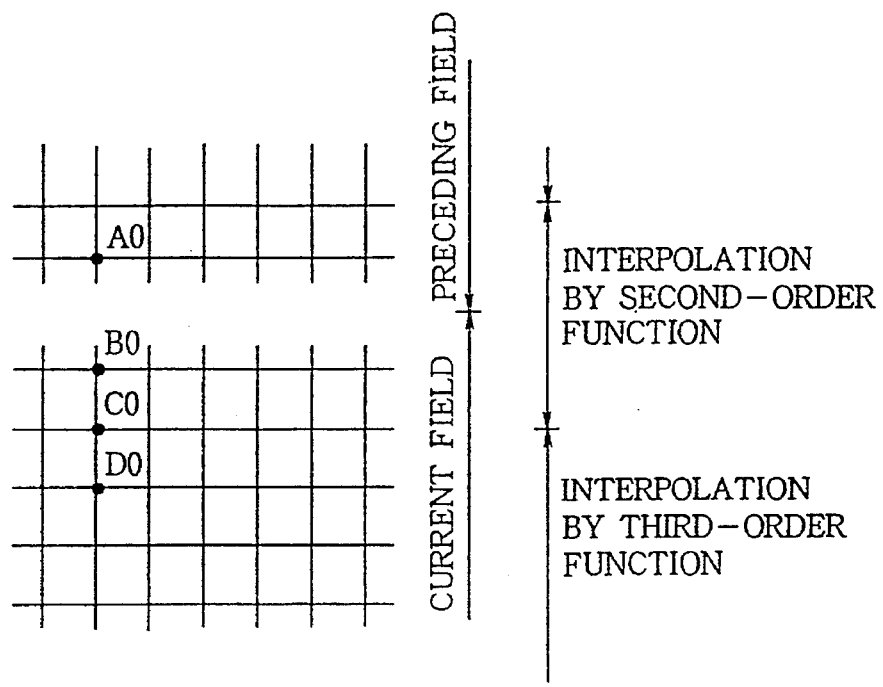
FIG. 8 is a diagram illustrating the problems of Embodiment 1, and showing a crosshatch pattern and correction points in the top of the raster.
Figure 9:
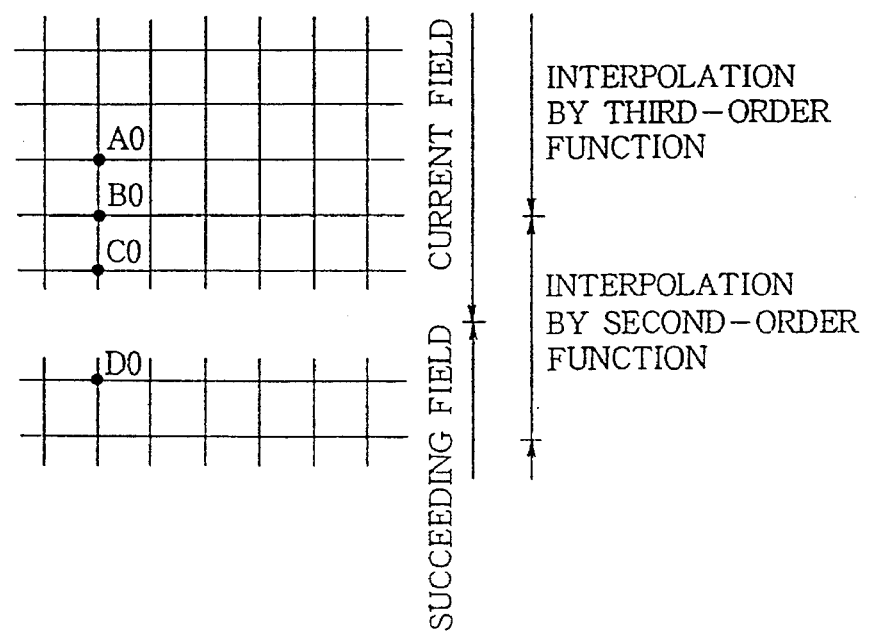
FIG. 9 is a diagram illustrating the problems of Embodiment 1 and showing a crosshatch pattern and correction points in the bottom of the raster.

When the interpolated scanning lines are at the top part of the raster, i.e., between the first and second correction scanning lines from the top as shown in FIG. 8, the selector 54 selects the output of the top coefficient generator 14b. The interpolation is performed in accordance with the following expression $$0 \times a0 + H1n \times b0 + H2n \times c0 + H3n \times d0$$

where H1n, H2n and H3n are tap coefficients of a digital filter for calculating the correction values of the n-th interpolated scanning line between the correction points B0 and C0 on the basis of data b0, c0 and d0 by means of second-order curvilinear interpolation. By the use of the interpolation on the basis of the correction data within the same field, the accuracy of the interpolation is improved, and the accuracy of the correction is therefore improved.

When the interpolated scanning lines are at the bottom part of the raster, i.e., between the first and second correction scanning lines from the bottom as shown in FIG. 9, the selector 54 selects the output of the bottom coefficient generator 14c. The interpolation is performed in accordance with the following expression $$L0n \times a0 + L1n \times b0 + L2n \times c0 + 0 \times d0$$

where L0n, L1n and L2n are tap coefficients of a digital filter for calculating the correction values of the n-th interpolated scanning line between the correction points B0 and C0 on the basis of data a0, b0 and c0 by means of second-order curvilinear interpolation. By the use of the interpolation on the basis of the correction data within the same field, the accuracy of the interpolation is improved, and the accuracy of the correction is therefore improved.

Thus, convergence correction can be performed with precision even at the end parts of the raster by selectively employing third-order curvilinear interpolation and second-order curvilinear interpolation depending on the position within the raster of the interpolated scanning lines.

EMBODIMENT 3

Figure 11:
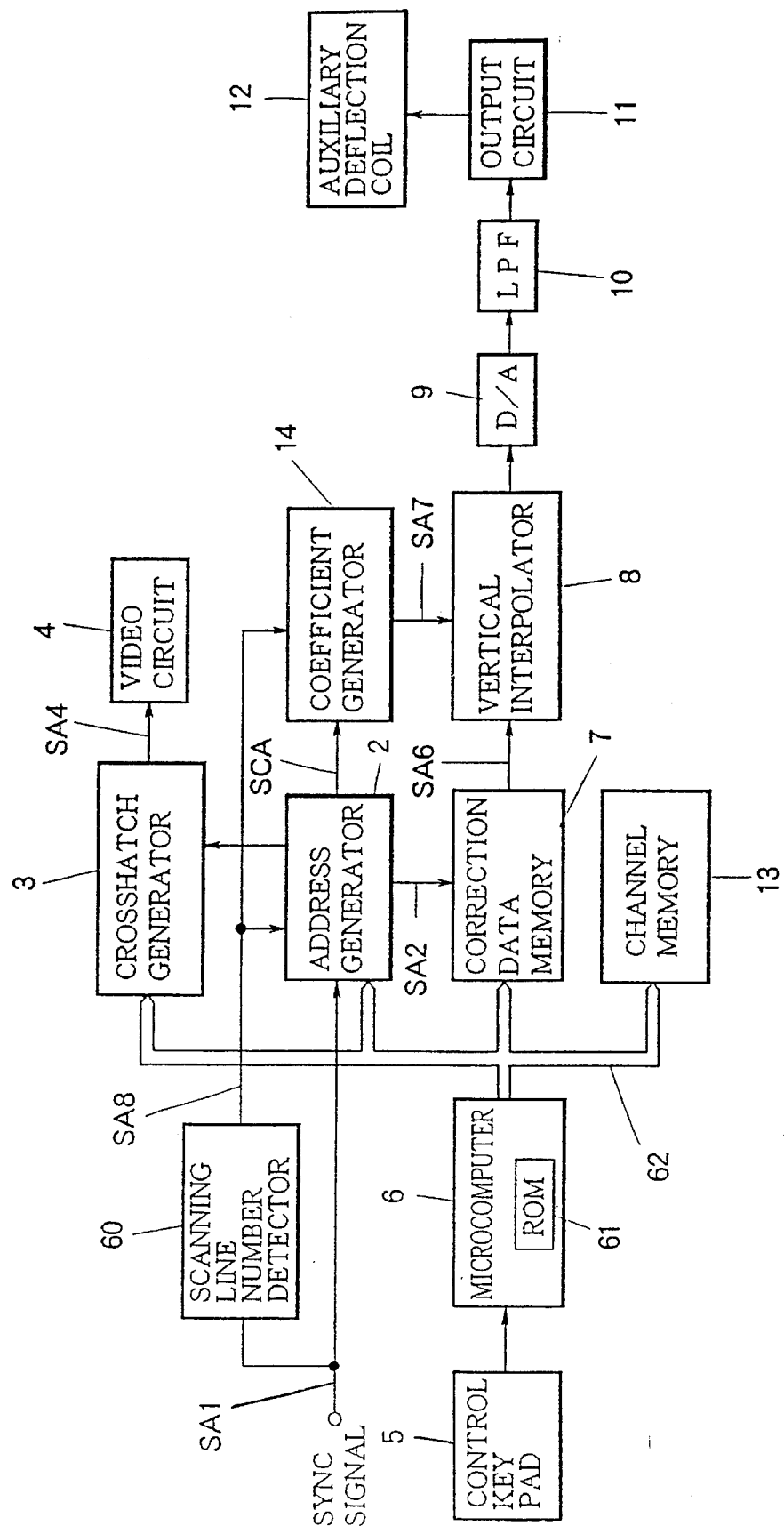
FIG. 11 is a block diagram showing a digital convergence device of Embodiment 3.

In the description of Embodiment 1, it is assumed that the number of the scanning lines of an input image signal is constant. Embodiment 3 provides a convergence device which can cope with change in the number of scanning lines. FIG. 11 shows a digital convergence device according to Embodiment 3. In FIG. 11, elements denoted by the same reference numerals as those in FIG. 1 are identical or correspond to those in FIG. 1. An additional element is a scanning line detector 60 responsive to a synchronous signal SA1 for detecting the number of the scanning lines. The scanning line number data SA8 obtained as a result of the detection is supplied to the address generator 2 and the coefficient generator 14. When the number of the scanning lines is changed, the number of the interpolated scanning lines is changed accordingly in the address generator 2 in such a manner as to minimize the change in the positions of the correction points on the raster.

The coefficient generator 14 has a plurality of sets of coefficients for respective numbers of the interpolated scanning lines, and selects one of the sets according to the scanning line number data SA8 and outputs the selected set of the coefficients to the multiplier 47. In other respects, this embodiment is the same as Embodiment 1.

EMBODIMENT 4

In the above embodiments, the vertical interpolator 8 comprises the selector 43, the shift register 44, the D flip-flop 45 and the selector 46, to rearrange the output signals SA6 from the correction data memory 7 into the sequence suitable for determining the cumulative sum for the purpose of the vertical interpolation.

Figure 12:
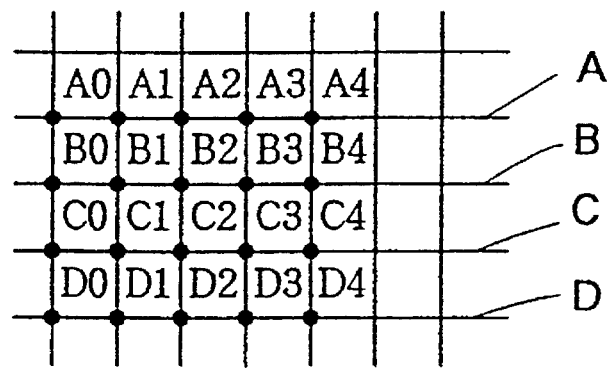
FIG. 12 is a diagram showing a crosshatch pattern with correction points for explaining Embodiment 4.
Figure 13:
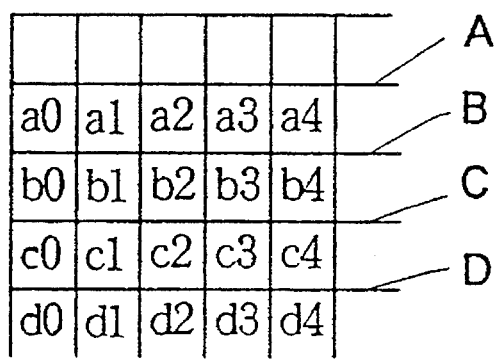
FIG. 13 is a diagram showing a crosshatch pattern with correction points for explaining Embodiment 4.
Figure 14:
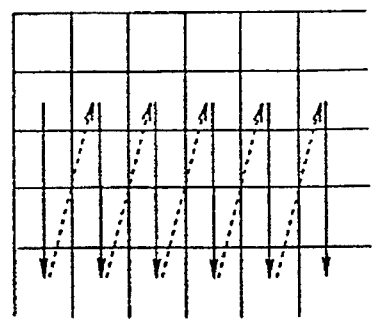
FIG. 14 is a diagram showing a sequence of reading data from the correction data memory in Embodiment 4.
Figure 15:
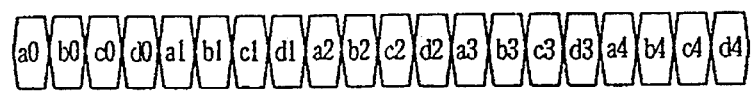
FIG. 15 is a diagram showing a sequence of correction data from the correction data memory in Embodiment 4.

The rearranging can be achieved by addressing the correction data memory 7 in the sequence of the correction data which can be used directly for the vertical interpolation. The configuration of the entire convergence circuit may be identical to that in FIG. 1. However, the order of reading the correction data from the correction data memory 7 is different. This will be described with reference to FIG. 12, FIG. 13, and FIG. 14. Let us assume that the correction data of the correction points A0, A1, ..., B0, B1, ..., C0, C1, ..., D0, D1, ... in FIG. 12 are a0, a1, ..., b0, b1, ..., c0, c1, ..., d0, d1, ... as shown in FIG. 13. For interpolating the scanning lines between the correction scanning lines B and C, the correction data are read in the order of a0, b0, c0, d0, a1, b1, c1, d1, a2, b2, c2, d2, ..., as shown in FIG. 14 and FIG. 15. To generalize, the correction data are read column by column, each column consisting of K correction points (k being "4" in the example under consideration) vertically consecutive and vertically aligned with each other, and including the correction points above and below the segments.

Figure 16:
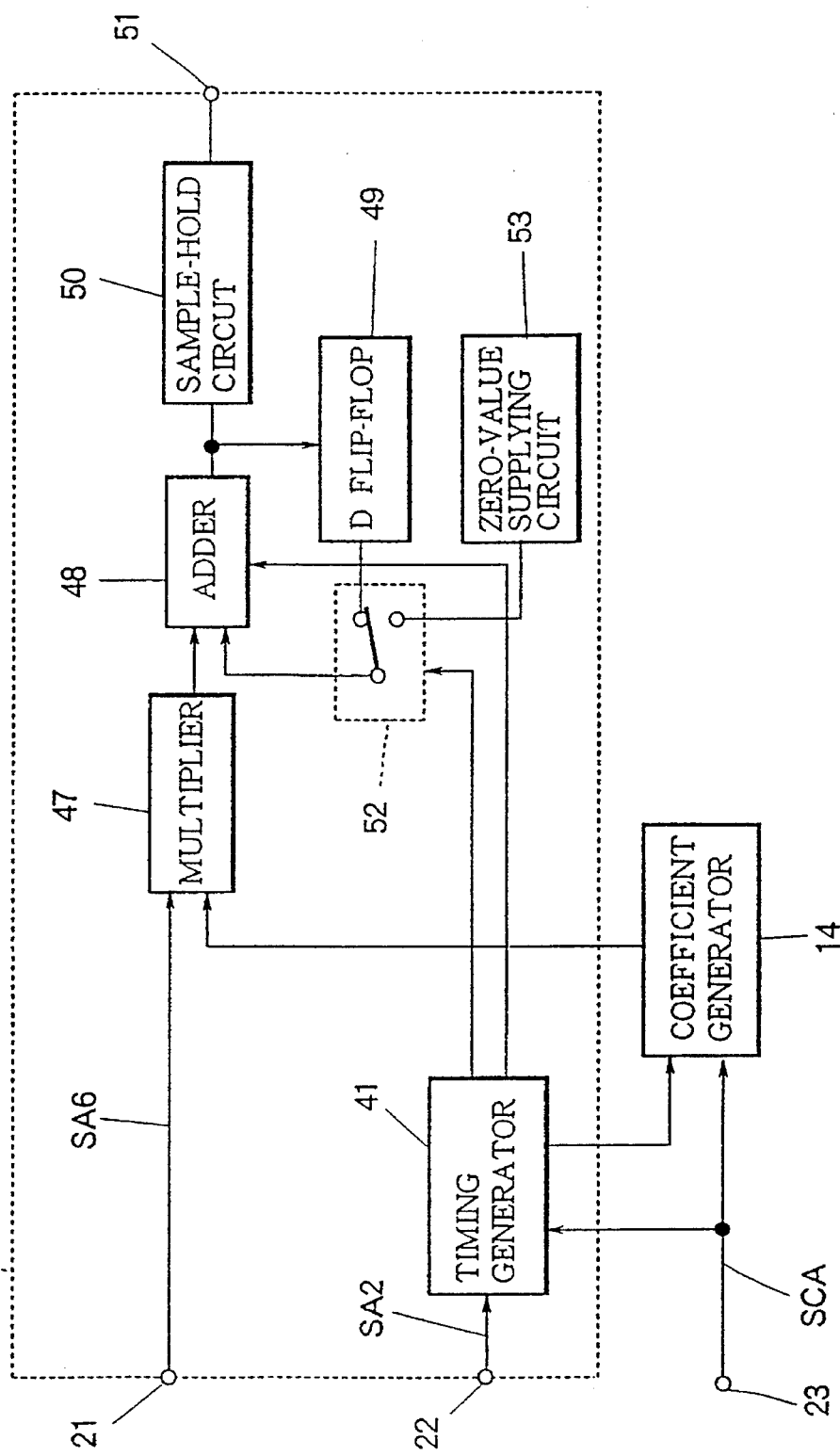
FIG. 16 is a block diagram showing a vertical interpolator used in Embodiment 4.

This sequence of the correction data is identical to that obtained at the output of the D flip-flop 45 in the example of FIG. 2. It will therefore be appreciated that the selector 43, the shift register 44, the D flip-flop 45 and the selector 46 in FIG. 2 may be omitted, and the correction data SA6 output from the correction data memory 7 may be applied directly to the multiplier 47. As a result, the configuration of the vertical interpolator 8 may be as shown in FIG. 16.

The operation for determining the cumulative sum for the vertical interpolation by means of the multiplier 47, the adder 48, the D flip-flop 49 and the selector 52, and the like is identical to that described with reference to FIG. 2.

The modifications described with reference to Embodiments 2 and 3 may also be applied to Embodiment 4.

EMBODIMENT 5

In Embodiment 2, three coefficient generators 14a, 14b and 14c each comprising a memory storing the coefficients are required to avoid the use of the correction data of a different fields for the vertical interpolation. The total capacity of the memories constituting the coefficient generators 14a, 14b and 14c is three times that of the coefficient memory 14 of Embodiment 1.

The embodiments described below are addressed to this problem. First Embodiment 5 is described. The configuration used in this embodiment may be identical to that of Embodiment 1 shown in FIG. 1 and FIG. 2. The difference from Embodiment 1 are the contents of the correction data and the manner of determining them. Specifically, the contents of the correction data used for the interpolation to determine the correction data in the central part of the raster (the part of the raster other than the segment between the first and second correction scanning lines from the top of the raster and the segment between the first and second correction scanning lines from the bottom of the raster, where the interpolation employed is a third-order curvilinear interpolation), and the manner of determining such correction data are the same as those for Embodiment 1.

In this embodiment, the correction data for an imaginary correction scanning line which are imagined to lie outside the raster are calculated and stored in the correction data memory 7 at the time of the convergence adjustment. In use of the display, the correction data for the top and bottom parts of the raster are obtained by the same operation as that for the central part of the raster using the correction data for the imaginary correction scanning lines.

Figure 17:
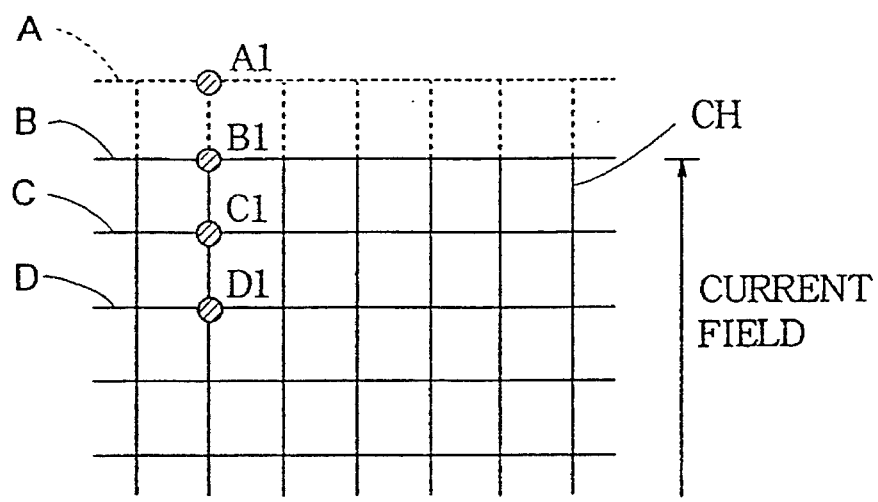
FIG. 17 is a diagram showing a crosshatch pattern, correction points within the raster, and imaginary correction points above the upper edge of the raster used in Embodiment 5.
Figure 18:
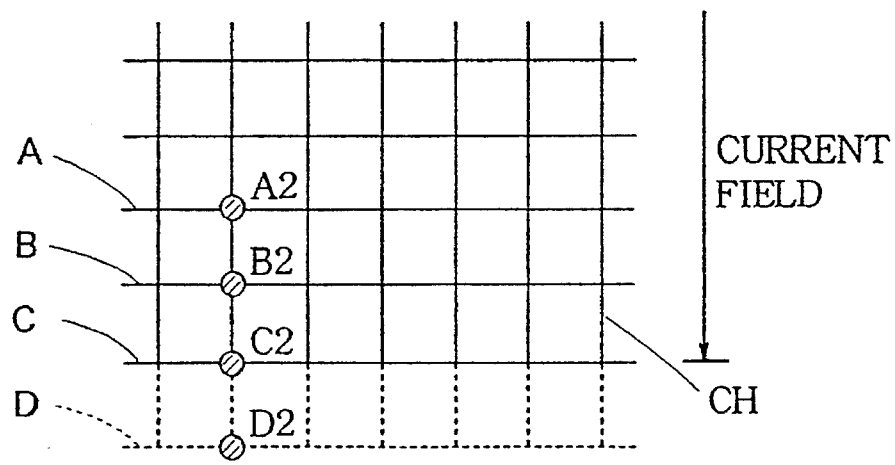
FIG. 18 is a diagram showing a crosshatch pattern, correction points within the raster, and imaginary correction points below the lower edge of the raster used in Embodiment 5.

In FIG. 17, the symbols "B", "C" and "D" indicate correction scanning line actually existing within the raster, and the symbol "A" indicates an imaginary correction scanning line. As described above, the correction data of the correction scanning lines "B", "C", "D", etc. can be obtained through convergence adjustment. On the other hand, in this embodiment, the correction data, e.g., al, of the imaginary correction scanning line "A" above the upper edge of the raster is obtained by means of second-order curvilinear extrapolation on the basis of the correction data, e.g., b1, c1 and d1, of the vertically aligned correction points B1, C1 and D1 on the vertically consecutive correction scanning lines "B", "C" and "D" which are the first, the second and the third respectively as counted from the top of the raster. Similarly, the correction data, e.g., d2 of the imaginary correction scanning line "D" below the lower edge of the raster, as shown in FIG. 18, is obtained by means of second-order curvilinear extrapolation on the basis of the correction data, e.g., c2, b2 and a2, of the vertically aligned correction points on the vertically consecutive correction scanning lines "C", "B" and "A" which are the first, the second and the third respectively as counted from the bottom of the raster.

The operation for determining the correction data on an imaginary scanning line is implemented, for example, by software of the microprocessor 6. Generally speaking, the extrapolation is achieved by preparing a set (matrix) of coefficients (in the same way as in interpolation) and calculating the sum of the products of the coefficients and the correction data. For example, calculation in accordance with the following expression is performed for the extrapolation:

$$a1=(3 \times b1)+(-3 \times c1)+(1 \times d1)$$

$$d2=(1 \times a2)+(-3 \times c2)+(3 \times c2)$$

When the correction data on the imaginary correction scanning lines are available, the correction data of the interpolated scanning lines at the top part or the bottom part of the raster can be calculated using the same interpolation as that used for the central part of the raster. Thus, there is no need to store different coefficient data which are required in Embodiment 2. The capacity of memories constituting the coefficient generator 14 is therefore reduced, and yet it is possible to obtain a result equivalent to that obtained when the second-order curvilinear interpolation as described in connection with Embodiment 2 is employed.

EMBODIMENT 6

In the embodiment described above, second-order curvilinear extrapolation is used to determined the correction data on the imaginary scanning lines. It is however possible to use curvilinear extrapolation of a higher-order.

Figure 19:
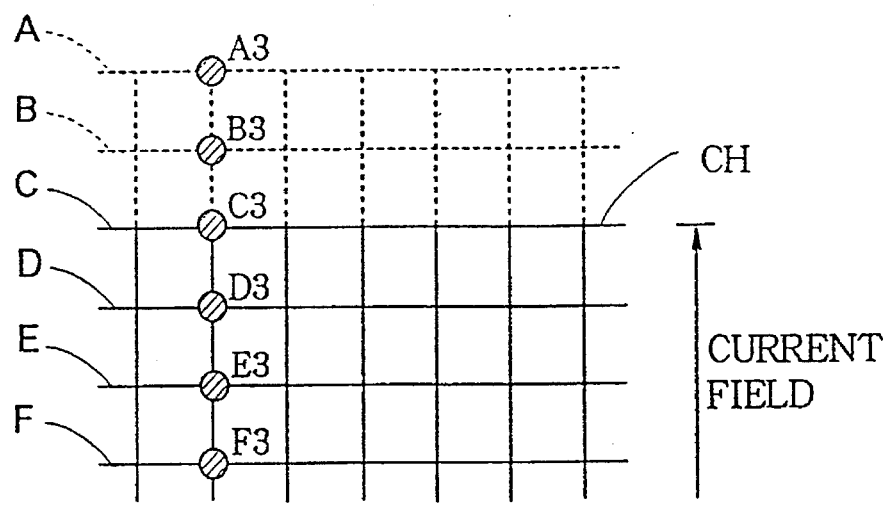
FIG. 19 is a diagram showing a crosshatch pattern, correction points within the raster, and imaginary correction points above the upper edge of the raster used in Embodiment 6.
Figure 20:
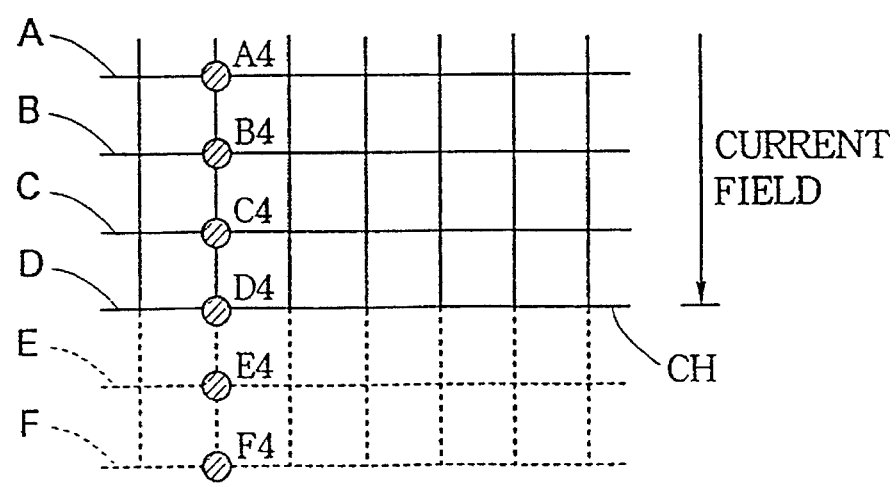
FIG. 20 is a diagram showing a crosshatch pattern, correction points within the raster, and imaginary correction points below the lower edge of the raster used in Embodiment 6.

For instance, to achieve interpolation using a fifth-order function using six correction points, it is necessary to prepare correction data of correction points, e.g., A3, B3, on two imaginary scanning lines (A and B) above the upper edge of the raster as shown in FIG. 19, and correction data of correction points, e.g., E4, F4, on two imaginary scanning lines (E and F) below the lower edge of the raster, as shown in FIG. 20. At the time of the convergence adjustment, the correction data of the correction points, e.g., A3, B3, on the imaginary scanning lines above the upper edge of the raster are determined by third-order extrapolation using the correction data on the vertically aligned correction points, e.g., C3, D3, E3 and F3, on the vertically consecutive, first to fourth correction scanning lines as counted from the top of the raster, as shown in FIG. 19. Similarly, the correction data of the correction points, e.g., E4, F4, on the imaginary scanning lines below the lower edge of the raster are determined by third-order extrapolation using the correction data of the vertically aligned correction points, e.g., A4, B4, C4 and D4, on the vertically consecutive, first to fourth correction scanning lines as counted from the bottom of the raster, as shown in FIG. 20.

During use of the display, the correction data on the imaginary lines above the upper edge of the raster are used for the fifth-order interpolation for the interpolated scanning lines at the top part (between the correction points C3 and D3, and between the correction points D3 and E3) of the raster. Similarly, the correction data on the imaginary lines below the lower edge of the raster are used for the fifth-order function interpolation for the interpolated scanning lines at the bottom part (between the correction points D4 and C4, and between the correction points C4 and B4) of the raster. It is therefore possible to use the same fifth-order function interpolation for the top part, the bottom part and the central part of the raster.

By increasing the number of the imaginary scanning lines, a still higher-order function can be used for the interpolation.

EMBODIMENT 7

Figure 21:
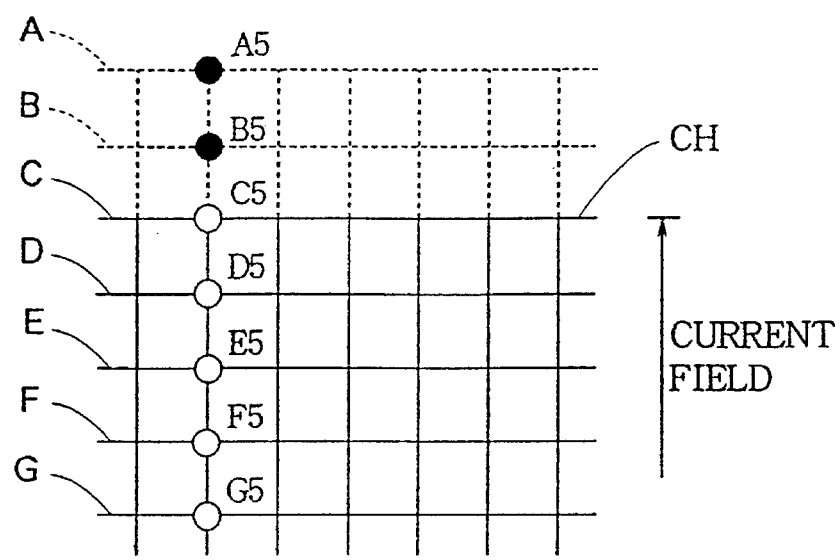
FIG. 21 is a diagram showing a crosshatch pattern, correction points within the raster and imaginary correction points above the upper edge of the raster used in Embodiment 7.

In Embodiment 6, correction data for two imaginary correction points was obtained through a single functional calculation. Embodiment 7 provides another method of calculating correction data on the imaginary scanning lines. In FIG. 21, first to fifth correction scanning lines C to G as counted from the top of the raster and two imaginary scanning lines A and B above the upper edge of the raster are shown. The correction data of the correction point, e.g., B5, on the nearest imaginary scanning line above the upper edge of the raster is determined in two ways.

First, it is determined by fourth-order extrapolation using the correction data of the vertically consecutive and aligned correction points C5 to G5 which are on the first to fifth correction scanning lines C to G. The correction data thus obtained is denoted by b5a.

Second, the correction data of the correction points B5 as well as A5 is determined by third-order extrapolation using the correction data of the vertically aligned correction points C5 to F5 on the vertically consecutive, first to fourth correction scanning lines C to F. The correction data obtained in this way are denoted by b5b and a5. The second way of obtaining the correction data is identical to that described in connection with Embodiment 6.

The correction data b5a is used, together with the correction data c5 to g5, to determine the correction data of the interpolated scanning lines between the correction scanning lines D and E, i.e., the second segment as counted from the top of the raster.

The correction data b5b and a5 are used, together with the correction data c5 to f5, to determine the correction data of the interpolated scanning lines between the correction scanning lines C and D, i.e., the first segment as counted from the top of the raster.

Figure 22:
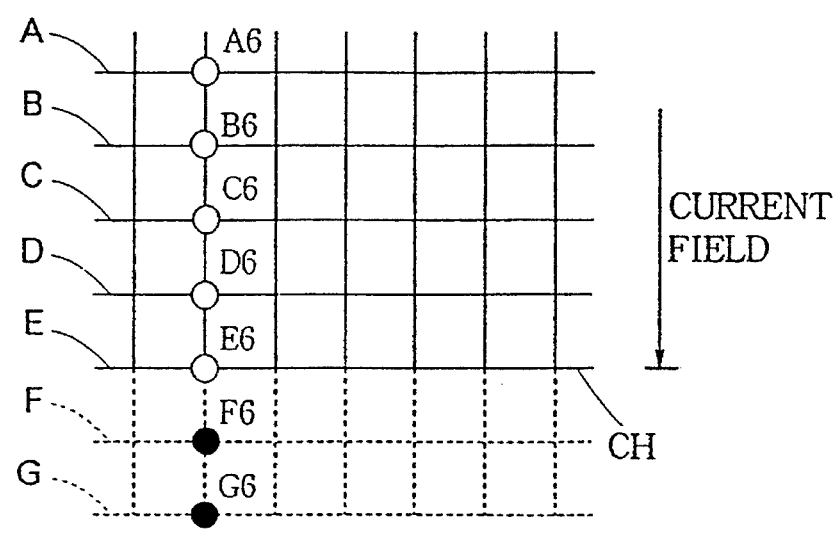
FIG. 22 is a diagram showing a crosshatch imaginary correction points within the raster, and imaginary correction points below the lower edge of the raster used in Embodiment 7.

Similar method is used for the correction data at the bottom part of the raster. This is explained with reference to FIG. 22, in which first to fifth correction scanning lines E to A as counted from the bottom of the raster and two imaginary scanning lines F and G below the lower edge of the raster are shown. The correction data of the correction point, e.g., F6, on the nearest imaginary scanning line below the lower edge of the raster is determined in two ways.

First, it is determined by fourth-order extrapolation using the correction data of the vertically consecutive and aligned correction points E6 to A6 which are on the first to fifth correction scanning lines E to A. The correction data thus obtained is denoted by f6a.

Second, the correction data of the correction points F6 as well as G6 is determined by third-order extrapolation using the correction data of the vertically aligned correction points E6 to B6 on the vertically consecutive, first to third correction scanning lines E to B. The correction data obtained in this way are denoted by f6b and g6.

The correction data f6a is used, together with the correction data e6 to a6, to determine the correction data of the interpolated scanning lines between the correction scanning lines D and C, i.e., the second segment as counted from the bottom of the raster.

The correction data f6b and g6 are used, together with the correction data e6 to b6, to determine the correction data of the interpolated scanning lines between the correction scanning lines E and D, i.e., the first segment as counted from the bottom of the raster.

The concept explained in connection with this embodiment can also be applied where the higher-order functions are used for the extrapolation and interpolation.

EMBODIMENT 8

Embodiment 7 is associated with the following problem. That is, the capacity of the memory storing imaginary correction data is large because a plurality of correction data are prepared for each of some imaginary correction points, and the memory reading circuit is complicated because correction data of different correction points must be used according to the segment to which interpolation is applied at the top part and the bottom part of the raster, and switching between plural memory areas must be made.

Embodiment 8 to solve this problem will next be described with reference to FIG. 23 and FIG. 24.

Figure 23:
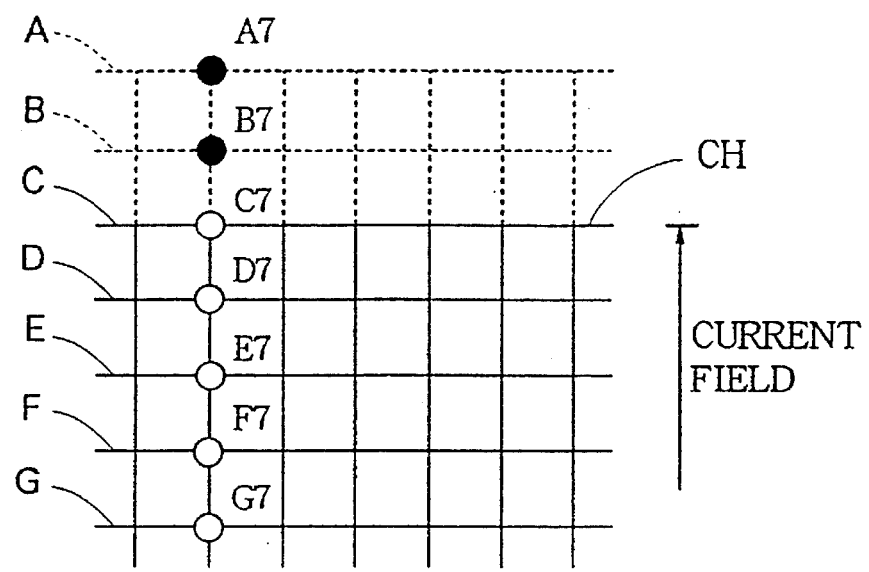
FIG. 23 is a diagram showing a crosshatch pattern, correction points within the raster, and imaginary correction points above the upper edge of the raster used in Embodiment 8.
Figure 24:
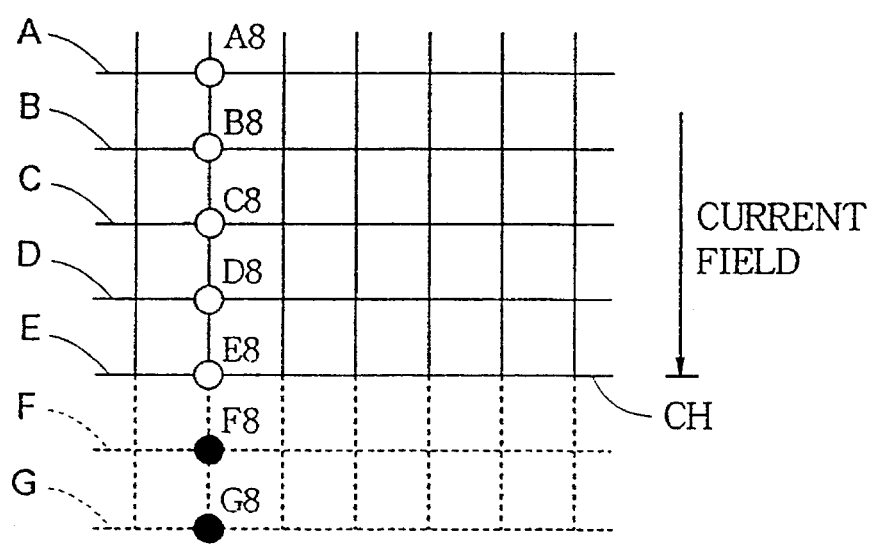
FIG. 24 is a diagram showing a crosshatch pattern, correction points within the raster, and imaginary correction points below the lower edge of the raster used in Embodiment 8.

Referring first to FIG. 23, the correction data of the correction point, e.g., B7, on the nearest imaginary scanning line above the upper edge of the raster is determined by fourth-order extrapolation using the correction data of the vertically aligned correction points C7 to G7 on the vertically consecutive, first to fourth correction scanning lines C to G.

Next, the correction data of the imaginary correction point A7 on the second nearest imaginary scanning line A is determined by fourth-order extrapolation using the correction data of the correction point B7 and the correction data of the vertically aligned correction points C7 to F7 on the vertically consecutive, first to fourth correction scanning lines C to F.

A similar method is applied to the bottom of the raster. That is, referring first to FIG. 24, the correction data of the correction point, e.g., F8, on the nearest imaginary scanning line below the lower edge of the raster is determined by fourth-order extrapolation using the correction data of the vertically aligned correction points E8 to A8 on the vertically consecutive, first to fourth correction scanning lines E to A. Next, the correction data of the imaginary correction point A7 on the second nearest imaginary scanning line G is determined by fourth-order extrapolation using the correction data of the correction point F8 and the correction data of the vertically aligned correction points E8 to B8 on the vertically consecutive, first to fourth correction scanning lines E to B.

During use of the display, the correction data of the interpolated scanning lines are all determined by fifth-order interpolation using correction data of six vertically aligned correction points on vertically consecutive six correction scanning lines.

Thus, single correction data is provided for each correction point on each imaginary scanning line, so that the total capacity of the memory storing the correction data is smaller than that of Embodiment 7. The amount of hardware used for implementing Embodiment 8 is smaller than that of Embodiment 7, and the accuracy of the correction data obtained as a result of the interpolation is higher than that of Embodiment 7.

The concept explained in connection with Embodiment 8 can also be applied to higher-order extrapolation and interpolation.

EMBODIMENT 9

Figure 25:
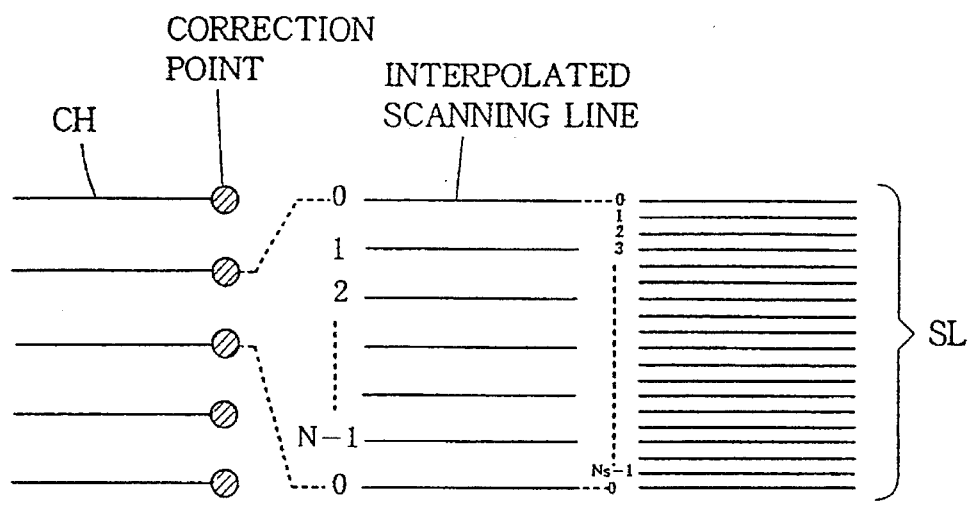
FIG. 25 is a diagram showing the positional relationship between a horizontal lines of a crosshatch pattern, correction points, interpolated scanning lines and slice lines dividing the segment according to Embodiment 9.

The digital convergence devices described in connection with the various embodiments had a set of coefficient data for each interpolated scanning line. This is illustrated in FIG. 25, in which the horizontal lines of a crosshatch pattern and correction points, and interpolated scanning lines are illustrated. Also shown are 0-th to (Ns−1)-th slice lines SL, which are used in this embodiment, as will be apparent from the following description.

The example illustrated in FIG. 25 is for the case when the number of interpolated scanning lines is N−1 and the number of types of coefficient data is M (which corresponds to the number M of operation modes with different interpolated scanning line numbers (N−1)).

In the embodiments described above, a set of coefficients (e.g., four coefficients M0n, M1n, M2n, M3n, in the example described in Embodiment 1) are provided for each of 0-th to (N−1)-th interpolated scanning lines, and different sets of coefficients had to be provided for each of the operation modes with different interpolated scanning numbers (N−1). However, the number of interpolated scanning lines (N−1) in each segment depends on the number of the scanning lines on the whole raster. Thus, there was a problem that different sets of coefficients were necessary for each of the modes of operation, which may depend on the types of the video signal sources. The result is that the memory of a large capacity is needed for storing the coefficients, i.e., for forming the coefficient generator.

In Embodiment 9, each segment is divided by slice lines SL at a predetermined pitch, and a set of coefficient data is provided for each of the slice lines SL. In use of the display, the slice line SL closest to each of the interpolated scanning line (whose actual position depends on the number of the interpolated scanning lines in the segment) is selected, and the set of coefficient data are used for the interpolation.

Thus, it is possible to use the same set of coefficient data for different numbers of interpolated scanning lines within the segment. It is however noted that pitch of the slice lines SL must be sufficiently small to ensure sufficient closeness between each interpolated scanning line and the closest slice line, and hence sufficiently close approximation in the result of the interpolation regardless of the number of the interpolated scanning lines in each segment.

Figure 26:
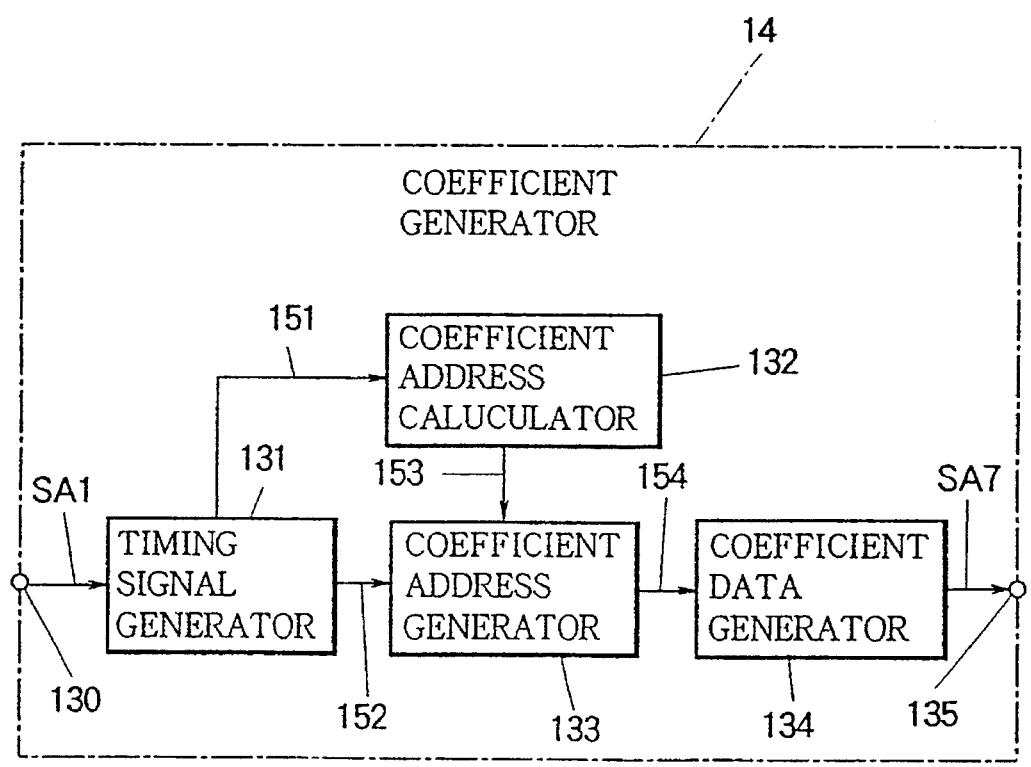
FIG. 26 is a block diagram showing a coefficient generator used in Embodiment 9.

FIG. 26 shows the configuration of a coefficient generator used to implement the above described concept. As illustrated, the coefficient generator is provided with an input terminal 130, a timing signal generator 131, a coefficient address calculator 132, a coefficient address generator 133, a coefficient data generator 134 and an output terminal 135.

The input terminal 130 is for inputting a synchronous signal SA1. The timing signal generator 131 generates a control signal 151 and a timing signal 152 on the basis of the sync signal SA1. The coefficient address calculator 132 is controlled by the control signal 151, and calculates and outputs coefficient address 153. In this calculation, the coefficient address for the slice line closest to each interpolated scanning line is generated. The coefficient address generator 133 stores the coefficient addresses 153 from the coefficient address calculator 132, and outputs the coefficient addresses 154, normally in synchronism with the timing signal 152 from the timing signal generator 131. The coefficient generator 134 receives the coefficient addresses 153 and outputs coefficient data SA7. The output terminal 135 is for outputting the coefficient data SA7.

The coefficient address 153 is not always output, but is output according to the control signal 151 only when it is necessary, for instance, when the mode of operation is switched from one mode with a certain number of interposed scanning lines to another mode with a different number of interposed scanning lines.

EMBODIMENT 10

In Embodiments 5 to 9, the number of the interpolated scanning lines in each segment was changed so that the correction data of the common correction points can be used for the interpolation, and the positions of the correction points within the raster are prevented from shifting.

However, it could happen that the number of the scanning lines over the entire height of the raster is not a multiple of the number of the scanning lines per segment, and as a result, remainder of the scanning lines may be produced when all the segments are allocated with the same number of scanning lines. The remainder of the scanning lines may be positioned below the lowest correction scanning line, and as a result, the positions of the correction points are shifted upward by the distance corresponding to the remainder of the scanning lines. Embodiment 10 is addressed to this problem. That is, in this embodiment, the segments may be allocated with different numbers of scanning lines so as to minimize the shift of the correction points.

Figure 27:
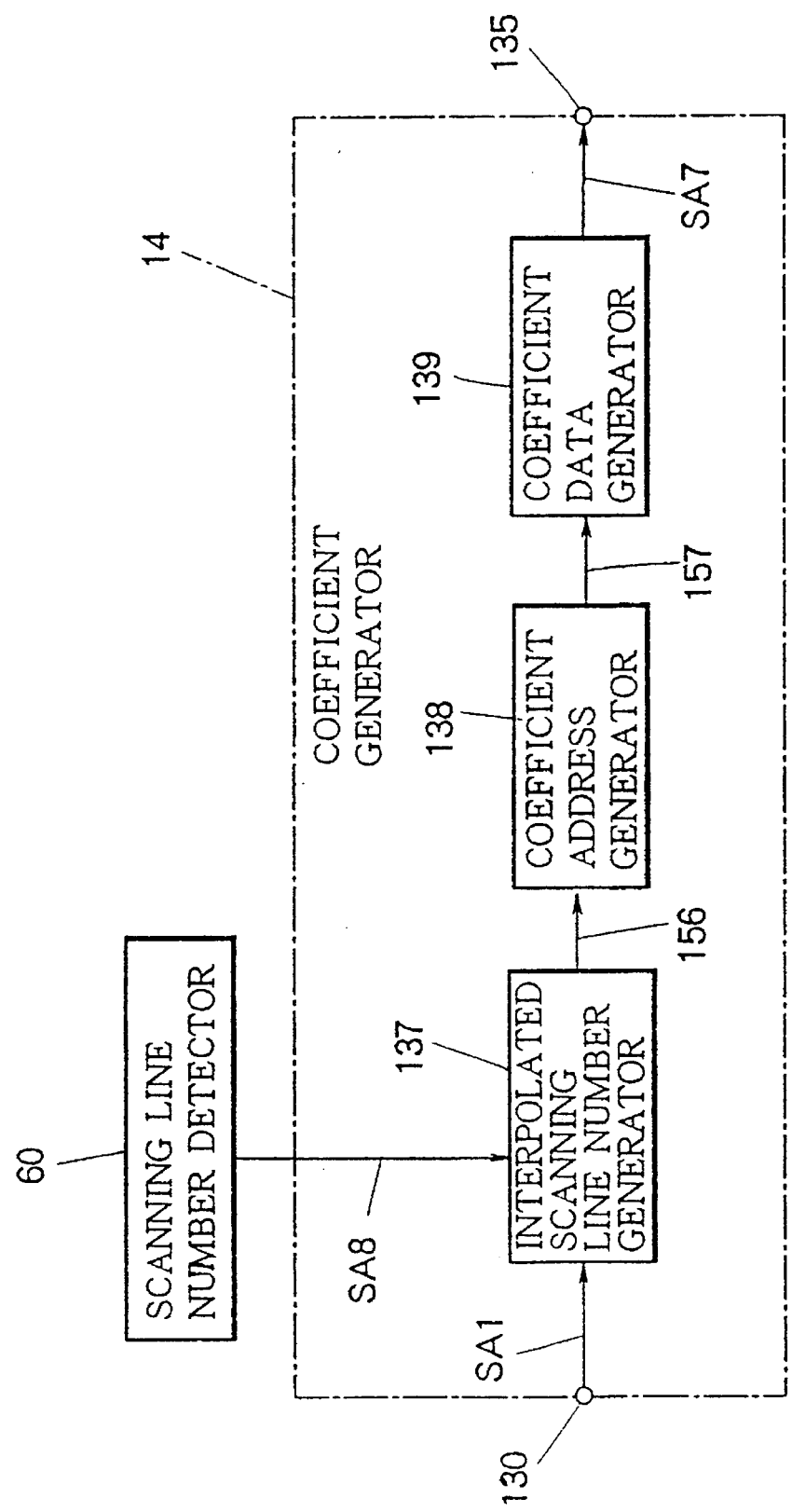
FIG. 27 is a block diagram showing an example of the coefficient generator used in Embodiment 10.

FIG. 27 shows the configuration of a coefficient generator used to implement the above-described concept. As illustrated, the coefficient generator 14 of this embodiment is provided with an input terminal 130 for inputting a synchronous signal SA1, a scanning line detector 60 for detecting the total number of scanning lines, SA8, on the basis of the synchronous signal SA1, and an interpolated scanning line number generator 137 for allocating interpolated scanning lines to each segment on the basis of the total scanning line number SA8 and outputting the signals indicating the interpolated scanning line numbers, 156. The allocation is so made as to minimize the shifts of the positions of the correction points. The illustrated coefficient generator further comprises a coefficient address generator 138 for generating a coefficient data address signal 157, on the basis of the number of interpolated scanning lines 156, a coefficient data generator 139 for outputting the coefficient data SA7 on the basis of the coefficient data address signal 157, and an output terminal 135 for supplying coefficient data SA7.

Figure 28:
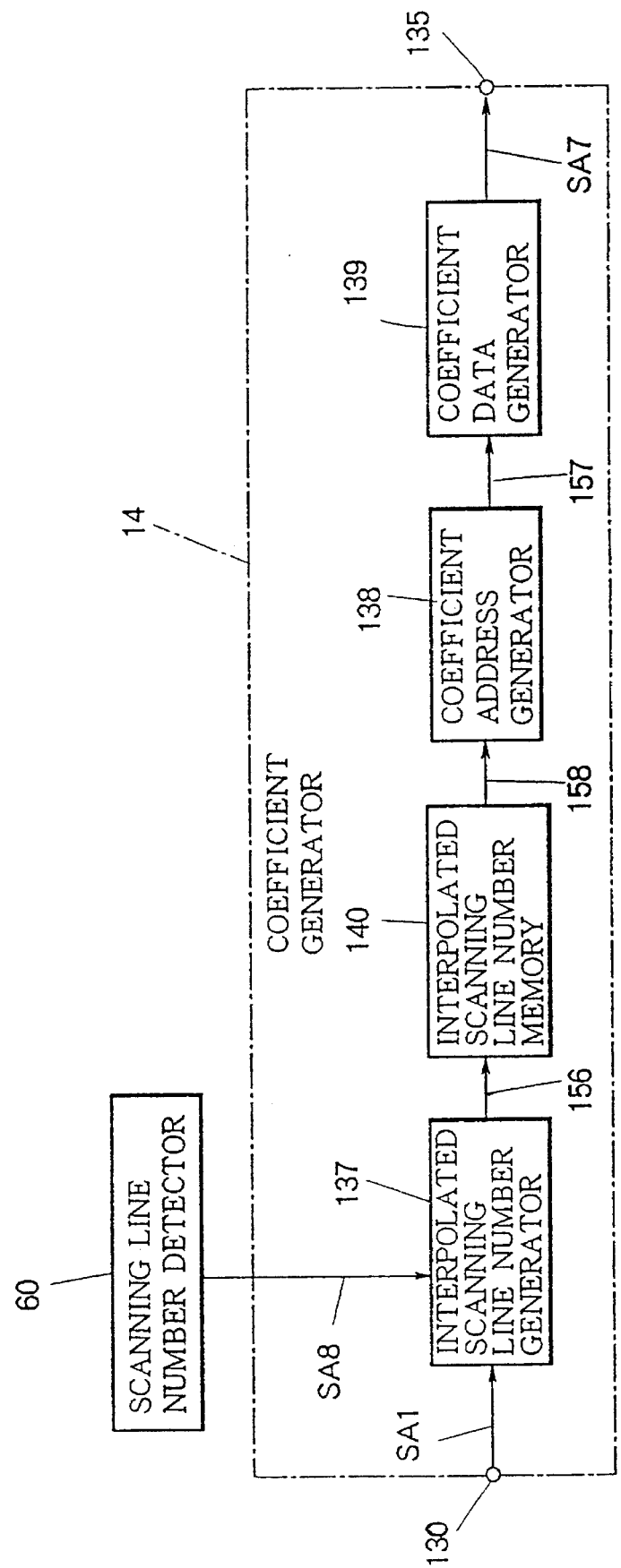
FIG. 28 is a block diagram showing another example of the coefficient generator used in Embodiment 10.

The calculation of the numbers of the interpolated scanning lines 156 in the respective segments needs to be completed before the scanning operation of the particular segment begins, that is, before the scanning on the preceding segment ends. However, an interpolated scanning line number memory 140 is additionally provided and inserted in front of the coefficient address generator 138, as shown in FIG. 28, to store the number of the interpolated scanning lines for each of V vertically successive segments, the signal indicating the interpolated scanning lines for each segment can be produced at the same timing as in Embodiment 5 to Embodiment 9.

EMBODIMENT 11

Embodiment 11 is next described with reference to FIG. 29 through FIG. 33. The overall configuration of this embodiment is identical to that shown in FIG. 1. The difference is that, in this embodiment, part of correction points are selected as adjustment points, the correction data for the adjustment points are found by means of convergence adjustment as described previously, and correction data of the other correction points are determined by means of interpolation on the basis of correction data determined through convergence adjustment. The interpolation may be effected by means of a programmed microprocessor 6.

Figure 29:
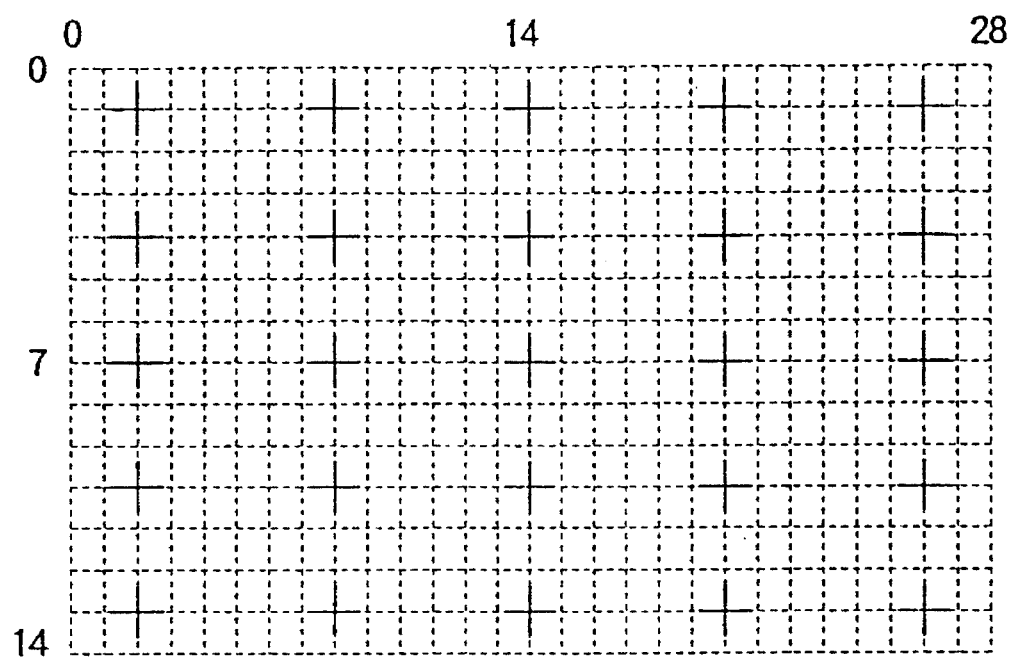
FIG. 29 is a diagram showing a crosshatch pattern with adjustment points according to Embodiment 11.

The relationship between the crosshatch pattern, correction points and adjustment points is explained referring to FIG. 29, in which a crosshatch pattern is illustrated by broken lines. The crosshatch pattern is displayed on a CRT or a projector, in accordance with a crosshatch signal SA4 amplified in the video circuit 4. The intersections of the crosshatch pattern are correction points. Some of the correction points, i.e., those marked with a thick-line cross "+", are selected as adjustment points. In the illustrated case, there are 29×15 correction points, i.e., the number (m) of the correction points on each correction scanning line is 29 and the number (n) of the correction scanning lines containing the correction points is 15; and there are 5×5 adjustment points, i.e., the number (i) of the adjustment points on each of the correction scanning lines which contain adjustment points is 5, and the number (j) of the correction scanning lines containing adjustment points is also 5.

Figure 45:
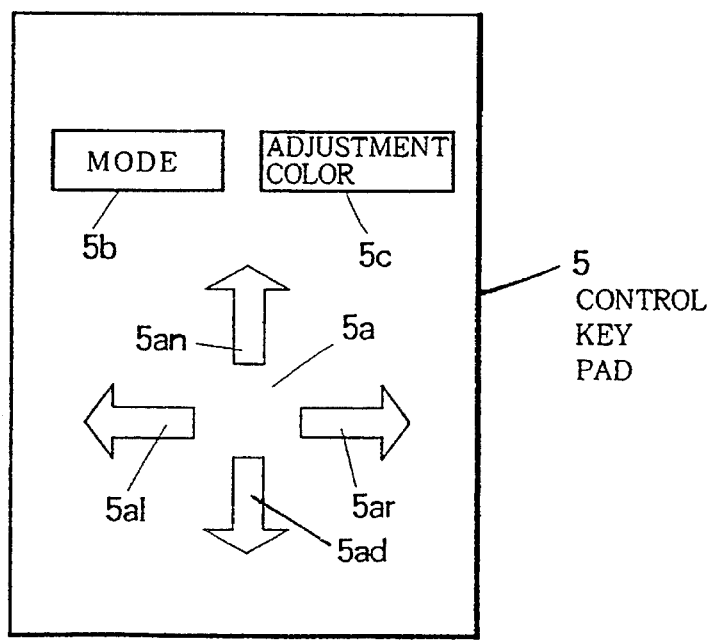
FIG. 45 is a diagram showing the control key pad used in the prior art example, and also in the embodiments of the invention.
Figure 46:
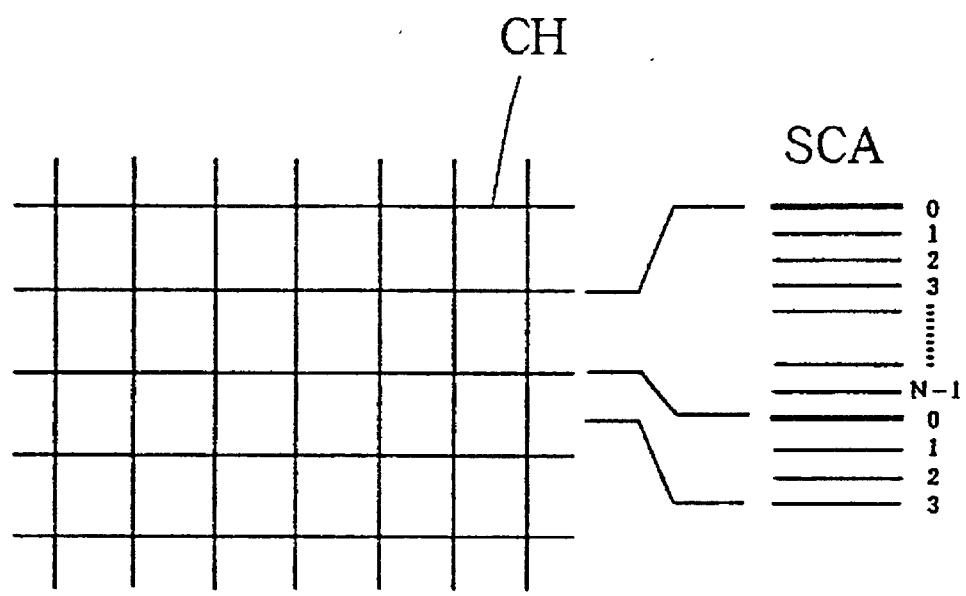
FIG. 46 shows a crosshatch pattern and the interpolated scanning line numbers.
Figure 47:
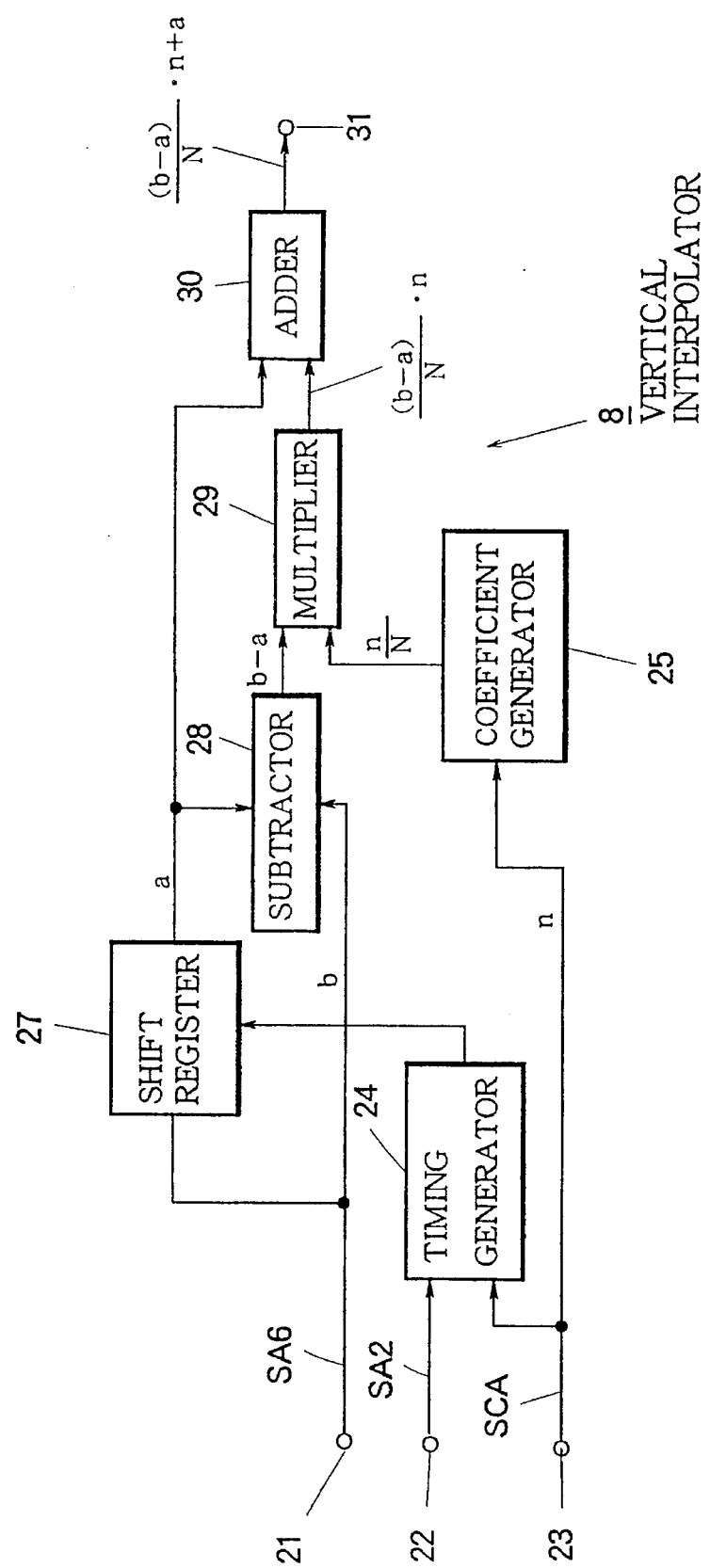
FIG. 47 is a block diagram showing a vertical interpolator used in the prior art device for linear interpolation.

The procedure of the convergence adjustment is now described. In the convergence adjustment, color green of the three primary colors, red, green and blue, is taken as a reference, and adjustment is so made that a crosshatch pattern, particularly its intersections, of a color red and a crosshatch pattern, particularly its intersections, of color blue is registered with a crosshatch pattern, particularly its intersections, of color green. For such adjustment, the control key pad 5 shown in FIG. 45 is used. The convergence adjustment is time-consuming and requires skill. In Embodiment 11, such convergence adjustment is made only in connection with the adjustment points with the cross "+" in thick lines, and the correction data of the rest of the correction points are determined by calculation performed by the programmed computer, as described above. Accordingly, the time required for the convergence adjustment is substantially reduced.

Figure 30:
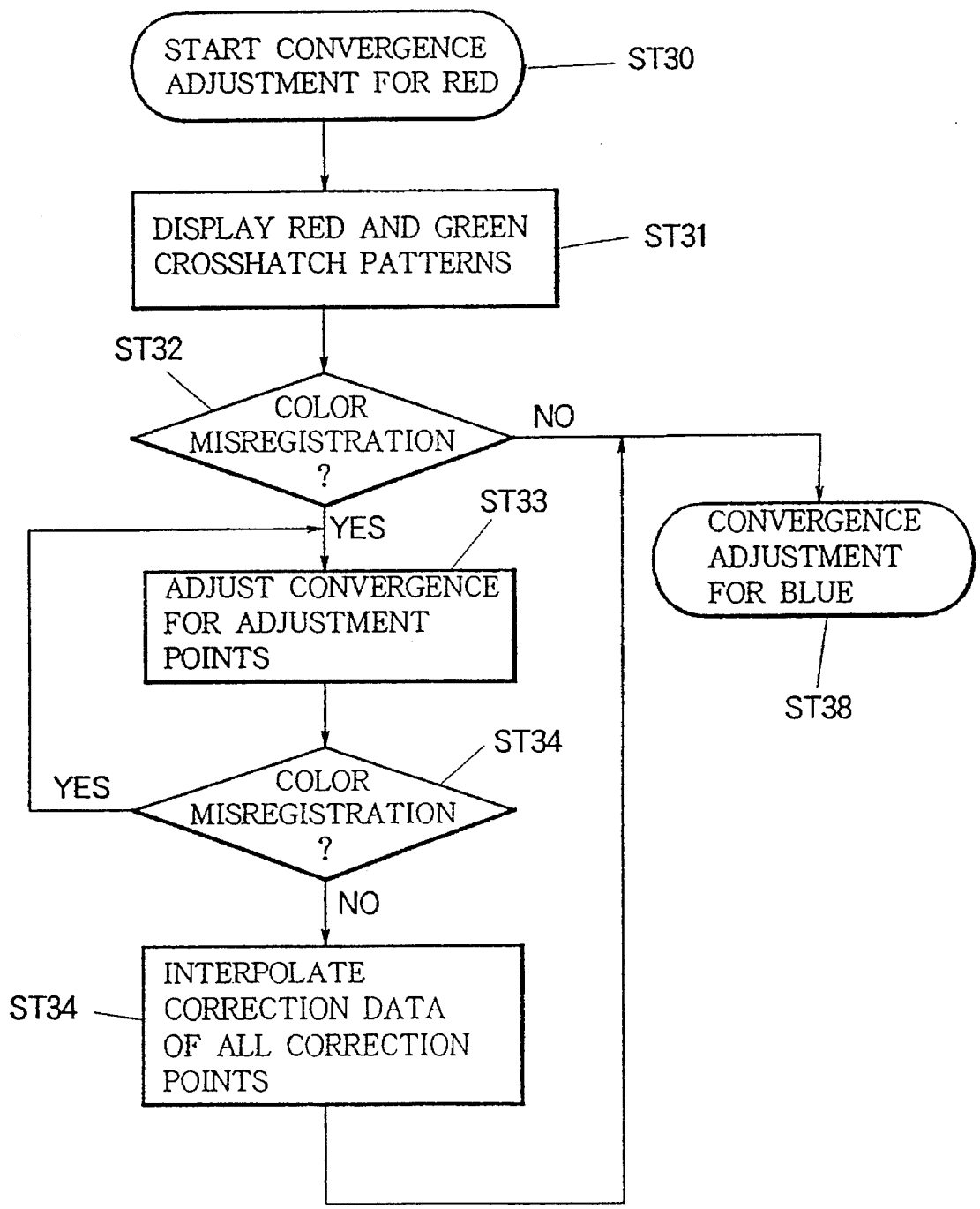
FIG. 30 is a flow chart showing the process of convergence adjustment according to Embodiment 11.

Further explanation of the procedure for determining the correction data of the adjustment points and the correction data of the rest of the correction points will be given with reference to FIG. 30 and FIG. 45.

When convergence adjustment for color red is initiated (ST30) by manipulation of the mode selection key 5b and the adjustment color selection key 5c, the microcomputer 6 controls the crosshatch generator 3 to produce crosshatch signals SA4 for red and green. The crosshatch signals SA4 are sent to the video circuit 4, and corresponding crosshatch patterns of red and green are displayed on the screen (ST31). The displayed crosshatch patterns of red and green are compared, and judgment is made whether the adjustment points of the red and green crosshatch patterns are registered with each other, i.e., where there is any color misregistration (ST32). For each of the observation, the displayed adjustment points may also be identified by crosses "+" in thick lines as in FIG. 29. As an alternative, the crosshatch pattern including the intersections constituting the adjustment points, but not including the intersections constituting the rest of the correction points may be displayed. If it is found that the adjustment points of the crosshatch patterns are not registered with each other, adjustment is so made as to bring the adjustment points of the red crosshatch pattern into registration with the corresponding adjustment points of the green crosshatch pattern.

For this convergence adjustment, the positioning keys 5a as well as the mode selection keys 5b are used. That is, the mode selection key 5b is pressed to select the adjustment point selection mode. Then, the cursor is moved to the adjustment point of the red crosshatch pattern which is not registered with the corresponding adjustment point of the green crosshatch pattern, and which therefore requires adjustment. The mode selection key 5b is pressed to alter the mode from the adjustment point selection mode to the adjustment point moving mode. In this mode, the positioning keys 5a are pressed to move the selected adjustment point of the red crosshatch pattern to register with the corresponding adjustment point of the green crosshatch pattern.

Then, another adjustment point of the red crosshatch pattern which is not registered with the corresponding adjustment point of the green crosshatch pattern is selected, and moved into registration. This is repeated for all the adjustment points. It can happen that the adjustment point which has been adjusted may be moved out of registration when another adjustment point is registered. Then, the first-mentioned adjustment point must be registered again.

The correction data for each adjustment point with coordinate (xi, yj) includes its horizontal component ZH (xi, yj) and its vertical component ZV (xi, yj). The correction data for each adjustment point is stored in the correction data memory 7, and is later transferred from the correction data memory 7 to the microcomputer 6 via the bus lines 62.

When it is confirmed that the adjustment is completed, i.e., the adjustment points of the red crosshatch pattern are registered with the corresponding adjustment points of the green crosshatch pattern (ST32→ST34), the correction data of the rest of the correction points (29×15−5×5) is determined by interpolation (ST36).

When no color misregistration is found at step ST32, or when the adjustment is completed (ST34), adjustment for color blue is conducted.

The interpolation mentioned above is made using the programmed microcomputer 6 in the following manner. The interpolation is made for each of the horizontal and vertical components ZH and ZV of the correction values. {(i−1)× (j−1)}-order correction function is first determined using the correction values of (i×j) adjustment points. General formulae of the correction functions for the case of i=j=5 are given below:

$$f(x,y) = a1X^4Y^4 + a2X^4Y^3 + a3X^4Y^2 + a4X^4Y + a5X^4 \quad (3)$$
$$a6X^3Y^4 + a7X^3Y^3 + a8X^3Y^2 + a9X^3Y + a10X^3$$
$$a11X^2Y^4 + a12X^2Y^3 + a13X^2Y^2 + a14X^2Y + a15X^2$$
$$a16XY^4 + a17XY^3 + a18XY^2 + a19XY + a20X$$
$$a21Y^4 + a22Y^3 + a23Y^2 + a24Y + a25$$

If the positions of the adjustment points are predetermined, then the interpolation coefficients of the {(i−1)×(j−1)}-th order correction function with respect to (m×n) correction points can be determined and stored beforehand in the ROM 61 in the microprocessor 6. Furthermore, the correction values of the (i×j) adjustment points are transferred from the correction data memory 7 via the bus lines 62 to the microprocessor 6, and the correction values for the rest of the correction points are calculated by interpolation by the programmed microcomputer 6 on the basis of the interpolation coefficients and the correction values of the adjustment points.

The interpolation calculation can be conducted in the horizontal direction first, and then in the vertical direction. This will next be described with reference to FIG. 31. In the figure, marks "+" indicate the adjustment points, marks "o" indicate the correction points whose correction values are determined by horizontal interpolation directly from the correction values of the adjustment points, and marks "Δ" indicate the correction points whose correction values are determined by vertical interpolation from the correction values of the adjustment points or of the correction points marks "o".

The procedure may be as follows: First, the correction values of the 24 correction points marked "o" on the scanning line encircled by HJ1 are determined by interpolation in the horizontal direction on the basis of the correction values of the five adjustment points marked "+" on the same scanning line HJ1. Similar interpolation is successively conducted for other scanning lines HJ2 to HJ5, in the order of HJ2, HJ3, HJ4 and HJ5, for example.

Then the correction values of the 10 correction points marked "Δ" and vertically aligned along an imaginary vertical line encircled by VR1 are determined by interpolation in the vertical direction on the basis of the correction values of the five correction points marked "o" which are also vertically aligned with the line VR1. Similar interpolation is successively conducted for other vertical lines VR2 to VR29 on the basis of the correction values of the correction points marked "o" or of the adjustment points marked "+", in the order of from VR2 to VR29, for example.

In this way, the correction values of the 29×15 correction points (some of which are the adjustment points) are all obtained.

Fixing the y coordinate in the vertical direction for horizontal interpolation, the correction function will then be as follows:

$$f(ZH)=K0ZH^4+K1ZH^3+K2ZH^2+K3ZH+K4 \quad (4)$$

where K0, K1, K2, K3, K4 are coefficients, and

ZH are variables for horizontal correction values.

The relation between the correction values of the adjustment points and those of the remaining correction points is shown in the following expression (5).

$$\begin{vmatrix} ZH(0,y) \\ ZH(1,y) \\ ZH(2,y) \\ ZH(3,y) \\ \cdot \\ \cdot \\ \cdot \\ \cdot \\ ZH(25,y) \\ ZH(26,y) \\ ZH(27,y) \\ ZH(28,y) \end{vmatrix} = \begin{vmatrix} K00 & K01 & K02 & K03 & K04 \\ K10 & K11 & K12 & K13 & K14 \\ 1 & 0 & 0 & 0 & 0 \\ K30 & K31 & K32 & K33 & K34 \\ \cdot & \cdot & \cdot & \cdot & \cdot \\ \cdot & \cdot & \cdot & \cdot & \cdot \\ \cdot & \cdot & \cdot & \cdot & \cdot \\ \cdot & \cdot & \cdot & \cdot & \cdot \\ K250 & K251 & K252 & K253 & K254 \\ 0 & 0 & 0 & 0 & 1 \\ K270 & K271 & K272 & K273 & K274 \\ K280 & K281 & K282 & K283 & K284 \end{vmatrix} \begin{vmatrix} ZH(2,y) \\ ZH(8,y) \\ ZH(14,y) \\ ZH(20,y) \\ ZH(26,y) \end{vmatrix} \quad (5)$$

It is assumed in expression (4) that the horizontal coordinates in the horizontal direction are x=2, 8, 14, 20 and 26. It is also assumed that the vertical coordinates of the scanning lines containing adjustment points are 1, 4, 7, 10 and 13. First, the vertical coordinate y is set at "1". The correction values ZH(2, 1), ZH(8, 1), ZH(14, 1), ZH(20, 1) and ZH(26, 1) of the adjustment points at the coordinates (2, 1), (8, 1) (14, 1), (20, 1) and (26, 1) are substituted in the expression (5) to calculate ZH(0, 1) through ZH(28, 1). Subsequently, the vertical coordinate is successively set at 4, 7, 10 and 13, and the correction values of the respective coordinates are substituted in the expression (5) to determine the correction values of the respective correction points.

The vertical interpolation is conducted in the same may using expression similar to expression (5) and substituting the known correction values in a similar manner.

The interpolation calculation is conducted by the programmed microcomputer 6 in the way discussed above. Further explanation about the procedure followed by the microcomputer 6 illustrated in FIG. 32. As illustrated, when the horizontal interpolation is started (ST50), variable x representing the horizontal coordinate is set to an initial value "0" and variable y representing the vertical coordinate is set to an initial value "1" (ST51). This setting is made in preparation for determining the correction value of the leftmost correction point on the scanning line HJ1 in FIG. 31. Then, the correction values ZH(2, 1), ZH(8, 1), ZH(14, 1), ZH(20, 1) and ZH(26, 1) of the adjustment points are transferred from the correction data memory 7 to the microcomputer 6 (ST52). Correction coefficients K00, K01, K02, K03 and K04 are read from the ROM 61 and placed in components, not specifically shown in the drawings, of the microcomputer 6 (ST53). The microcomputer 6 substituted these data in the expression (ST54).

ZH(0, 1)=K00.ZH(2, 1)+K01.ZH(8, 1)+K02.ZH(14, 1) +K03.ZH(20, 1)+K04.ZH(26, 1)

The microprocessor 6 writes the result of the calculation, ZH(0, 1) in the correction data memory 7 (ST54). Then judgment is made whether the interpolation for the leftmost correction point has been conducted, i.e., whether x<28 (ST56). If x<28, x is incremented by one (ST57), and the steps ST53 to ST55 are repeated. The steps ST53 to ST57 (LOOP1) is repeatedly followed until x=28.

When x=28, then judgment is made whether the interpolation for the lowermost correction scanning line has been conducted, i.e., whether y<14. If y<14, x is reset to "0", and the next value of the coordinate y of the scanning line containing adjustment points is set by adding "3" to the current value y. Using the new value of y, the steps ST52 to ST57 are repeated until again x reaches 28.

The operations of the steps S52 to ST59 (LOOP2) are repeated until y reaches 14. When y=14, the horizontal interpolation is completed (ST60).

Figure 31:
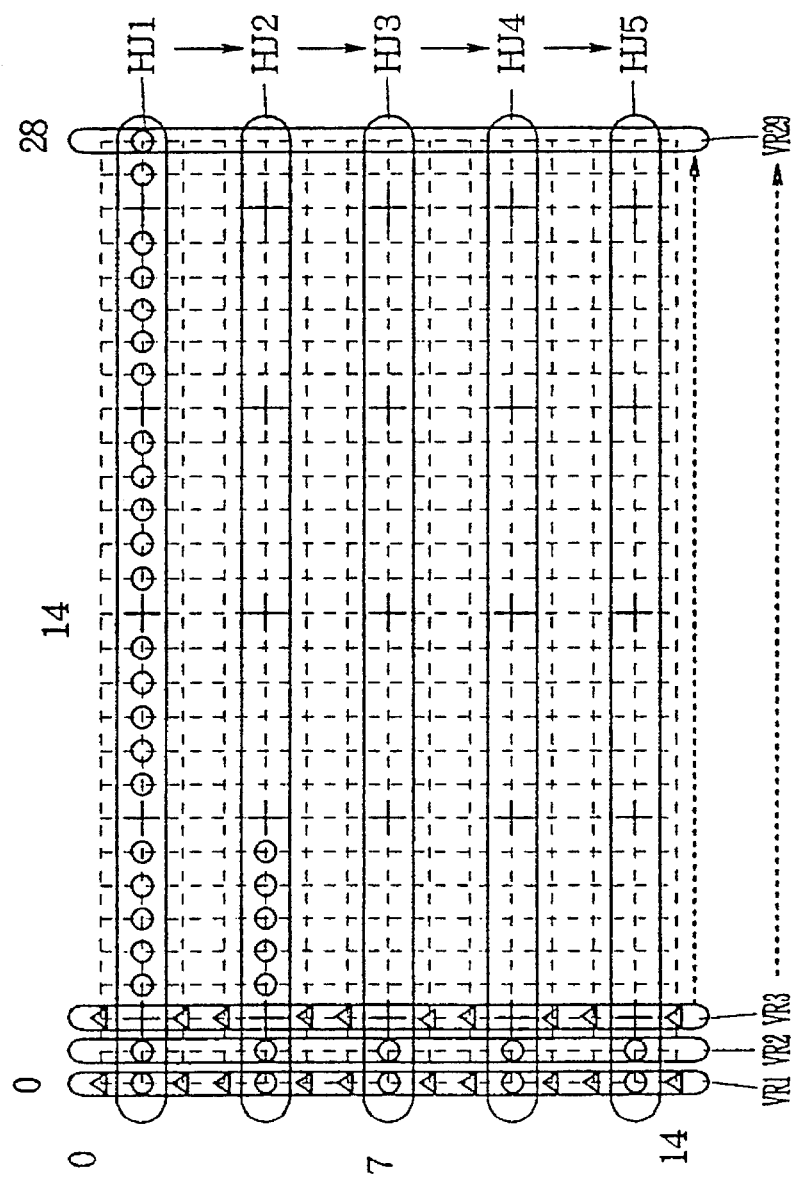
FIG. 31 is a diagram showing the sequence of interpolation of non-adjustment correction points according to Embodiment 11.

The steps ST52 to ST57 with x=0 correspond to the interpolation for the first scanning line HJ1 in FIG. 31. The steps ST52 to ST59 with y=1, 4, 7, 10 and 13 correspond to the interpolation for the first to fifth scanning lines HJ1 to HJ5 in FIG. 31.

FIG. 33 shows the normalized correction coefficients K0 to K4 in hexadecimal notation for each of the value x=0 to 28. In expression (5), the coefficients K0 to K4 for the respective values of x=0 to 28 are denoted by K00 to K284. That is, the coefficient K0 to K4 for x=n are denoted by Kn0 to Kn4.

Figure 32:
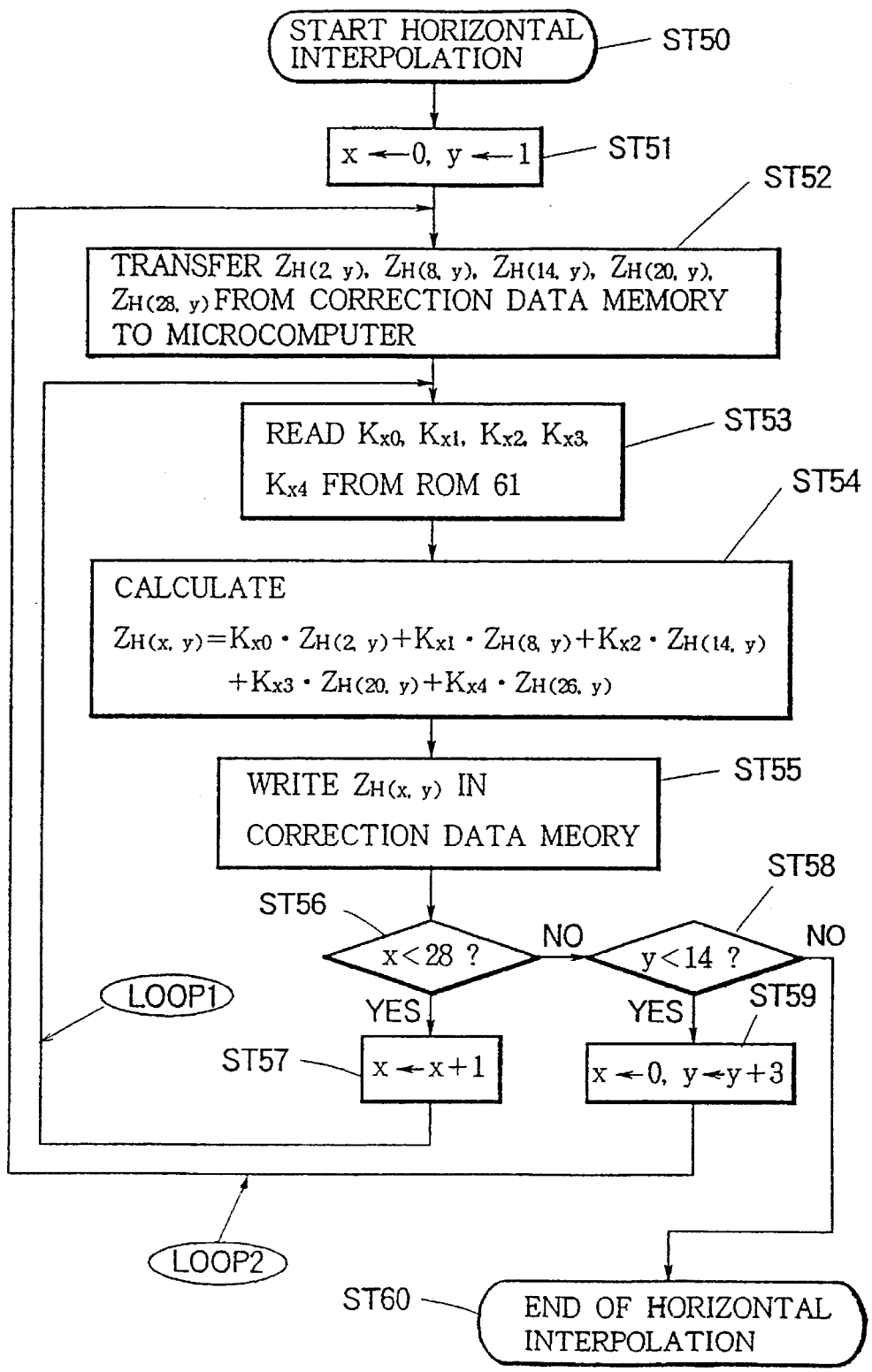
FIG. 32 is a flow chart showing the process of horizontal interpolation according to Embodiment 11.

When the horizontal interpolation shown in FIG. 32 is completed, then the vertical interpolation is conducted to calculate the correction values of the correction points which are on the scanning lines not containing adjustment points.

The same procedure is conducted for each of the color red and color blue.

Through the interpolation described above, the horizontal and vertical components of the correction values ZH(xm, yn) and ZV(xm, yn) are calculated for each of color red and color blue. The correction values are written into the correction data memory 7, and then in the channel memory 13.

The operation for correcting the convergence on the basis of the correction data read from the correction data memory 7 are similar to those of the previously described embodiments or the prior art examples. In short, vertical interpolation is made at the vertical interpolator 9, the signal is passed through the D/A converter 9, and is applied to the output circuit 11, from which a correction current is supplied to the auxiliary deflection coil 12 to correct misconvergence.

EXAMPLE 12

In Embodiment 11, the adjustment points are disposed at equal intervals. However, they may be disposed at unequal intervals. For example the adjustment points along the periphery of the raster may be shifted inward or outward depending on the over-scan ratio.

Figure 34:
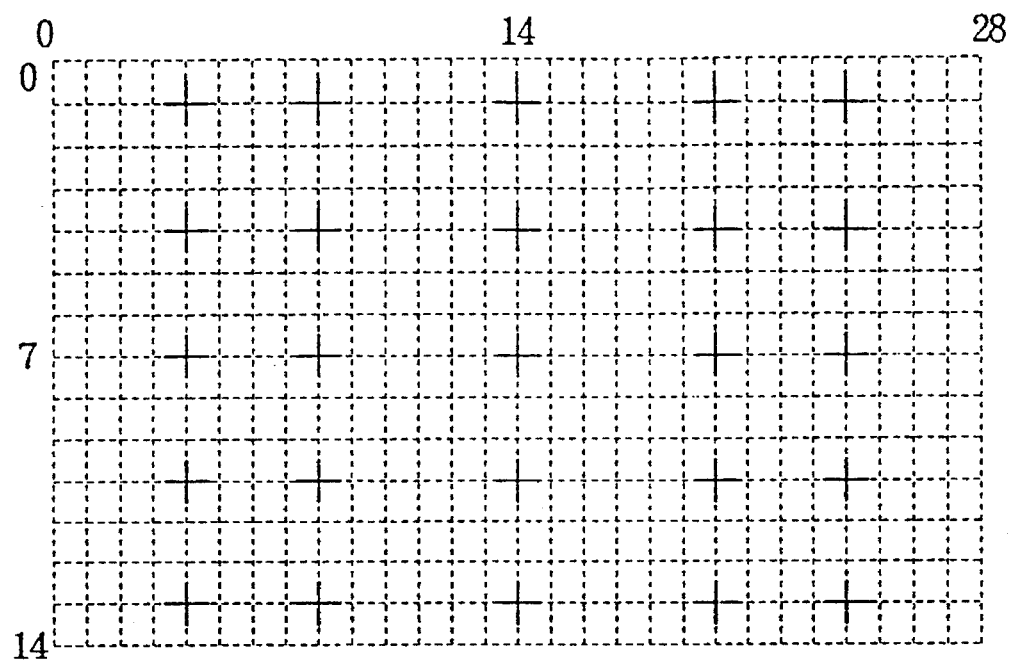
FIG. 34 is a diagram showing a crosshatch pattern and adjusting points according to Embodiment 11.

FIG. 34 shows a crosshatch pattern, correction points and adjustment points which may be adopted in the case of an over-scan display. In the illustrated example, the leftmost and rightmost adjustment points have been moved inward. In over-scan display, correction points near the periphery of the picture may be placed outside of the screen or the actually displayed part of the raster. In such a case, it is desirable to select the correction points which are outermost in the displayed part of the raster (and not outside it) to maximize the accuracy of convergence at the peripheral part of the displayed part of the raster. It is possible to provide a plurality of combinations of the adjustment points suitable for a plurality of display modes, to have means capable of displaying a plurality of sets of correction points, and to provide a plurality of sets of coefficients for use in interpolation from the correction data of each of the combination of the adjustment points.

EMBODIMENT 13

Figure 35:
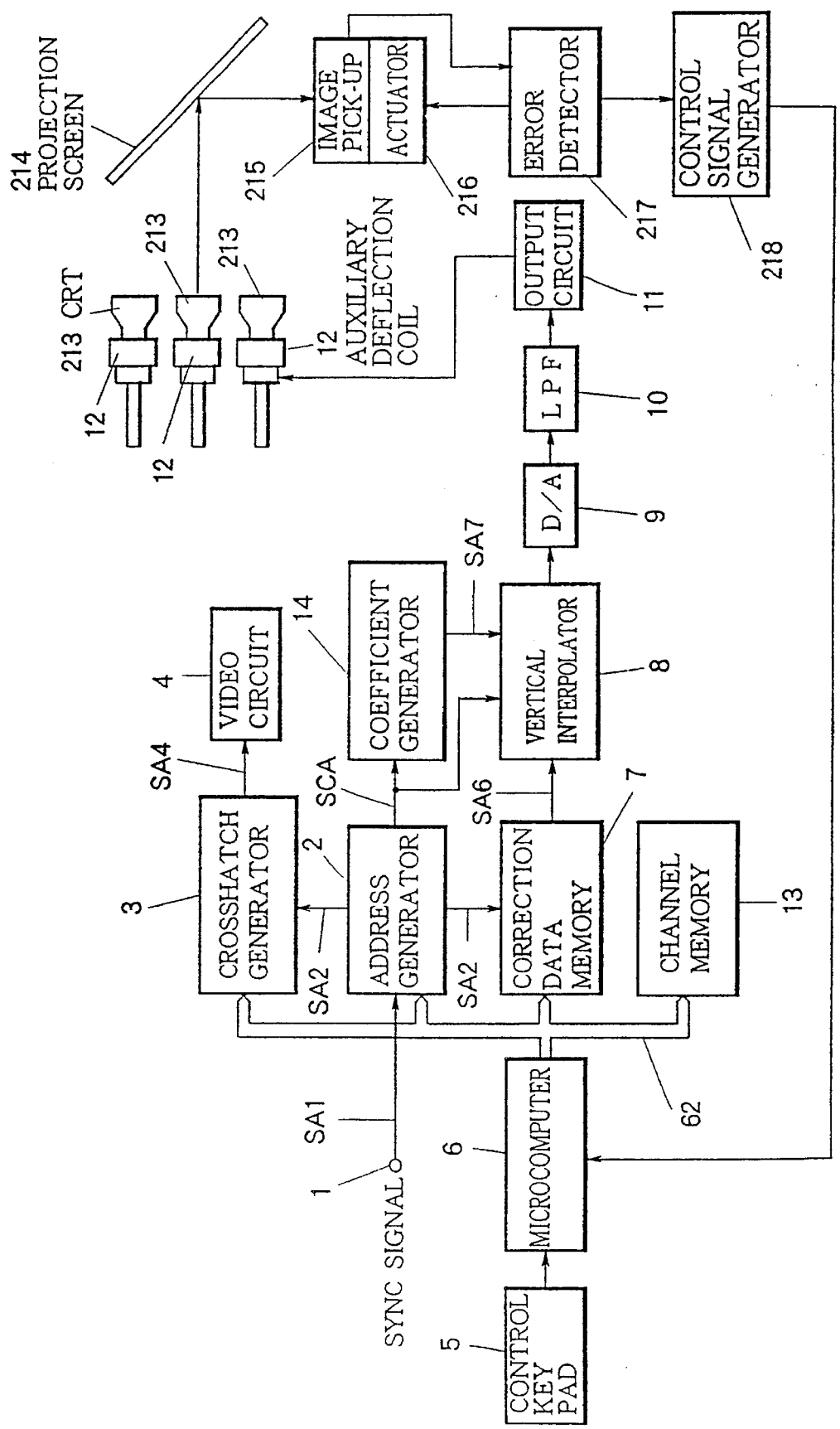
FIG. 35 is a block diagram showing a digital convergence device of Embodiment 13.

Embodiment 13 provides a convergence device which can automatically determines the correction values. FIG. 35 is a block diagram showing a convergence device of Embodiment 13. The fundamental configuration is identical to that shown in FIG. 1, and identical reference numerals indicate identical elements. CRT's 213 for red, green and blue which are additionally illustrated are for displaying the signals from the video circuit 4, and the displayed images are projected onto a projection screen 214. An image pickup device 215 such as a CCD camera is for picking up part of an image on the projection screen 214. It is sufficient for the image pickup device 215 to have such an angle of view for picking up the image of one adjustment point and area surrounding it. The image pickup device 215 produces red, green and blue image signals representing the red, green and blue components of the image.

An actuator 216 is capable of moving the pickup device 215 to a position receiving a selected adjustment point. An error detector 217 is provided to detect registration error between the adjustment points of two colors, red and green, or blue and green on the basis of the red, green and blue image signals of the adjustment point picked up by the pickup device 215, and controls the actuator 216 to move the pickup device 216 to a position for picking up the image of another adjustment point.

A control signal generator 218 responsive to the registration error detected by the error detector 217 issues a registration error correction command to the microprocessor 6, which then generates or modifies the correction value upon which the currents to the auxiliary deflection coils convergence are altered. This process is repeated until the registration error is eliminated or reduced to a sufficiently small level.

The operation of the device is next described in further detail. It is assumed that the correction points and the adjustment points are the same as in Embodiment 11. Crosshatch pattern CH like than shown in FIG. 29 is displayed through the three CRT's 213 onto the projection screen 214. The adjustment is made with respect to 5 (=i) ×5 (=j) adjustment points as in Embodiment 11. The difference from Embodiment 11 is that the convergence adjustment is conducted automatically.

In place of the crosshatch pattern with marks "+" at the adjustment points, a set of dots arranged in rows and columns, at the adjustment points (without crosshatch pattern) may be displayed. The following description assumes that a set of dots are displayed.

The image pickup device 215 is first moved to a position for picking up a selected one of the adjustment point on the screen 214. The image pickup device 215 picks up the image of the dot pattern and produces red, green and blue image signals corresponding to the red, green and blue components of the image. The error detector 217 detects registration error on the basis of the red, green and blue image signals from the image pickup device 215. The control signal generator 218 supplied the microcomputer 6 with a signal or command for increasing or decreasing the correction values of the adjustment point, until the registration error is eliminated completely or substantially. When the registration error is eliminated, the correction values are written in the correction data memory 7.

When the convergence adjustment of one adjustment point is thus completed, the image pickup device 215 is moved to a position for picking up the image of another adjustment position to conduct the convergence adjustment for such another adjustment point.

When the convergence adjustment is completed for 5×5 adjustment points, the correction values of the remaining correction points (correction points other than the adjustment points) are determined by interpolation as in Embodiment 11, and they are also written in the correction data memory 7.

The correction data written in the correction data memory 7 is transferred to the channel memory 13.

The operation during use of the display is identical to that described with Embodiment 11.

EMBODIMENT 14

Figure 36:
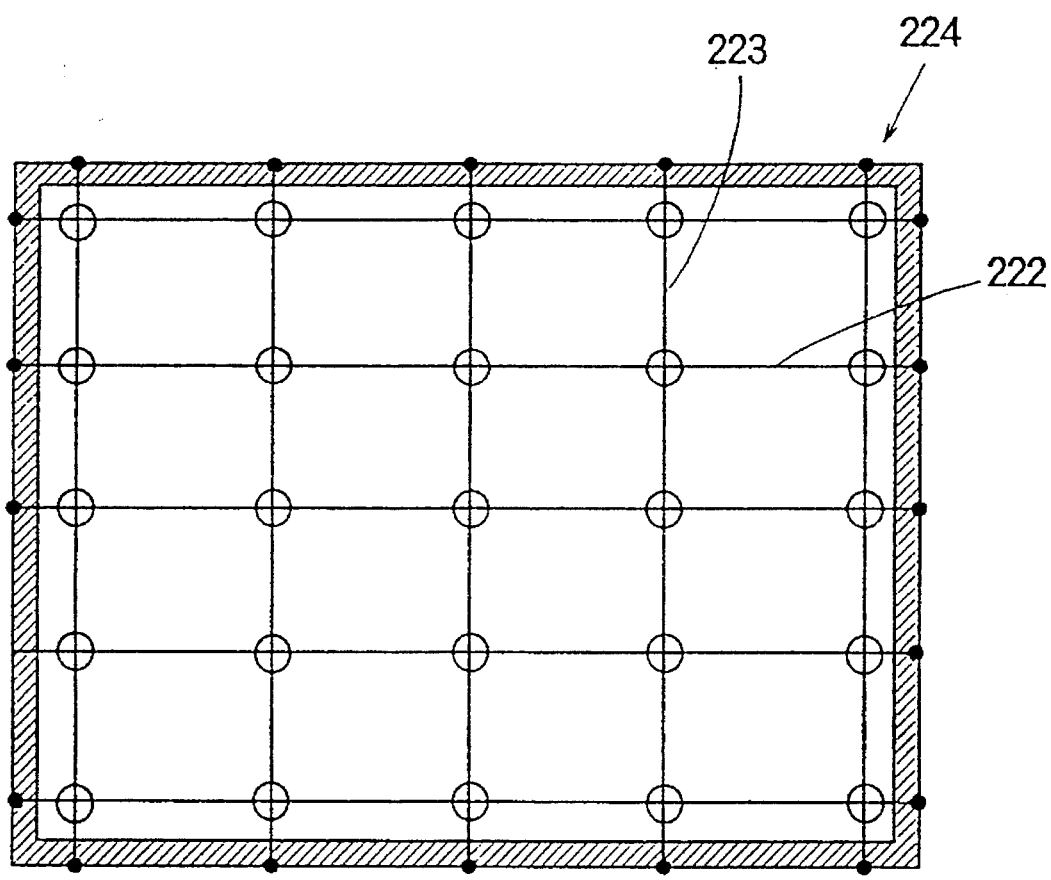
FIG. 36 is a diagram showing a grating mounted on a screen according to Embodiment 14.

In the embodiments described so far, the adjustment is made in connection with the red and blue images. It is however possible to provide an arrangement in which the adjustment of the displayed position of the respective parts of the green image is also possible. Such an arrangement is effective for correcting raster distortion. FIG. 36 is now used to correct the raster distortion.

As illustrated, a grating 224 with removably fixed horizontal and vertical threads 222 and 223 is removably mounted onto the screen of the display device. The threads 222 and 223 are so positioned that the adjustment points of the displayed picture will register with the intersections of the threads 222 and 223 when the displayed picture is free from raster distortion. The adjustment is so made that the displayed marks "+" of the crosshatch pattern or the dots at the adjustment positions register with the intersections of the threads 222 and 223.

In another method, coordinate axes are set taking the frame of the screen as a reference, and the distances from the coordinate axes are measured with the eye or by the use of the image pickup device 215 and the registration error detector 217, and the adjustment is so made that the displayed adjustment points are at the predetermined distance from the coordinate axes.

EMBODIMENT 15

An overall configuration of the digital convergence device of Embodiment 15 is identical to that shown in FIG. 1. The differences are the stored contents of the channel memory 13 and its usage. In the description of Embodiments 1 to 14, it is assumed that the channel memory 13 stores the correction data of all the correction points. Even in Embodiments 11 to 14, in which the convergence adjustment is made in connection with the adjustment points only and the correction data of the rest of the correction points are calculated immediately, the correction points are stored the channel memory 13 (after having once stored in the correction data memory 7). A problem associated with this scheme is that the capacity of the channel memory 13 is increased with increase of the number of the display modes.

In Embodiment 15, the correction data of the adjustment points (and not those of the rest of the correction points) are stored in the channel memory 13. At the time of power on or switching of the display mode during use of the display device, the correction data of the adjustment points for the selected display mode are read from the channel memory 13, and the correction data of the rest of the correction points are determined by interpolation by the microcomputer 6 on the basis of the correction data of the adjustment points. The calculated correction data are stored in the correction data memory 7. The currents to the auxiliary deflection coils during display are determined on the basis of the correction data stored in the correction data memory 7.

With such an arrangement, the capacity of the channel memory 13 can be reduced.

EMBODIMENT 16

Embodiment 15, the correction data of the correction points other than the adjustment points are calculated by interpolation after the display mode is switched. There is therefore some delay to respond to the display mode switching. Embodiment 16 is to shorten the time for response to the power on or the display mode switching. That is, with respect to the display modes which are frequently used, the correction data for all the correction points are stored in the channel memory 13. With respect to the display modes which are infrequently used, the correction data of the adjustment points only are stored, as illustrated in FIG. 37.

Figure 37:
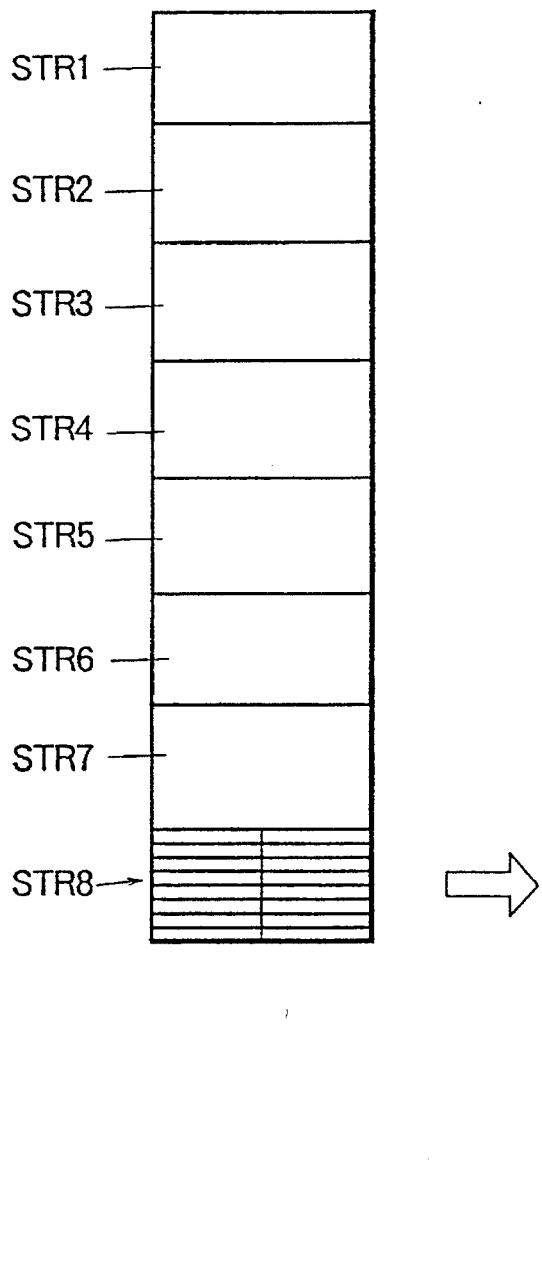
FIG. 37 is a diagram showing storage areas in the channel memory according to Embodiment 16.

In the example shown in FIG. 37, the channel memory 13 is divided into eight storage areas. First to seventh storage areas STR1 to STR7 are used for storing the correction data of all the correction points for seven (first to seventh) display modes (channels CH1 to CH7). The eighth storage area STR8 is subdivided into 16 storage areas STR8-1 to STR8-16 and are used to store the correction data of only the adjustment points 16 (eighth to 23th) additional display modes.

When any of the first to seventh display modes is selected, the correction data stored in the corresponding channel is read and transferred to the correction data memory 7.

When any of the eighth to 23rd display modes is selected, the correction data stored in the corresponding storage area is selected, and the correction data of the rest of the correction points are determined by interpolation and written in the correction data memory.

With such an arrangement, the time for responding to the power on in one the display modes frequently used or switching to one of the display modes frequently used is short. Although there is some delay in responding to the power on in one the display modes infrequently used or switching to one of the display modes infrequency used, this is easier to tolerate.

When it is found that one of the eighth to 23rd display modes (e.g., i-th mode) is frequently used, and one of the first to seventh display modes (j-th mode) is used less frequently, the storage areas for these modes may be exchanged with each other. That is, the correction data of all the correction points for the i-th mode may be calculated by interpolation and written in the storage area having been used for storing the correction data of the j-th mode, and the correction data of the adjustment points of the j-th mode be transferred to the storage area having been used for the i-th mode.

EMBODIMENT 17

Figure 38:
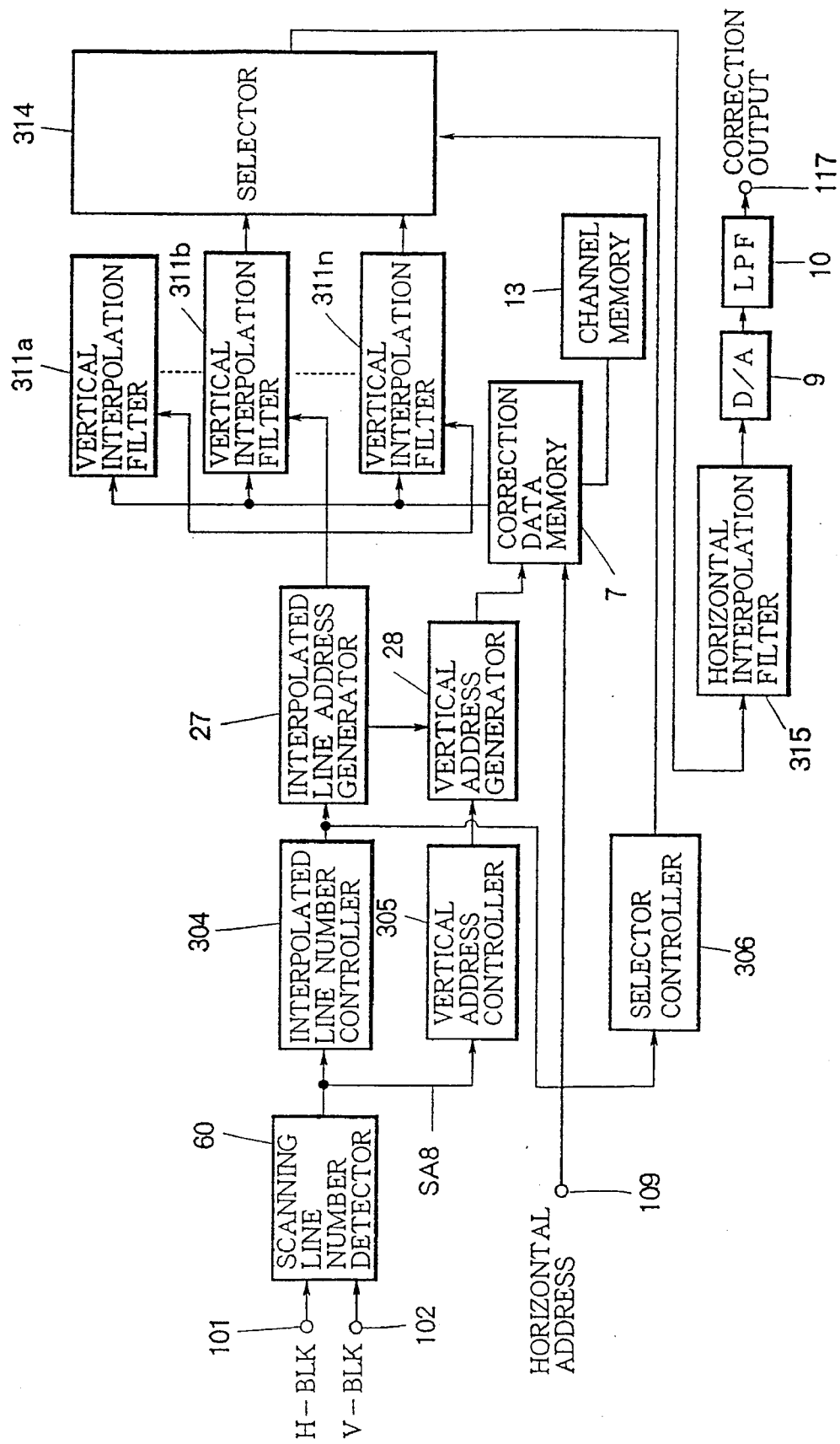
FIG. 38 is a block diagram showing a convergence device according to Embodiment 17.
Figure 48:
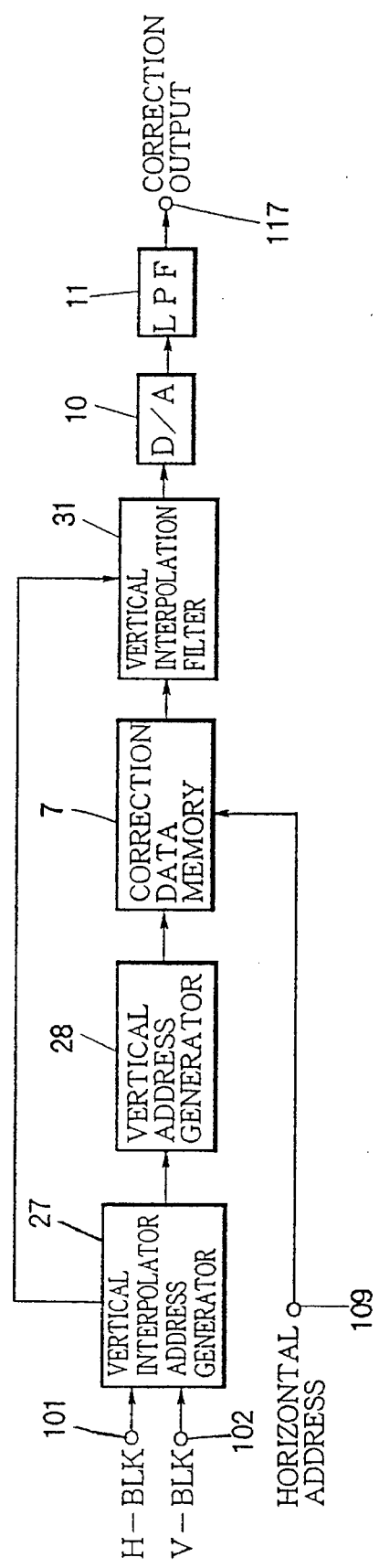
FIG. 48 is a block diagram showing another prior art example of digital convergence device.

FIG. 38 shows the configuration of a digital convergence device according to Embodiment 17. In the figure, the same reference numerals as those in FIG. 48 denote identical or corresponding components. Apart from these components, the illustrated digital convergence device is further provided with a scanning line number detector 60 for detecting the number of scanning lines of the input signal on the basis of input H-BLK pulse and V-BLK pulse, an interpolated line number controller 304, a vertical address controller 305, a selector controller 306, vertical interpolation filters 311a through 311n, a selector 314 for selecting one of the outputs of the vertical interpolation filters 311a through 311n a horizontal interpolation filter 315, a D/A converter 9 for converting digital correction data into an analog correction output, and an analog lowpass filter (LPF) 10.

The vertical interpolation filters 311a to 311n are provided to perform vertical interpolation respectively for a different number of interpolated lines. For instance, the vertical interpolation filter 311a performs the vertical interpolation when the number of the interpolated lines is 9, the vertical interpolation filter 311b performs the vertical interpolation when the number of the interpolated lines is 13. The selector 314 selects one of the outputs of the vertical interpolation filters 311a to 311n in accordance with a filter selection signal form the selector controller 306. The filter selection signal is produced in accordance with the number of the interpolated lines per segment. The vertical interpolation filters 311a to 311n, the selector 314 and the interpolation filter controller 306 are used in substituted for the vertical interpolator 8 and the coefficient generator 14 in FIG. 1.

The interpolated line number controller 304, the vertical address controller 305, the interpolated line address generator 27 and the vertical address generator 28 constituted what corresponds to the address generator 2 in FIG. 1.

The operation of the device shown in FIG. 38 will next be described. Horizontal blanking (H-BLK) and vertical blanking (V-BLK) pulses are input via the input terminals 101 and 102 respectively to the scanning line number detector 60, where for example H-BLK pulses are counted over one V-BLK pulse period. This count corresponds to the number of the horizontal scanning lines in one field period of the input signal.

First it is assumed that this count is 141.

The count is sent to the interpolated line number controller 304, which determines an optimum number of interpolated lines per segment responsive to the input count of the horizontal scanning lines. The algorithm for determining the number of interpolated lines is shown by expression (6)

$$IV = INT\{(N-1)/(NV-1)\} - 1 \tag{6}$$

where IV is the number of interpolated lines per segment,

N is the total number of scanning lines per field

NV is the number of correction points in the vertical direction, and

INT denotes a function for determining the integer within the brace which follows "INT", that is INT {x} gives an integer which is a maximum integer not exceeding x.

Figure 49:
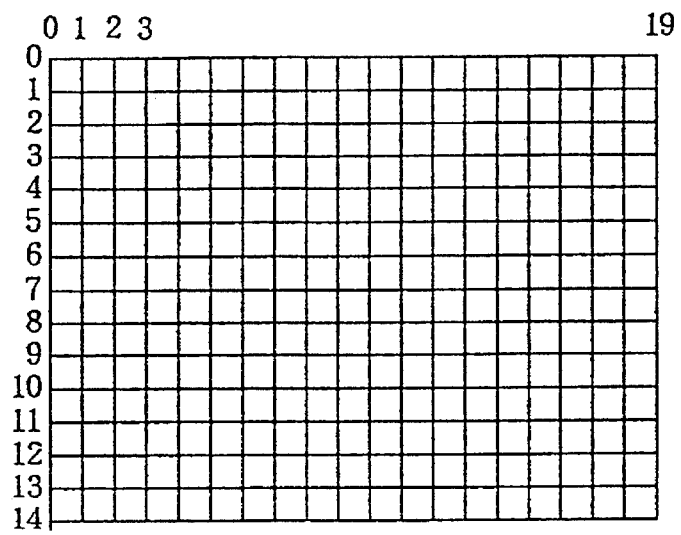
FIG. 49 is a diagram showing an arrangement of correction points.
Figure 50:
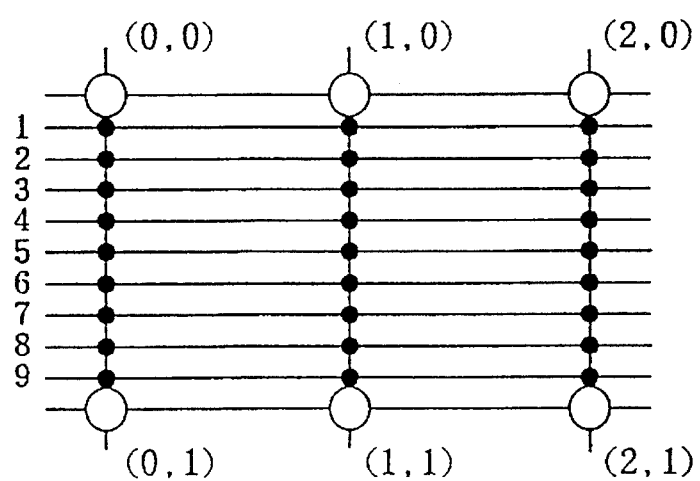
FIG. 50 is a diagram showing interpolated scanning lines between vertically adjacent correction points.
Figure 51:
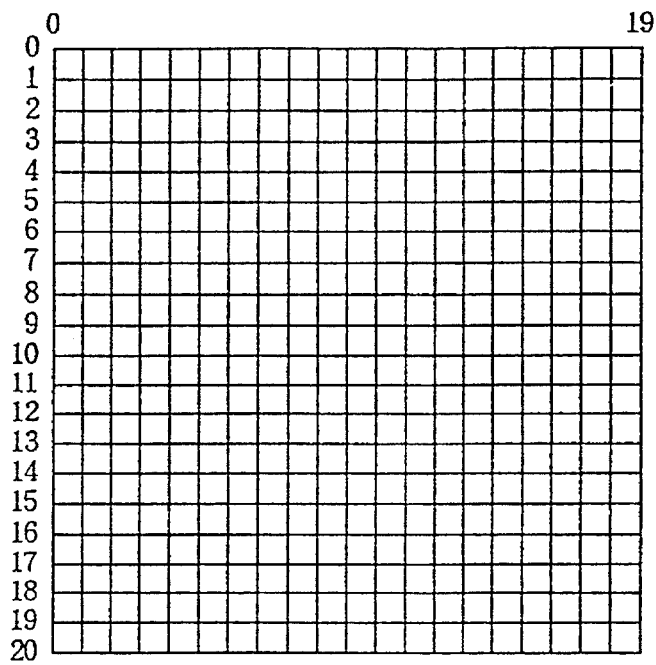
FIG. 51 is a diagram showing another example of arrangement of correction points.
Figure 52:
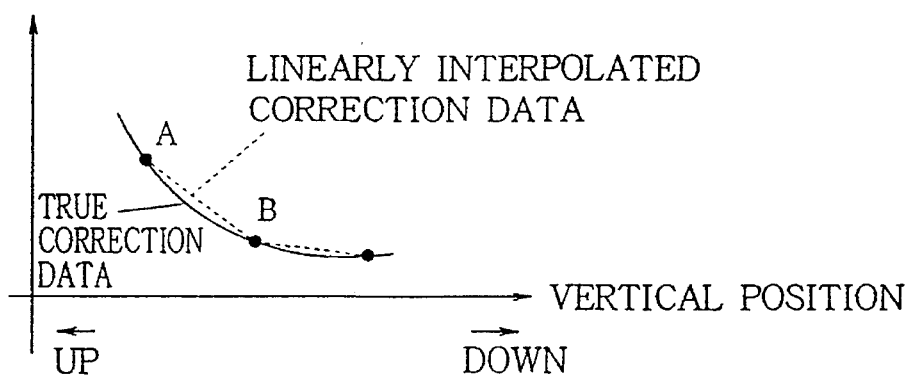
FIG. 52 is a diagram for explaining the error of the linear interpolation from the true value.

If the number of the correction points in the vertical direction is 15 as in FIG. 49, $$\begin{aligned} IV &= INT\{(N-1)/(NV-1)\} - 1 \\ &= INT\{(141-1)/(15-1)\} - 1 \\ &= 9 \end{aligned}$$

Accordingly, the number of the interpolated lines per segment is set at 9, and this result of calculation is sent to the interpolated line address generator 27, which comprises a counter counting the H-BLK pulses from 0 IV to produce addresses formed of its count value which varies cyclically from 0 to 9. It produces a ripple carry each time its count value changes from 9 to 0. The address is sent to the vertical interpolation filters 311a to 311n.

The vertical address controller 305 determines an optimum number of the vertical correction points in the vertical direction on the basis of the detected total number of the scanning lines. In the example under consideration, it is assumed that the number of correction points in the vertical direction is set at "15". This set value is sent to the vertical address generator 28.

The vertical address generator 28 comprises a counter which is rest by V-BLK pulses and counts the ripple carry of the counter of the interpolated line address generator 27. It produces a vertical address formed of its count value which varies cyclically from 0 to 14. The address value from the vertical address generator 28 is input to the correction data memory 7. The horizontal address generated in a circuit not shown is also input via the input terminal 109 to the correction data memory 7.

Correction data for correcting convergence errors are written in the correction data memory 7, by means not shown, and the correction data corresponding to the vertical address and the horizontal address are read in synchronism with the main deflection. The correction data input to the vertical interpolation filter 311a to 311n.

The vertical interpolation filter 311a calculates the correction data for the nine interpolated scanning lines in each segment, i.e., between a pair of vertically adjacent correction points. The calculation is conducted by interpolation on the basis of the correction data of the vertically adjacent correction points and in accordance with the interpolated line address. The calculated correction data is applied to the selector 314.

Similarly, each of the other vertical interpolation filters 311b to 311n calculates the correction data for a specific number of interpolated scanning lines in each segment. The specific number for each vertical interpolation being different from specific numbers of other vertical interpolation filters. The calculation is conducted by interpolation on the basis of the correction data of the vertically adjacent correction points and in accordance with the interpolated line address. The calculated correction data is applied to the selector 314.

In the situation under consideration, the number of interpolated lines per segment is 9 so that the selector 314 selects the output of the vertical interpolation filter 311a in accordance with the selection signal from the selector controller 306.

The data selected by the selector 314 is sent to the horizontal interpolation filter 315 where correction data between horizontally adjacent correction points are interpolated, and the output of the horizontal interpolation filter 314 is D/A converted at the D/A converter 9, passed through the LPF 10, and output via the output terminal as a correction output, which is used for determining the currents to the deflection coils as was earlier described with reference to other embodiments.

Now, let us suppose that the total number of the scanning lines is changed to 201. The new number of the scanning lies is detected by the scanning line number detector 60, and the interpolated line number controller 304 determines the number of the interpolated lines which would make the number of the correction points in the vertical direction is maintained at 15 in accordance with expression (6). That is, by substituting N=201 and NV=15 in expression (6), $$IV=INT\{(201-1)/(15-1)\}-1=13$$

IV is given to be 13.

In this case, the correctable scanning line number as given by expression (1) earlier described is 197. This amounts to 98% of the total number of scanning lines (201). Since, with ordinary video signals, the effective scanning period, i.e., the period for the video signal actually displayed, amounts to not more than 96% of the total scanning period, so that with the interpolated line number set in the above manner a satisfactory convergence error correction can be achieved.

The number of interpolated lines, IV=13, as determined above is sent to the interpolated line address generator 27, which produces the interpolated line address formed of a count value of a counter which varies cyclically from 0 to 13. The address value is applied to the vertical interpolation filters 311a to 311n.

When IV=13, the vertical interpolation filter 311b performs the interpolation. The selector 314 selects the output of the vertical interpolation filter 311b in accordance with the selection signal from the selector controller 306. The output data from the selector 314 is similarly processed by the horizontal interpolation filter 315, the D/A converter 9 and the LPF 10, and output via the terminal 117, in the same manner as described before.

In all the cases described above, the number of the correction points in the horizontal direction is 20 and the number of the correction points in the vertical direction is 15, and they remain unchanged. The capacity of the correction data memory 7 is common for various display modes or various types of input signals. Moreover, the arrangement and disposition of the correction points within the raster are common for various display modes or various types of input signals. The correction data can therefore be shared among various display modes or various types of input signals. It is therefore possible to obtain correction data for one display mode by copying the correction data for another display mode.

EMBODIMENT 18

In Embodiment 17, the number of correction points in the vertical direction is fixed. In Embodiment 18, it is variable.

Figure 39:
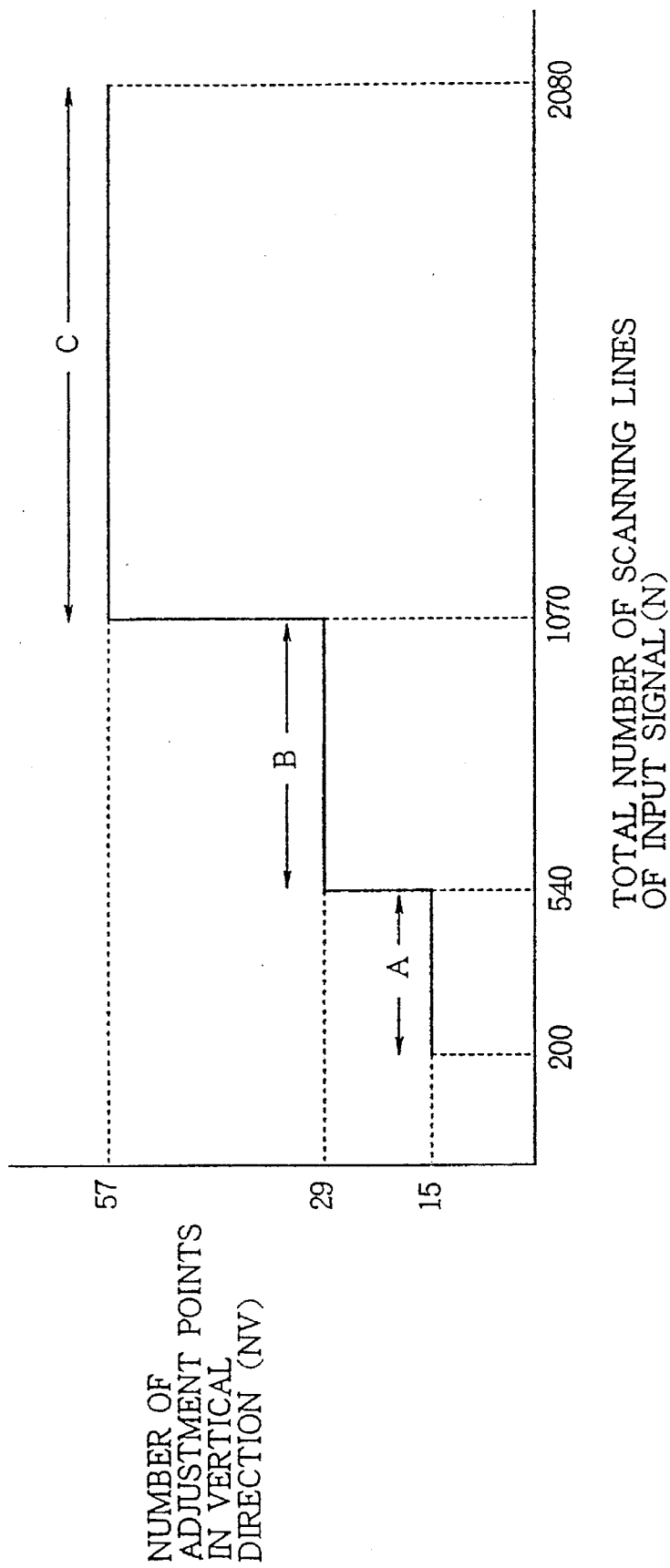
FIG. 39 is a diagram showing the relationship between the number of adjustment points in the vertical direction and the total number of the scanning lines of the input signal according to Embodiment 18.

FIG. 39 shows control over the number of the correction points in the vertical direction. That is, the vertical axis indicates the number of the correction points in the vertical direction and the horizontal axis indicates the number of the scanning lines of the signal input to the display device.

As will be seen from FIG. 39, the number of the correction points in the vertical direction is set at 15, 29 and 57, respectively in mode A, B and C, i.e., when the number of the scanning lines of the input signal is from 200 to 540, from 540 to 1070, and from 1070 to 2050, respectively. The switching of the number of the correction points is made in accordance with the following expression:

$$NV=(NVmin-1)\times 2^n+1 \qquad (7)$$

where NV is the number of the correction points in the vertical direction,

NVmin is a predetermined number and is equal to the minimum number of the correction points in the vertical direction, and n is an integer larger than zero.

That is, the illustrative embodiment is characterized in that the vertical correction point number is set at a value given by subtracting "1" from the minimum number of the correction points in the vertical direction and multiplying the difference by n-th power of "2", and adding "1" to the product.

Figure 40:
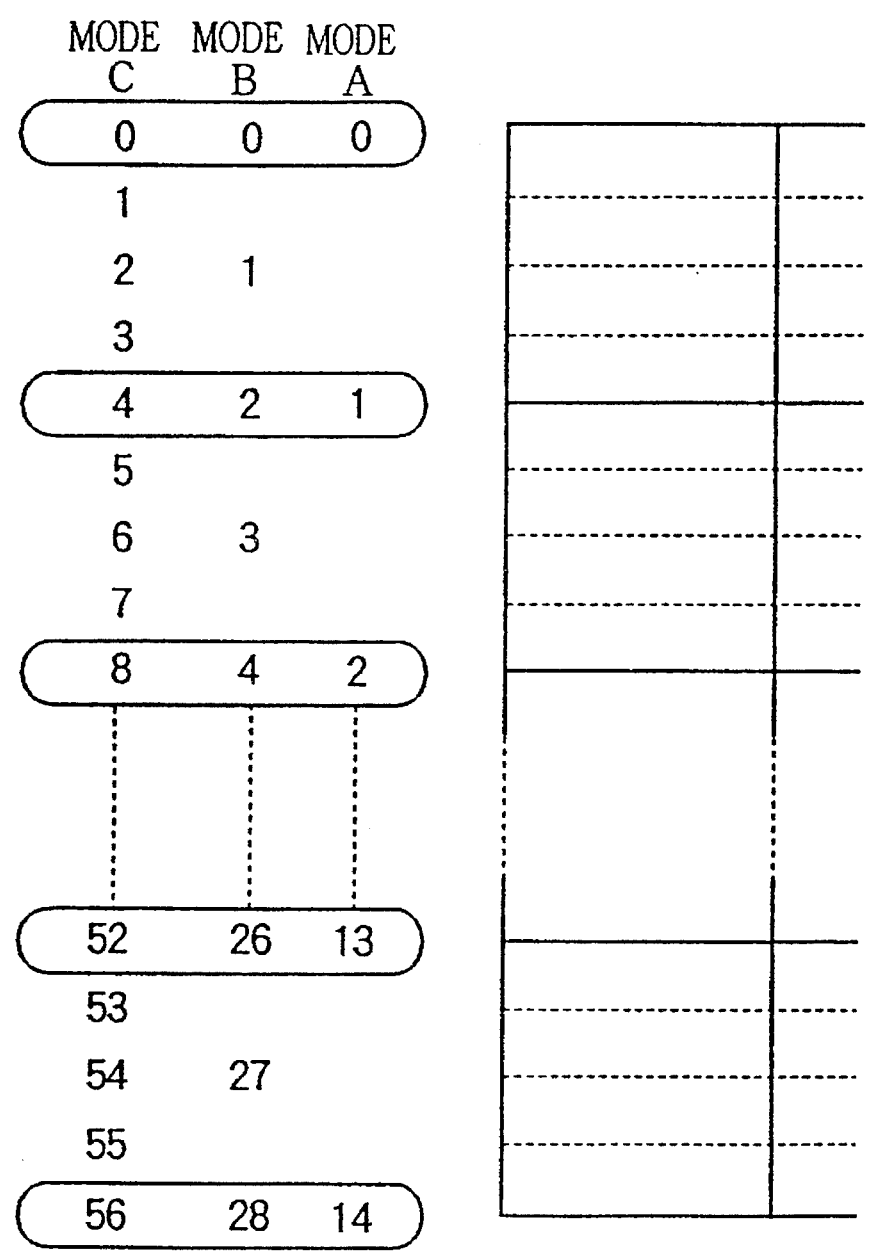
FIG. 40 shows a positional relationship between the correction points for different display modes according to Embodiment 18.

The positions of the vertical correction points on the raster are shown in FIG. 40. The figures on the left side indicate the vertical correction numbers. In the figure, the numerals in the left column indicate the numbers of correction points in the vertical direction in each of modes A, B and C, and the grid on the right side (only part of which is illustrated) represents positions of vertical correction points. Because the number of the correction points in the vertical direction is set in accordance with expressions (6) and (7), at the positions at which the correction points exist in mode A (the mode in which the number of the correction points in the vertical direction is minimum), there are also correction points in other modes. The adjustment data obtained for mode A can therefore be used also as adjustment data for other modes. It is therefore obtain part of the adjustment data (for identical adjustment points) for mode B and C by copying the adjustment data for mode A. It is possible to obtain the rest of the adjustment data by interpolation from the adjustment data for mode A. Conversely, when the adjustment data for mode C are given, it is possible to obtain the adjustment data for mode A or B, by copying part of the adjustment data for mode C.

In connection with Embodiment 17, it was described that the correction data on the interpolated lines are obtained by means of vertical interpolation filters shown in FIG. 38. In Embodiment 17, the number of the correction points in the vertical direction was assumed to be fixed. However, Embodiment 17 can be applied to a situation in which the number of the correction points in the vertical direction is varied, as in Embodiment 18.

Figure 41:
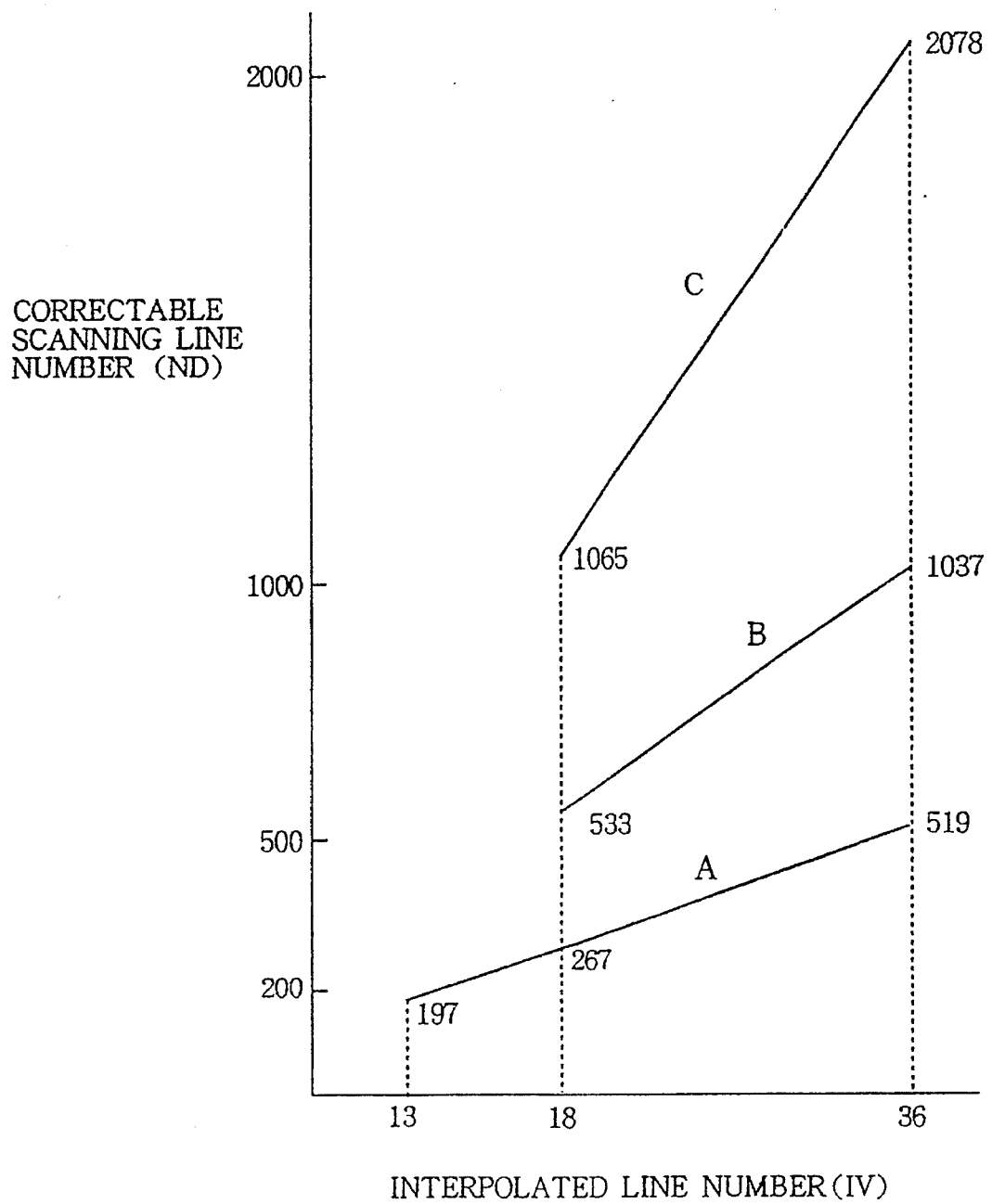
FIG. 41 is a diagram showing the relationship between the correctable scanning line number and the interpolated scanning line number according to Embodiment 18.

FIG. 41 shows the correctable scanning line number (on the vertical axis) versus the interpolated line number (on the horizontal axis) for each of the mode A, B and C. The interpolated line number can be selectively set to any number over the range of from 13 to 36, that is one of 24 values. It will be seen that by selecting the interpolated line number from 13 to 36 and by selecting the modes between A, B and C, it is possible to perform convergence correction over the range of scanning line numbers from 197 to 2078. In other words, the optimum one of 72 correction patterns can be selectively performed by selecting one of the modes A, B and C, and selecting one of the 24 values of the interpolated scanning line number.

EMBODIMENT 19

Figure 42:
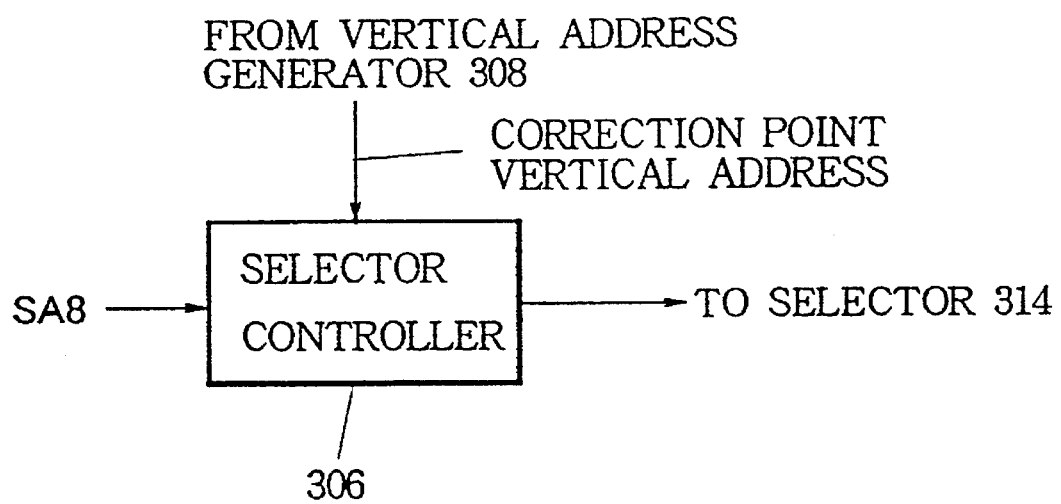
FIG. 42 is a block diagram showing a selector controller according to Embodiment 19.

FIG. 42 shows a characteristic part of a convergence device according to Embodiment 19. An overall configuration of the convergence device of this embodiment is identical to that of Embodiment 17.

In Embodiments 17 and 18, the correction pattern selected for the signal input to the display device is just one. The correctable scanning line number (DN) is defined by expression (1). The difference between the total scanning number (N) and the correctable scanning line number (DN) is the number of the scanning lines for which convergence correction cannot be made. Normally, such uncorrectable scanning lines do not contain video signal that are actually displayed, and do not need correction. However, in some applications it is a problem. The present embodiment provides a solution to this problem and enables convergence correction of all the scanning lines.

In FIG. 42, the correction point vertical address generated by the vertical address generator 28 is supplied to the selector controller 306, which supplies the selector 314 with the selection signal for selecting the optimum vertical interpolation filter for the address of each vertical correction point. The selector 314 selects one of the outputs of the vertical interpolation filters.

If, for instance, the total scanning line number of the input signal is 205, the interpolated line number (IV) set according to expression (6) is 13, and the correctable scanning line number (DN) is 197. Consequently, the remaining uncorrectable scanning line number is 205−197= 8.

According to Embodiment 19, different numbers of interpolated lines are allocated to some and other segments. Specifically, of the 15−1=14 segments, six segments are each allocated with 13 interpolated lines, while eight segments are allocated with 14 interpolated lines. Accordingly, the vertical interpolation filter (one of 311a to 311n, e.g., 311b) designed to operate for 13 interpolated lines is selected for the size segments, while the vertical interpolation filter (one of 311a to 311n) designed to operate for 14 interpolated scanning lines is selected for the eight segments. The sum of the scanning lines for which correction is made is:

$$6\times(13+1)+8\times(14+1)+1=205.$$

It is therefore possible to perform convergence correction for all the scanning lines.

While the invention has been described in connection with what is presently considered the most practical and preferred embodiments, it is to be understood that the invention is not limited to the disclosed embodiments, but on the contrary, is intended to cover various modifications and equivalent arrangement included within the spirit and scope of the appended claims.

What is claimed is:

1. A registration error correction device for correcting registration error of a picture displayed on a screen of a display device in which electron beams are deflected in vertical and horizontal directions by a deflection means to form a raster of horizontal scanning lines vertically separated from each other, said scanning lines including a first class of scanning lines referred to as correction scanning lines, and a second class of scanning lines referred to as interpolated scanning lines positioned between said correction scanning lines, said correction scanning lines including corrections points positioned at intersections of said correction scanning lines and at least one vertical line, said registration error correction device comprising:

a correction data memory storing correction data associated with each correction point;

an address generator for generating point addresses, which are addresses of respective points along one of said correction and interpolated scanning lines, for generating memory addresses of said correction data memory based on said point addresses, and for generating coefficient addresses based on said point addresses;

a coefficient generator for generating coefficient data based on said coefficient addresses; and a vertical interpolator for determining interpolated correction data for points on said interpolated scanning lines by performing greater than first order interpolation using said correction data, addressed according to said memory addresses, and said coefficient data.

2. A registration error correction device as defined by claim 1 wherein said vertical interpolator comprises:

a switching circuit receiving said correlation data from said correction data memory;

a delay circuit for producing first delayed data identical to an output of said switching circuit and delayed by a first predetermined delay period, and for producing second delayed data identical to said output of said switching circuit and delayed by a second predetermined delay period greater than said first predetermined delay period;

said switching circuit receiving said first delayed data and said second delayed data, repeatedly selecting, when said address generator is generating addresses for said correction scanning lines, said correction data for said correction points and said first delayed data for points other than said correction points on said correction scanning lines, and selecting said second delayed data when said address generator is generating addresses for said interpolated scanning lines;

a multiplier for multiplying output of said switching circuit by said coefficient data; and an accumulator for accumulating output of said multiplier for an accumulation period.

3. The registration error correction device as defined by claim 2, wherein said delay circuit comprises a first delay circuit receiving and delaying said output of said switching circuit to produce said first delayed data, and a second delay circuit receiving and delaying said first delayed data to produce said second delayed data.

4. The registration error correction device as defined by claim 2, wherein said switching circuit comprises a first selector and a second selector, said second selector selects said first delayed data when said address generator is generating addresses for said correction scanning lines, and selects said second delayed data when said address generator is generating addresses for said interpolated scanning lines, and said first selector selects said correction data when said address generator generates an address of one of said correction points, otherwise, said first selector selects output of said second selector.

5. The registration error correction device as defined by claim 2, wherein said accumulator comprises an adder, a third delay circuit for delaying an output of said adder by a third predetermined delay period, a zero-value supplying circuit for producing a zero value, and a selector selecting one of an output of said third delay circuit and an output of said zero-value circuit, said adder adding said output of said multiplier to an output of said selector such that said output of said adder is a cumulative sum of said output of said multiplier when said selector is selecting said output of said delay circuit, and said selector selects said output of said zero-value circuit to rest the cumulative addition.

6. The registration error correction device as defined by claim 2, wherein said coefficient generator comprises a first coefficient generating circuit for generating first coefficients, a second coefficient generating circuit for generating second coefficients, and a selector for selecting said first coefficients when addresses of said correction and interpolated scanning lines in a central part of said raster are generated by said address generator, and selecting said second coefficients when addresses of said correction and interpolated scanning lines near upper or lower edges of said raster are generated by said address generator.

7. The registration error correction device as defined by claim 6, wherein fewer of said correction data are used when performing interpolation with said second coefficients than when performing interpolation with said first coefficients.

8. The registration error correction device as defined by claim 2, further comprising:

a scanning line number detector for detecting a total number of scanning lines of a signal input to said display device;

wherein said correction data memory stores said correction data for a predetermined number of scanning lines, predetermined correction points, and predetermined numbers of interpolated scanning lines in each segment formed between respective pairs of adjacent correction scanning lines;

said address generator is responsive to said detected total number of scanning lines for determining, if said detected total number differs from said predetermined number, a number of interpolated scanning lines in each segment between respective pairs of adjacent correction scanning lines in such a manner that said correction points on said raster for said detected total number of scanning lines are at about the same positions as said correction points for said predetermined number of scanning lines for which said correction data memory stores said correction data; and said coefficient generator produces coefficients suitable for said number of said interpolated scanning lines determined by said address generator.

9. A registration error correction device as defined by claim 8, wherein said coefficient generator stores a plurality of sets of coefficients for respective numbers of said interpolated scanning lines, and produces said coefficients form one of said sets selected depending on said number of the interpolated scanning lines determined by said address generator.

10. The registration error correction device as defined in claim 1, wherein said address generator sequentially generates said point addresses along said correction and interpolated scanning lines in synchronism with said deflection by said deflection means, and generates said memory addresses such that said memory means outputs said correction data sequentially along said correction scanning lines.

11. The registration error correction device as defined in claim 1, wherein said vertical interpolator inputs said correction data, rearranges said correction data into at least one set of correction data associated with a set of correction points each on a different scanning line and vertically aligned with one another, multiplies each of said correction data for said set of correction points by an associated one of said coefficient data, and accumulates results from said multiplication to produce correction data for a point on one of said interpolated scanning lines.

12. The registration error correction device as defined in claim 1, wherein said address generator generates said memory addresses such that said correction data memory outputs said correction data for a set of vertically aligned correction points on different ones of said correction scanning lines; and said vertical interpolator interpolates a correction point on one of said interpolated scanning lines by multiplying each one of said correction data for said set of vertically aligned correction points and an associated one of said coefficient data.

13. The registration error correction device as defined by claim 12, further comprising:

a scanning line number detector for detecting a total number of scanning lines of a signal input to said display device;

wherein said correction data memory stores said correction data for a predetermined number of scanning lines, predetermined correction points, and predetermined number of interpolated scanning lines in each segment formed between respective pairs of adjacent correction scanning lines;

said address generator is responsive to said detected total number of scanning lines for determining, if said detected total number differs from said predetermined number, a number of interpolated scanning lines in each segment between respective pairs of adjacent correction scanning lines in such a manner that said correction points on said raster for said detected total number of scanning lines are about the said positions as said correction points for said predetermined number of scanning lines for which said correction data memory stores said correction data; and said coefficient generator produces coefficients suitable for said number of said interpolated scanning lines determined by said address generator.

14. The registration error correction device as defined in claim 12, wherein said vertical interpolator accumulates results of said multiplication to determine said correction data for said correction point on said one of said interpolated scanning lines.

15. The registration error correction device as defined in claim 12, wherein said address generator generates said memory addresses such that said data correction memory outputs said correction data for said set of vertically aligned correction points for each point, vertically aligned with said vertically aligned correction points, on those said interpolated scanning lines between adjacent pairs of said correction scanning lines.

16. The registration error correction device as defined in claim 12, wherein said coefficient generator comprises a first coefficient generating circuit for generating first coefficients, a second coefficient generating circuit for generating second coefficients, and a selector for selecting said first coefficients when addresses of said correction and interpolated scanning lines in a central part of said raster are generated by said address generator, and selecting said second coefficients when addresses of said correction and interpolated scanning lines near upper or lower edges of said raster are generated by said address generator.

17. The registration error correction device as defined by claim 16, wherein fewer of said correction data are used when performing interpolation with said second coefficients than when performing interpolation with said first coefficients.

18. A registration error correction device for correcting registration error of a picture displayed on a screen of a display device in which electron beams are deflected in vertical and horizontal directions by deflection means to form a raster consisting of horizontal scanning lines vertically separated from each other, said scanning lines including a first class of scanning lines, called correction scanning lines, on which correction points are positioned, and a second class of scanning lines, called interpolated scanning lines between said correction scanning lines, said correction points being positioned at intersections of said correction scanning lines and one or more vertical lines separated from each other, said correction points including a first class of correction points, called adjustment points, and a second class of correction points, called non-adjustment correction points, said registration error correction device comprising:

means for inputting said correction data for said adjustment points;

determining means for determining, by interpolation, said correction data for said non-adjustment correction points based on said correction data for said adjustment points;

a correction data memory for storing said correction data for said correction points;

an address generator for addressing said correction data memory to read correction data from said correction data memory;

a coefficient generator for producing coefficients;

said address generator also addressing said coefficient generator to cause said coefficient generator to output said coefficients; and a vertical interpolator for determining correction data for said interpolated scanning lines based on said correction data from said correction data memory and said coefficients from said coefficient generator.

19. The registration error correction device as defined by claim 18, wherein a number of said correction scanning lines is n and a number of said vertical lines is m, and said adjustment points are at intersections of a number i of said correction scanning lines and on a number j of said vertical lines, with i<m and j<n; and said device further comprising:

means for determining an $\{(i-1) \times (j-1)\}$-th-order correction function; and said determining means determines said correction data for said non-adjustment correction points by interpolation using the said correction function.

20. The registration error correction device as defined by claim 19, further comprising:

an interpolation coefficient memory for storing interpolation coefficients for respective ones of said non-adjustment correction points, and wherein said determining means uses said interpolation coefficients for said correction data of said non-adjustment correction points.

21. The registration error correction device as defined in claim 20, wherein said adjustment for correcting registration error can be made for a selected one of a plurality of sets of adjustment points, and said device further comprises means for causing the display device to display a selected one of picture patterns each indicating one of said sets of adjustment points.

22. The registration error correction device as defined by claim 21, wherein said coefficient memory stores a plurality of sets of coefficients, each used for interpolation of said correction data of said non-adjustment correction points from said correction data of a corresponding one of said plurality of sets of adjustment points.

23. The registration error correction device as defined by claim 18, further comprising:

an image pickup device for picking up at least part of an image displayed on said screen which includes one of said adjustment points;

an actuator for moving said image pickup device so that said image pickup device picks up a different part of said image displayed on the screen as said image pickup device is moved;

an error detector for detecting a registration error at each adjustment point based on an image signal from said pickup device; and control means for adjusting said correction data for said adjustment points responsive to output of said error detector.

24. The registration error correction device as defined by claim 19, further comprising a non-volatile memory for storing said correction data for a plurality of display modes, said non-volatile memory storing, with respect to at a first set of said display modes, said correction data of only said adjustment points.

25. The registration error correction device as defined by claim 24, wherein said non-volatile memory stores said correction data of all said correction points with respect to a second set of said display modes.

26. The registration error correction device as defined by claim 25, wherein said non-volatile memory has one or more first areas and one or more second areas, said second set of display modes is assigned and stored in respective ones of said first areas, said first set of display modes is assigned and stored in respective ones of said second areas; and further comprising means for monitoring use of display modes, and for, when it is found that a display mode stored in one of said second areas is used comparatively frequently, calculating said correction data of all said correction points for said display mode by interpolation from said correction data of said adjustment points, and storing said calculated correction data in one of said first areas.

27. The registration error correction device as defined by claim 18, wherein registration error correction can be conducted for all colors.

28. The registration error correction device as defined by claim 27, further comprising a grating with horizontal and vertical threads removably mounted to said screen of said display device, said horizontal and vertical threads so positioned that images of said adjustment points coincide with intersections of said horizontal and vertical threads when there is no raster distortion.

29. A registration error correction device for correcting registration error of a picture displayed on a screen of a display device in which electron beams are deflected in vertical and horizontal directions by deflection means to form a raster consisting of horizontal scanning lines vertically separated from each other, said scanning lines including a first class of scanning lines, called correction scanning lines, on which correction points are positioned, and a second class of scanning lines, called interpolated scanning lines between said correction scanning lines, said correction points being positioned at intersections of said correction scanning lines and one or more vertical lines separated from each other, segments being formed between respective pairs of adjacent correction scanning lines, said registration error correction device comprising:

means for detecting a number of scanning lines of a signal input to said display device;

means for controlling a number of said correction points in said vertical direction;

means for controlling a number of said interpolated scanning lines between adjacent ones of said correction scanning lines;

at least two vertical interpolation filters for calculating said correction data for said interpolated scanning lines, each of said vertical interpolation filters designed to interpolate a specific number of said interpolated scanning lines; and means for selecting an output of one of said vertical interpolation filters according to said detected number of scanning lines, said selecting being performed such that shifts of positions of said correction points on said raster due to a change in said number of scanning lines are minimized.

30. The registration error correction device as defined by claim 29, wherein said number of said correction points in a given correction pattern is set at $$(NVmin-1) \times 2^n + 1$$

where NVmin is a predetermined number, and n is an integer equal to or greater than "1".

31. The registration error correction device as defined in claim 1, wherein segments are formed between respective pairs of adjacent correction scanning lines, and further comprising:

means for detecting a total number of scanning lines from an input signal, and for setting a number of said interpolated scanning lines for each of said segments in accordance with said total number of scanning lines; and wherein said vertical interpolator interpolates said correction data of said interpolated scanning lines in each of said segments according to said number of the interpolated scanning lines set for each of said segments.

32. A registration error correction device for correcting registration error of a picture displayed on a screen of a display device in which electron beams are deflected in vertical and horizontal directions by a deflection means to form a raster of horizontal scanning lines vertically separated from each other, said scanning lines including a first class of scanning lines referred to as correction scanning lines, and a second class of scanning lines referred to as interpolated scanning lines positioned between said correction scanning lines, said correction scanning lines including corrections points positioned at intersections of said correction scanning lines and at least one vertical line, said registration error correction device comprising:

a correction data memory storing correction data associated with each correction point, and storing correction data for imaginary correction points on at least two imaginary correction scanning lines disposed above an upper edge of said raster and at least two imaginary correction lines disposed below a lower edge of said raster, said imaginary correction points being vertically aligned with said correction points;

an address generator for generating point addresses, which are addresses of respective points along one of said correction and interpolated scanning lines, for generating memory addresses of said correction data memory based on said point addresses, and for generating coefficient addresses based on said point addresses;

a coefficient generator for generating coefficient data based on said coefficient addresses; and a vertical interpolator for determining interpolated correction data for points on said interpolated scanning lines by performing interpolation using said correction data, addressed according to memory addresses, and said coefficient data, said vertical interpolator using said imaginary correction data for said imaginary scanning lines above said upper edge of said raster to determine said interpolate correction data for points on said interpolated scanning lines near said upper edge of said raster, and using said imaginary correction data of for said imaginary scanning lines below said lower edge of said raster to determine said interpolated correction data for points on said interpolated scanning lines near said lower edge of said raster.

33. The registration error correction device as defined in claim 32, wherein said vertical interpolator performs greater than first order interpolation to determine said correction data for points on said interpolated scanning lines between those said interpolated scanning lines near said upper edge and said lower edge.

34. The registration error correction device as defined in claim 33, wherein said vertical interpolator performs first order interpolation to determine said correction data for points on said interpolated scanning lines near said upper edge and said lower edge.

35. The registration error correction device as defined in claim 33, wherein said vertical interpolator performs higher than first order interpolation to determine said correction data for points on said interpolated scanning lines near said upper edge and said lower edge.

36. The registration error correction device as defined by claim 32, further comprises extrapolation means responsive to said correction data of said correction points for determining said correction data of said imaginary correction points by extrapolation.

37. The registration error correction device as defined by claim 32, wherein said coefficient generator stores coefficients for horizontal slice lines imaginarily provided between adjacent correction scanning lines;

said address generator generates, for said interpolated correction data, coefficient addresses which cause said coefficient generator to output coefficients of a slice line closest to each of said interpolated scanning lines; and said vertical interpolator uses said coefficients output from the coefficient generator for performing said interpolation.

38. The registration error correction device as defined in claim 36, wherein said extrapolation means uses first order extrapolation to determine said correction data for said imaginary correction scanning lines.

39. The registration error correction device as defined in claim 36, wherein said extrapolation means uses higher than first order extrapolation to determine said correction data for said imaginary correction scanning lines.

40. The registration error correction device as defined by claim 32, further comprising:

a scanning line number detector for detecting a total number of scanning lines of the input signal to said display unit;

wherein said coefficient generator further comprises:

an interpolated scanning line number generator for allocating interpolated scanning lines to respective segments formed between respective pairs of adjacent correction scanning lines so as to minimize a shift of said correction scanning lines due to a change in said total number of the scanning lines based on said detected total number of scanning lines;

a coefficient address generator for generating an address signal for said coefficient data based on said coefficient addresses and a number of said interpolated scanning lines allocated to each of said segments; and a coefficient data generator for supplying coefficient data responsive to said address signal.

41. A method of providing correction data in a registration error correction device for correcting registration error of a picture displayed on a screen of a display device in which electron beams are deflected in vertical and horizontal directions by deflection means to form a raster consisting of horizontal scanning lines vertically separated from each other, said scanning lines including a first class of scanning lines, called correction scanning lines, on which correction points are positioned, and a second class of scanning lines, called interpolated scanning lines between said correction scanning lines, said correction points being positioned at intersections of said correction scanning lines and one or more vertical lines separated from each other, said correction points including a first class of correction points, called adjustment points, and a second class of correction points, called non-adjustment correction points, said method comprising the steps of:

performing adjustment for correcting registration error with respect to said adjustment points to obtain correction data for said adjustment points;

determining, by interpolation, correction data for said non-adjustment correction points;

storing said correction data for said adjustment points and said non-adjustment correction points in a correction data memory.

* * * * *